(12) United States Patent
Iravani

(10) Patent No.: US 7,949,501 B1
(45) Date of Patent: May 24, 2011

(54) SYSTEMS AND METHODS FOR A REAL TIME MACHINE SIMULATOR TO EXPLORE THE EFFECTS OF RULES USED IN A MODULAR MANUFACTURING OR ASSEMBLY SYSTEM

(75) Inventor: Seyed M. Iravani, Evanston, IL (US)

(73) Assignee: Northwestern University, Evanston, IL (US)

( * ) Notice: Subject to any disclaimer, the term of this patent is extended or adjusted under 35 U.S.C. 154(b) by 788 days.

(21) Appl. No.: 10/440,630

(22) Filed: May 19, 2003

Related U.S. Application Data

(60) Provisional application No. 60/381,583, filed on May 17, 2002.

(51) Int. Cl.
*G06G 7/48* (2006.01)
(52) U.S. Cl. .......................................................... 703/6
(58) Field of Classification Search .......... 434/365–431, 434/350, 118, 119; 703/23, 24, 18, 6–8; 52/749.1, 750; 705/7
See application file for complete search history.

(56) References Cited

U.S. PATENT DOCUMENTS

| | | | | |
|---|---|---|---|---|
| 3,061,945 A | * | 11/1962 | Hawkins | 434/12 |
| 3,406,379 A | * | 10/1968 | Palevsky et al. | 703/3 |
| 3,896,041 A | * | 7/1975 | Alliston et al. | 703/18 |
| 5,910,903 A | * | 6/1999 | Feinberg et al. | 703/6 |
| 6,073,188 A | * | 6/2000 | Fleming | 710/38 |
| 6,289,299 B1 | | 9/2001 | Daniel, Jr. et al. | |
| 6,514,085 B2 | * | 2/2003 | Slattery et al. | 434/335 |
| 6,516,287 B1 | * | 2/2003 | Freitag | 702/173 |
| 6,598,759 B2 | * | 7/2003 | Carriere | 221/45 |
| 7,209,870 B2 | * | 4/2007 | Simmons et al. | 703/1 |

OTHER PUBLICATIONS

Manivannan, 1991, Simulation Conference, 1991. Proceedings, Winter, Real-time control of manufacturing cell using knowledge-based simulaion. pp. 251-260.*
Umdea, Proceddings of the 1992 Winter Simulation Conference, A Manufacturing-Oriented Simulation Package to Support Systems Planning and Its Operation, pp. 890-898.*
BridgeView and LabView, G Programming Reference Manual., National Instruments, Jan. 1998.1-1-1-4, 10-1, 11-1.*
Lee te al. 1996. Journal of Intelligent Manufacturing. "Neural simulation of a prototype keyboard assembly cell with adaptive control". p. 379-386.*

* cited by examiner

*Primary Examiner* — Paul L Rodriguez
*Assistant Examiner* — Eunhee Kim
(74) *Attorney, Agent, or Firm* — Tim Tingkang Xia; Morris, Manning & Martin, LLP

(57) ABSTRACT

A simulation device for simulating and exploring the effects of different policies used on a machine in a manufacturing system. The simulation device representing the machine includes controls to allow the participation of an operator in simulation modeling. The operator initiates the simulation process by, for example, loading a block into the simulator according to a hypothesis policy. During the simulation, a computer records all the changes in the system and those changes are transmitted to the computer. When the simulation stops, the total number of items completed by the system represents the throughput of the system during the simulation time. The operator can view the results of the simulation and change the policies and repeat the simulation using the same system structure or parameters.

49 Claims, 39 Drawing Sheets

| DB-9M | Function | Abbreviation |
|---|---|---|
| Pin #1 | Data Carrier Detect | CD |
| Pin #2 | Receive Data | RD or RX or RXD |
| Pin #3 | Transmitted Data | TD or TX or TXD |
| Pin #4 | Data Terminal Ready | DTR |
| Pin #5 | Signal Ground | GND |
| Pin #6 | Data Set Ready | DSR |
| Pin #7 | Request To Send | RTS |
| Pin #8 | Clear To Send | CTS |
| Pin #9 | Ring Indicator | RI |

| Pin # | Pin Name | Function | Pin # | Pin Name | Function |
|---|---|---|---|---|---|
| 1 | P1.0 | Loading Button | 21 | P2.0 | Loading Light |
| 2 | P1.1 | Repair Operation Button | 22 | P2.1 | Repair Operation Light |
| 3 | P1.2 | Setup Button | 23 | P2.2 | Setup Light |
| 4 | P1.3 | Operational Dependent Failure Switch | 24 | P2.3 | Machine Failure Light |
| 5 | P1.4 | Processing Button | 25 | P2.4 | Processing Light |
| 6 | P1.5 | Processing Dependent Failure Switch | 26 | P2.5 | Scrapped Light |
| 7 | P1.6 | Unloading Button | 27 | P2.6 | Unloading Light |
| 8 | P1.7 | Defective Item Switch | 28 | P2.7 | Needs Rework Light |
| 9 | RESET | Power-on Reset (not used) | 29 | PSEN | Program Store Enable (not used) |
| 10 | RxD | Receive Serial Data | 30 | ALE | Address latch enable (not used) |
| 11 | TxD | Transmit Serial Data | 31 | EA | External program fetch enable (not used) |
| 12 | CTS | Clear To Send | 32 | P0.7 | Unloading Manual/Automatic Switch |
| 13 | RTS | Request To Send | 33 | P0.6 | Unloading On/Off Switch |
| 14 | P3.4 | (not used) | 34 | P0.5 | Processing Manual/Automatic Switch |
| 15 | P3.5 | (not used) | 35 | P0.4 | Processing On/Off Switch |
| 16 | P3.6 | (not used) | 36 | P0.3 | Setup Manual/Automatic Switch |
| 17 | P3.7 | (not used) | 37 | P0.2 | Setup On/Off Switch |
| 18 | XTAL 1 | Crystal Terminal 1 | 38 | P0.1 | Loading Manual/Automatic Switch |
| 19 | XTAL 2 | Crystal Terminal 2 | 39 | P0.0 | Loading On/Off Switch |
| 20 | GND | System ground | 40 | VCC | Supply voltage (+5V) |

FIG. 24

| Byte # | 7 | 6 | 5 | 4 | 3 | 2 | 1 | 0 |
|---|---|---|---|---|---|---|---|---|
| Process | X | Unloading | X | Processing | X | Setup | Repair | Loading |

FIG. 27

| Variable | Function |
|---|---|
| TMES | The fifteen byte times vector. Sixteen reserved for buffer overruns |
| PROC_T | The current process time - minutes and seconds |
| FAIL_T | The current time to failure |
| PUSHED | Boolean - has this process been activated? |
| CUR_STATE | The state variable - zeros except for a 1 in the current process bit |
| STATE_PTR | A pointer to the spot in TMES which holds the current process time |
| SWITCHES | The value of port 0 (process switches) |
| MAN_AUTO | Boolean - true if this process is automatic |
| RES_RES | Boolean - true if this process is reset (not resume) |
| REPAIR | Boolean - true if we are in the repair operation |
| PUSH_STATE | Temporary location of state variable after failure |
| PUSH_MAN | Temporary location of MAN_AUTO variable after failure |
| PUSH_MIN | Temporary location of process time after failure |
| PUSH_SEC | |

FIG. 28

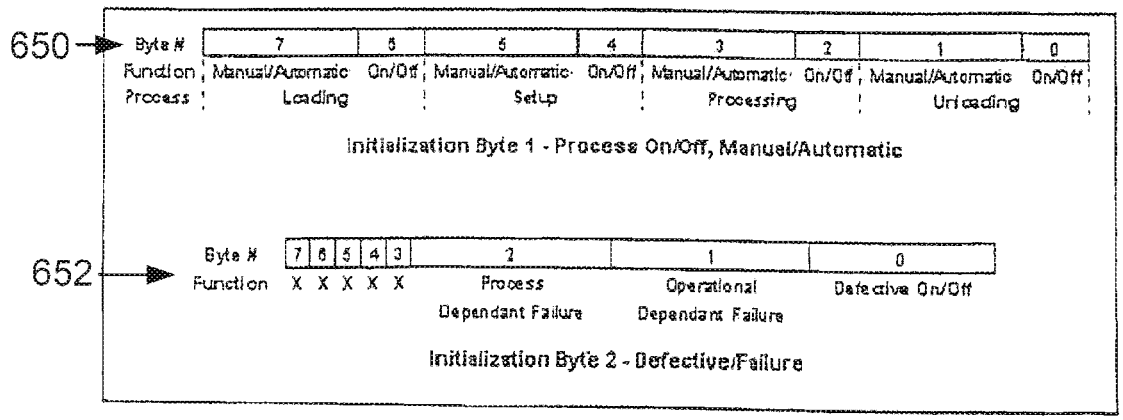

FIG. 29

| Byte # | Function |
|---|---|
| 1 | Loading time Seconds |
| 2 | Loading time Minutes |
| 3 | Setup time Seconds |
| 4 | Setup time Minutes |
| 5 | Processing time seconds |
| 6 | Processing time minutes |
| 7 | Unloading time seconds |
| 8 | Unloading time minutes |
| 9 | Next failure time seconds |
| 10 | Next failure time minutes |
| 11 | Repair time seconds |
| 12 | Repair time minutes |
| 13 | Rework flag - true if next object processed needs rework |
| 14 | Scrapped flag - true if next object will be scrapped |
| 15 | Reset byte - bit tags for resetting on interruption |

Reset Byte

| Byte # | 7 | 6 | 5 | 4 | 3 | 2 | 1 | 0 |
|---|---|---|---|---|---|---|---|---|
| Reset Process | Unloading | X | After Repair | Processing | X | Setup | X | Loading |

FIG. 30

| Message Code | Meaning |
|---|---|
| 1 | Moving to the next stage of operation |
| 2 | First state; Waiting for new object |
| 3 | RTMS has failed |
| 4 | RTMS under repair |
| 5 | Repair operation complete |
| 6 | Has produced object that needs rework |
| 7 | Has produced object to be scrapped |
| 8 | Interrupted during a manual process - back one stage |
| 9 | Object processed - Not defective |
| 10 | A new times vector is needed |

FIG. 31

| File | Function |
|---|---|
| Unit1.h | Creates the "Simulation Running" Window |
| Unit2.h | Runs first thread, "updater", during simulation |
| Unit3.h | Creates and parses user input GUI window |
| Unit4.h | Creates and manages the "submit" window (no actual code) |
| Unit5.h | Creates and manages the second GUI screen |
| Unit6.h | Creates and updates the simulation statistics window |
| Unit7.h | Runs second thread, "receiver", during simulation |
| rtms.h | Contains class for digital machine representation |
| manager.h | Manages interactions between RTMS's |
| serialCom.h | Contains calls to the windows COM management system |
| graph.h | Creates and updates the queue graph window |
| init.h | Manages the first "receiver" thread during initialization |
| timer.h | Manages the second "time out" thread during initialization |
| first.h | Creates and manages the first GUI screen. |
| quit.h | Displays the confirmation box for quitting (no actual code) |
| error.h | Displays the initialization error window (no actual code) |
| project1.h | Contains the main calls to the API |
| about.h | Display the "About" box (no actual code) |

FIG. 34

```
Vital Statistics for RTMS 3
======================================

Processes      Distribution    Mode         #1     #2
-------------------------------------------------------
Loading        Uniform         Automatic    10     13
Processing     Uniform         Automatic    1      5
Failure        Uniform         Operational  60     60
Repair         Uniform         N/A          4      8

Defective items enabled. Scrapped: 15+ Rework: 25+

End Vital Statistics

Printing Final Statistics:

Simulation Time:          00:03:09
Starting Items in system: 20
Items Left in system:     12
Average Items in system:  16.3439

Final Statistics for RTMS 3
======================================

Items processed:                  3
Items produced needing rework:    2
Scrapped items produced:          3
Items left in queue:              11
Number of times failure occurred: 2
Average items in queue:           16.3439

Processes              Time       No.      Avg.
-------------------------------------------------
Waiting for Loading    00:00:23   9        00:00:02
Loading                00:01:33   9        00:00:10
Waiting for Processing 00:00:18   9        00:00:02
Processing             00:00:26   9        00:00:02
Machine Failure        00:00:13   2        00:00:02
Under Repair           00:00:12   2        00:00:06
                                           00:00:06
```

```
RTMS 3
===============

Time and Items in
Queue
-----------------
0      10
1      10
2      10
3      10
4      10
5      10
6      10
7      10
8      10
9      10
10     10
11     10
12     9
13     9
14     9
15     9
16     9
17     9
18     9
19     9
20     9
21     10
22     10
23     10
24     10
25     10
26     10
27     10
28     10
29     10
30     10
31     10
32     9
33     9
34     9
35     9
36     9
37     9
38     9
39     9
```

FIG. 41

SYSTEMS AND METHODS FOR A REAL TIME MACHINE SIMULATOR TO EXPLORE THE EFFECTS OF RULES USED IN A MODULAR MANUFACTURING OR ASSEMBLY SYSTEM

RELATED APPLICATION

This application claims priority of U.S. Provisional Application Ser. No. 60/381,583 filed May 17, 2002, the entire disclosure of which is hereby incorporated by reference.

BACKGROUND OF THE INVENTION

Field of the Invention

The present invention relates generally to the modeling of a manufacturing system. More particularly, the present invention provides real time machine simulator ("RTMS") which allows the participation of the personnel (worker) in the modeling of the manufacturing system and its execution.

Simulation is defined as "the discipline of designing a model of an actual or theoretical physical system, executing the model on a digital computer and analyzing the execution output." In the simulation model the key elements of the real system which provide service are defined as resources. Resources present things like equipment and personnel. The behavior of resources including personnel in the simulation model is completely controlled by predetermined rules. The person (developer) who develops the simulation model sets these rules. Thus, the result of the simulation will be a solution emerged from the model constructed by the simulation developer (or developers) and the precision and speed of the computer.

Currently at universities across America and worldwide, thousands of industrial engineering professionals and systems analysts use computers to help simulate machine assembly lines, or other such machine operations, where the production of a whole group of machines and workers is dependent on the operation of each individual unit. In computer simulations of such a situation, the accuracy depends mainly on the programmer. The mock "worker" within the simulation program cannot use human creativity or ingenuity to perhaps improve his productivity or deal with situations as they arise. The worker cannot do provide inputs to the simulation model because the worker does not exist. Workers in computer simulations are merely numbers running through a processor. The user or observer of such a computer simulation is only able to change things "on the fly" to a small extent. The worker cannot tell the developer about problems the worker is having or about bottlenecks that are occurring. Also, it is often impossible for the worker to change his predefined behavior in mid-simulation. The simulator must typically must be reconfigured and run again.

Further, the typical computer model does not utilize the creativity and teamwork of the personnel used as a resource in the simulation model since they do not physically exist. In fact the personnel in the simulation model are nothing but zero-one variables traveling inside the computer circuit boards. The ultimate effort to give life to these personnel resulted in 3D animation presentation of them; however, they still have no power to participate in any decision making process during the development of the simulation model and its execution.

Accordingly, it is an objective of the present invention to provide a real time machine simulator ("RTMS") which allows the participation of the personnel (worker) in simulation modeling of a manufacturing system and its execution. It is another objective of the present invention to include human in the simulation modeling to represent workers in the simulation model of a manufacturing system, therefore, the simulation model benefits from human characteristics such as creativity, wisdom, experience, team work, etc. It is yet another objective to provide a simulation environment that is easier and faster to build, and more flexible to revise. It is further an objective of the present invention to provide a better visual representation of a manufacturing system than computer animation. Better visualization means better understanding of the real system and more opportunities for improvement.

The system of the present invention must also be of construction which is both durable and long lasting, and it should also require little or no maintenance to be provided by the user throughout its operating lifetime. In order to enhance the market appeal of the system of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the real time machine simulator (RTMS) of the present invention. With this invention, a tool or device is provided to allow the participation of the personnel (workers) in simulation modeling of a manufacturing system (e.g., fabrication, assembly, cutting, processing, production, etc.) and its execution. It is an effective tool that can be used during the development of a computer simulation of a manufacturing system. For example, workers who are following a predetermined rule in the RTMS simulation system might come up with new efficient rules to process the jobs or a batch. The inputs and feedback by the workers stem from the fact that the workers are a part of the simulation, personally experience the system, and are able to see the opportunities for improvement.

In one aspect, the RTMS of the present invention is a small device which represents machines used in manufacturing systems. The RTMS is configured to incorporate features of a typical machine. A computer and/or an operator (worker) control the RTMS. The RTMS contains three basic features: operation-related features, availability-related features, and quality-related features. The operation-related features include necessary operations often required in processing a job or batch on a machines. Operation-related features include loading operations, setup operations, processing operations, and unloading operations. Typically, a production cycle on a machine includes the above operations in the sequence of loading, setup, processing and unloading. Each operation takes time and is done automatically or manually by an operator (worker). A computer, connected to the RTMS, provides the software to operate the RTMS, and generates times (idle time and wait time) and signals for the RTMS to reflect the start or the end of each operation.

The availability-related features of RTMS refer to the time to failures and repair times of machines in a manufacturing environment. The machine failures may be time dependent or operation dependent. Time dependent failures may occur even when the machine is not being used. For example, time dependent failures may occur when the machine ages even when the machine is idle. The operation dependent failures, on the other hand, occur when machine is working. For example, operation dependent failures occur where the machine ages as the machine works or is in use. The time to the next failure (time dependent or operation dependent) is generated by the computer which stops the operations on the RTMS and signals for repair. The computer also generates the repair time of each machine. The repair operation on the RTMS starts as soon as a repairman becomes available. The repairman could be the same operator who is in charge of the machine, or another person who represents the repairman in the simulation model.

The quality-related features of the RTMS refer to the quality of produced items which can be defective or good. The defective items are scrapped or may require rework. The quality-related features are also controlled by the computer which signals if the next item produced is defective, scrapped or requires rework.

In another aspect, the present invention provides a simulation system which includes a simulation device representing a machine or process used in a manufacturing system for conducting machine simulation. The simulation device includes controls to allow the participation of an operator in simulation modeling of the manufacturing system and simulation modeling of the machine or process of the manufacturing system. The simulation device facilitates exploration of the effects of different policies that can be used by the operator to maximize the throughput of the manufacturing system.

The simulation system also includes a block representing a part being processed by the machine or process used in the manufacturing system. The simulation device includes a part fixture for receiving the block. The block includes a plurality of sub-blocks, allowing the block to be broken into sub-blocks to represent a manufacturing operation.

The simulation system also includes a processing unit that records the state of the manufacturing system. The processing unit records manufacturing information, the manufacturing information including the throughput of the machine, the idle time of the machine, and the number of the blocks waiting in a buffer of the machine. The processing unit is programmed to allow a user to define a system structure for the manufacturing system. The system structure includes parameters including the number of machines used in the manufacturing system, the number and/or size of buffers and the location of the buffers in the manufacturing system, the routing of items, and the probability distribution of loading, unloading, set up and processing times of each machine in the manufacturing system. The routing of items parameter defines the relationship between each machine in the manufacturing system and the buffers and defines the sequence of operations required for the block. Thus, a system structure and/or parameters generally characterize a member(s) of a system.

As can be seen, the system structure is independent of behavior of the operator, allowing for a plurality of policies to be simulated without changing the system structure. Thus, in an embellishment, the present invention provides a simulation system for exploring the effects of different policies used on machines in a manufacturing system by providing operator-assisted real-time simulation of the machines in the manufacturing system. The system includes a plurality of blocks representing parts being processed by the machines in the system; a plurality of simulation devices representing machines in the system for conducting machine simulation, the simulation devices including controls to allow the participation of an operator in real-time simulation modeling of the system, wherein the controls represent a plurality of generic stages of operation of the machines, the simulation devices including fixtures for receiving the blocks; a processing unit communicating with the simulation devices for generating operation times associated with the policies in response to interactions of the operator with the simulation devices, the processing unit including a user interface for enabling a user to input a system structure representative of the system; and, a hub communicating with the simulation devices and the processing unit for networking the simulation devices to the processing unit, the hub providing a plurality connection ports for the simulation devices and the processing unit to attach to. The user interface allows the user to selectively configure the simulation devices to simulate at least one stage of the stages of operation and to selectively configure the simulation devices to simulate a machine failure or to simulate the production of defective items.

In an RTMS system using the principles of the present invention, the mock machines (RTMSs) exist as a series of small boxes with buttons, lights, and switches. The workers benefit from characteristics exclusive to conscious beings, such as creativity, experience, and teamwork. These workers can improve a process as it happens because they are actively a part of the simulation. This stimulation environment will also be easier to build and more flexible than a computer simulation, as the physical "machines" actually exist apart from a computer, and the workers in the simulation have no limits or constraints on their behavior.

Further, the present invention provides a far superior visualization of the manufacturing system or cell under simulation. A better visual picture provides more insight into the way that the manufacturing system works and gives observers a better chance to improve the design of the manufacturing system or cell, thereby increasing, for example, the throughput of the manufacturing system.

The RTMS of the present invention simulates the operations on a machine in real time. In other words, if a loading operation takes five minutes in the real system, it also takes five minutes in the RTMS simulation modeling. However, a feature can be added to the computer software to move the simulation clock faster or accelerate the simulated manufacturing processes when there are no changes in the manufacturing system. For example, in a system simulation where three machines are processing items and the next processing operation will be completed in ten minutes (no events will happen in the next ten minutes), then the simulation clock can be pushed forward nine minutes. In other words, the next event will take place in 1 minute of real time. The accelerated time feature creates a simulation system in which the time flows faster than real time, and thus, a one-hour of executing the simulation might, for example, reflect twenty hours of real time. The high speed RTMS-simulation retains the advantages of the RTMS-simulation system and saves real time by moving the simulation clock ahead when there are no changes in the system.

The present invention also provides a method of conducting operator-assisted machine simulation to explore the effects of different rules used in a manufacturing or assembly system. The method includes the steps of: (a) providing at least one simulating device representing a machine in the system; (b) providing at least one block representing a part being processed by the machine in the system; (c) constructing a system structure for defining elements of the system, and relationships among the elements; (d) laying out the simulating device and the block in accordance with the system to be simulated; (e) providing an interface to allow a user to interface with a computer to define operational parameters for each of the simulating device; (f) defining a hypothesis policy for the operator to follow when simulating the system; (g) executing operations on the simulating device according to the hypothesis policy; and (h) recording changes in the simulating device and transmitting the changes to the computer. The method also includes the step of defining a further hypothesis policy, and repeating steps (g) and (h) using the further hypothesis policy without changing the system structure.

In yet another aspect, the present invention provides a real-time machine simulator representing a machine in a manufacturing system for conducting real-time machine simulation. The machine simulator includes a block representing a part being processed by the machine; a housing having an inner compartment and an access opening providing access to the compartment; a fixture located within the compartment for receiving the block, the fixture allowing loading and unloading of the block; a control panel located on the housing, the control panel including a first plurality of indicators for indicating machine states, including machine error and generic stages of operation of the machine, and a second plurality of indicators for indicating a condition of a part; a plurality of controls for simulating a plurality of machine operations; and a microcontroller for receiving inputs from the controls and for controlling the indicators on the control panel. The real-time machine simulator also includes a block swapping mechanism, including at least one magazine tower for dispensing blocks and at least one actuator for facilitating the replacement of the block during the processing operation of the machine.

In one aspect, the control panel of the RTMS of the present invention is designed to replicate the Computer Numerical Control ("CNC") setting box on a modern machining device. In addition to incorporating the operation, availability, and quality-related features of a machine, the control panel includes a digital set up mode which allows the user to "set" the machine to a certain level. The computer, which is connected to the RTMS, delivers a number to be displayed as a target value. The user then "adjusts" the settings via a rocker switch to match the target value as is determined by the computer to guarantee that the delay is appropriate for the analysis program. Once the actual number reached the target value, the machine will advance to the processing state.

During the processing state of the RTMS, the user can actuate momentary switches (e.g., a lever) on the control panel to simulate manufacturing operations.

In a configuration with a switch module, the user presses a button to start the processing state in the process. Having the processing button as a separate module allows the module to be placed in the same location where the processing is done in the operation being simulated assuring that the operator is following the same movements as in the normal operation.

The RTMS of the present invention further includes a loading and unloading module. The loading and unloading module replicate the actions of placing a part in a tool for processing and removing the part after processing. For example, a lever may be implemented to actuate a separate momentary switch to simulate loading and unloading conditions. When the loading button is actuated, a signal is sent to the computer. The computer then returns a signal (after a prescribed time) to actuate a clamp that can appear to hold the part.

After the user has cycled through a production cycle, the loading operation is reversed. The user holds the lever in the reverse position and after the computer returns a signal, the part is released allowing the user to remove the part.

Another module that is implemented with the RTMS of the present invention is the feedback module. One thing that is important to the believability of a simulation is the sound and vibration of machine processes. Auditory and passive feedback allows the user to react more naturally to phase changes in machinery in a production cell. The feedback module contains the apparatus needed for the auditory and passive feedback. The module contains buzzers and warning devices based on a recording of motor sounds, and a vibrator.

A material handling Module may also be incorporated with the RTMS of the present invention. A material handling module allows the appearance of progress in the production cell. The material handling module replaces the part during the processing state with a part that would be appropriate for the next step in the process. The material handling module collects the first part and replaces the first part with acceptable parts or parts that need to be scrapped or reprocessed.

It may therefore be seen that the present invention teaches a machine simulator including a plurality of buttons representing different generic stages of a machine operation, the buttons representing at least a loading stage, a processing stage, and an unloading stage associated with the machine; an automatic option to allow a user to designate at least one of the stages as automatic; a manual option to allow the user to designate at least one of the stages as manual; a faulty option for enabling the machine simulator to produce defective items; and a failure option to allow the user to enable the machine to fail for the duration of a repair time which is based on a predefined probability distribution. Using these features, the present invention allows engineers, managers or operators to conduct operator-assisted machine simulation to explore the effects of different rules in a manufacturing system.

The system and/or device of the present invention is of a construction which is both durable and long lasting, and which will require little or no maintenance to be provided by the user throughout its operating lifetime. The system and/or device of the present invention are also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 24 is an illustration of the pin breakdown of the microcontroller 528 used in the present invention;

FIG. 27 is a byte breakdown of the state variable;

FIG. 28 is a table of the variables used in the RTMS software;

FIG. 29 is a byte breakdown of the initialization of the RTMS;

FIG. 30 is a table of the times vector breakdown;

FIG. 31 is a table showing the message codes that the RTMS can transmit to the computer;

FIG. 34 is a table of the files used in building the software for the RTMS and a description of the basic functionality of the files;

FIG. 41 shows samples of the log file output and Queue log file output.

DETAILED DESCRIPTION OF THE PREFERRED EMBODIMENT

Figure 1:
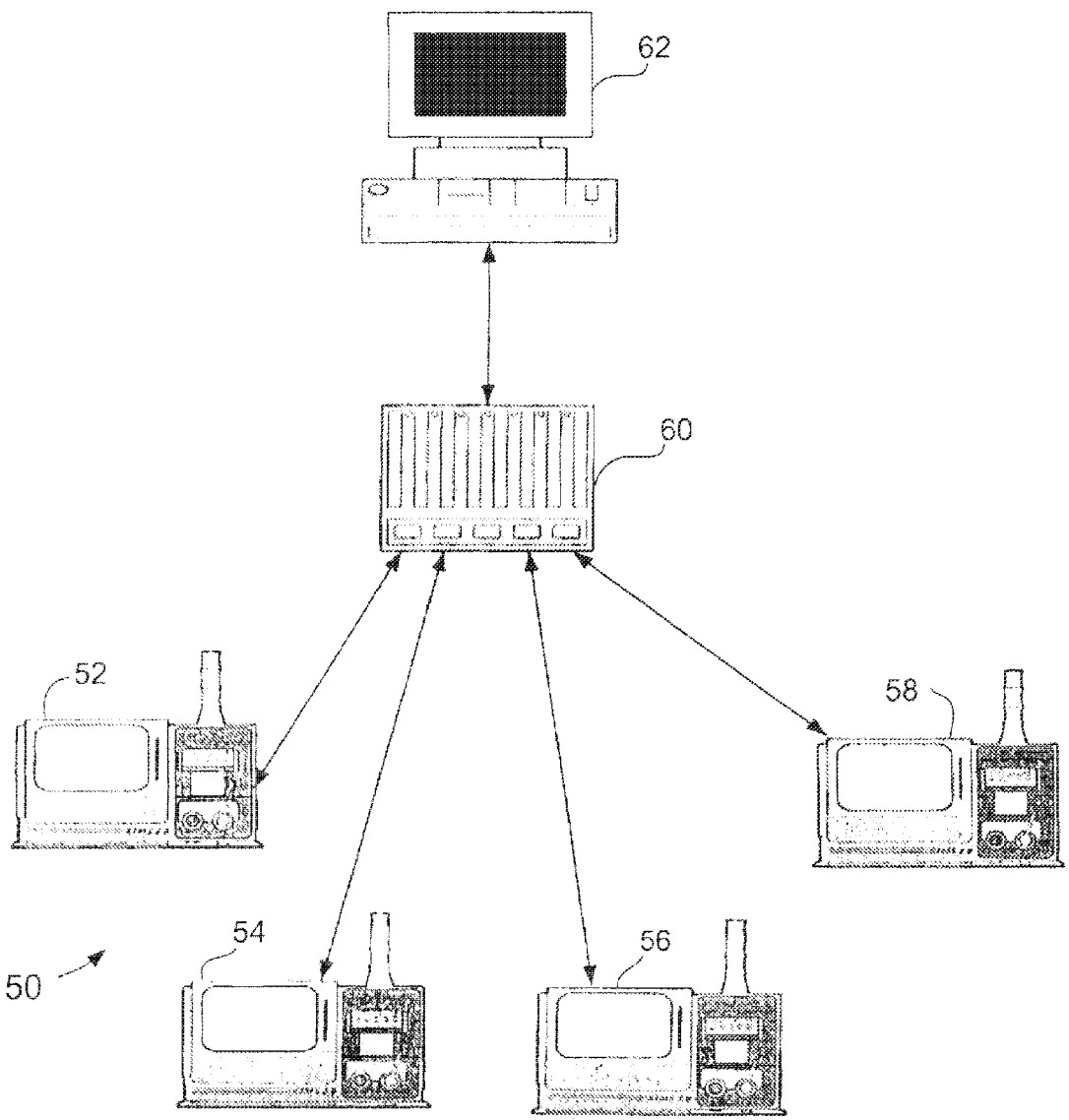
FIG. 1 is a simplified block diagram of a RTMS system in accordance with the principles of the present invention.

The preferred embodiment provides a real time machine simulator ("RTMS") system that allows the participation of the worker in the modeling of the manufacturing system. The two major commercial applications of the RTMS-simulation system of the present invention are industry and colleges and universities.

Most companies have a team of experts who are in charge of productivity improvement of their production systems. The RTMS-simulation system is an efficient tool which can be used in the process of design, performance analysis and productivity improvement of most of the manufacturing systems in which workers play the key role in the production process.

On the other hand, colleges and universities which offer programs such as Industrial Engineering, Manufacturing Engineering, Masters in Business Administration ("MBA"), and so on are developing laboratories for courses in production planning, scheduling and operation management. The RTMS-simulation system is a perfect tool which can be used in teaching and research. It provides students with better understanding of the concepts and techniques discussed in the lectures; and also allows them to design a production system and improve its performance by examining different structures and policies through RTMS-simulation system.

Such a simulation environment has several possible user types. The first is the educational user, for example, an industrial engineering professor at a college or university. The professor uses the simulation environment for two reasons. First, the professor uses the simulation environment for research into improving efficiency for industrial production. This environment is a welcomed change from the classical computer simulation, for the reasons stated earlier. Second, as an educational tool, this environment provides an interactive, visual, and hands-on tool that is preferable over computer simulation when teaching a group of students.

The second type of user is the professional user. The professional user includes systems analyst or equivalent, either employed by a large company or freelance. The professional user uses this tool for three reasons. First, with the human factor incorporated in to the analysis, the present invention is preferable over computer simulation. Second, the present invention provides a better means of demonstrating the simulation. If, for example, the systems analyst developed a better method of managing the assembly line, then the user can make a better case to the management of the plant by actually bringing a small version of the assembly line for demonstrations. Finally, it provides a system for garnering feedback from workers. Consider, for example, that workers on the assembly line are complaining about a particular inefficiency in the manufacturing system. Using the present invention, the assembly line can be replicated and workers can work through the simulation on their own (impossible with a computer) to help identify better manufacturing policies.

Briefly, as will be described, to carry out a simulation, the operator uses the layout step to design the cell characteristics and layout and configure the system structure as desired, selecting the number of machines, the number of buffers, for example. This layout is effected physically, by appropriate placement of RTMSs with buffer spaces, providing the appropriate number of blocks representing parts to be processed by a machine, and/or by supplying appropriate information to the computer 464 via the GUI interface.

The operator uses the setup step to enter simulation parameters, such as whether functions or operations, such as loading and unloading, will be simulated as being carried out manually or automatically. In addition, the operator can also enter the probability distribution for the stages of operation of the machine being simulated. For example, the loading stage follows a normal distribution In which the operator enters the average time and standard deviation for the load time. It is apparent to one skilled in the art that these parameters (which may also be a part of the system structure) can be deterministic. These parameters determine the characteristics or behavior of a machine in a manufacturing system. Further, the operator or a person supervising the simulation defines a hypothesis policy to be followed when operating the RTMS to simulate the policies and/or rules of a manufacturing environment. It is apparent that elements of the system structure, parameters, and policies may overlap or are dependent upon each other. Thus, one skilled in the art recognizes that the simulated manufacturing system dictates the elements and dependencies of the system structure, parameters, and policies.

Then, the operator initiates the simulation process by, for example, loading a block into the simulator according to the hypothesis policy. During the simulation, various conditions and "requirements" necessitating operator intervention are presented to the operator under the control of the computer which lights various indicators and/or actuates various auditory devices. In addition, the computer lights indicators to indicate the status of the simulation process. In response to these indications, the operator is required to perform various operations, including manually loading and unloading parts (represented by the blocks) and operating switches or levers, with the response times for the operator being monitored by circuits of the RTMS. During the simulation, the computer 62 (or 464) records all the changes in the system and those changes, (e.g., time data or times) are transmitted to the computer 62.

While the RTMSs perform basic monitoring, timing and communicating functions, the computer 62 is the controlling element and the computer tracks elapsed times due to operator actions as well as preset times (e.g., a preset processing time) established by the preselected system "structure" for the simulation process to produce simulation results. Also, as described herein, the simulation system (as executed by the computer 62) can introduce obstacles, such as part failures, or a requirement to rework a part that has been processed.

When the simulation stops, the total number of items completed by the system represents the throughput of the system during the simulation time. When the simulation has been completed, the operator can view the results of the simulation and, if desired, change the policies (e.g., add, delete or revise instructions for the operator to follow) and repeat the simulation using the same system structure and/or parameters.

RTMS System Overview

Referring first to FIG. 1, there is shown a simple setup of a RTMS system 50 of the present invention with several key components. The system includes a plurality of RTMSs 52, 54, 56 and 58, a "serial hub" 60 (the "box") and a computer 62. All of the machines (RTMSs 52, 54, 56 and 58) are networked to the computer 62 through the box 60 which may be interconnected with other networks and contain subnetworks of other RTMS and devices. The computer provides control and simulation functions using input data provided by the RTMSs 52, 54, 56 and 58 via the box 60. The RTMSs 52, 54, 56 and 58 and the box also include microcontrollers for controlling selection of simulation parameters and for controlling communications between the RTMSs 52, 54, 56 and 58 and the computer 62. The length of each stage, the failure interval, and whether or not the next item to be produced will be defective or not are all determined by the computer 62. The user inputs parameters into the computer 62 at the beginning of the simulation. The computer 62 generates random numbers based on these inputs, and communicates the results electronically to each RTMS, instructing the RTMSs 52, 54, 56 and 58 how long stages last, when to fail, and when to produce a defective item. The RTMSs 52, 54, 56 and 58 transmit signals to the computer 62 indicative of the operator pushing or letting go of a button or flipping one of the process switches or levers.

First, RTMSs, 52, 54, 56 and 58 have several buttons (not shown in FIG. 1) to select different generic stages of machine operation—stages such as "loading item" and "processing item." A worker (not shown in FIG. 1) is signaled, for example, by a flashing light when these stages are to begin. In addition, each of these stages can be made to be a "manual" operation stage, or an "automatic" operation stage. For example, in one embodiment, manual stages require the worker to press and hold a button (or lever) for the duration of the stage. In another example, manual stages require the worker to perform functions on the RTMS that simulate the manual operation of a machine, such as pushing a lever to lock a part. On the other hand, an automatic operation may, for example, require the user to press and release a button only once, leaving the RTMS to complete the stage on its own and the worker is free to attend to other processes.

The machine also has the ability to simulate fault in several ways. First, the RTMS includes a switch (and/or a preset routine within the software that operates the RTMS) that enables the machine being simulated to produce defective items as a fraction of the total items produced specified by the user. These defective items must either be thrown out or redone. A further switch (and/or a preset routine) enables machine failure, so that after a given interval, the RTMS becomes "broken." This requires the designated "repairman" on a mock team of workers to go to the RTMS and press a "repair button" to effect the simulation of a repair operation. The "repair button" can be located inside the RTMS to simulate the opening and repairing of a machine. After the repair time is finished, the RTMS once again becomes operable.

RTMS Simulation Model

Figure 2:
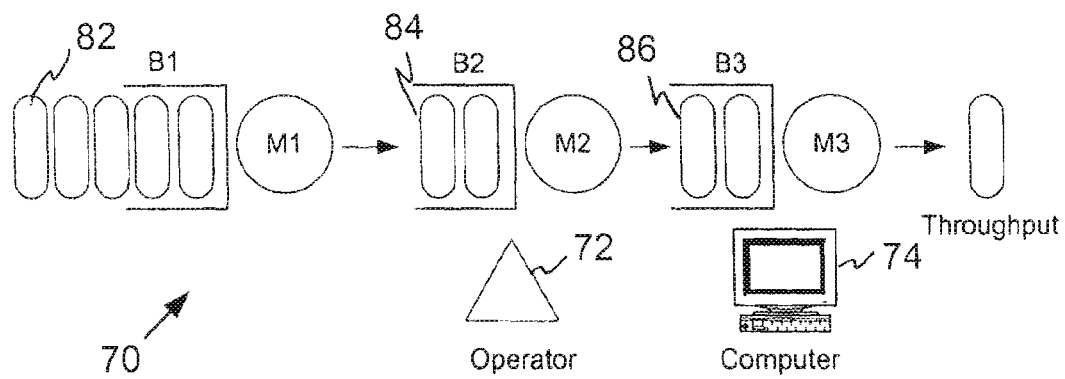
FIG. 2 is a block diagram demonstrating one possible set up and use of the RTMS of the present invention.
Figure 3:
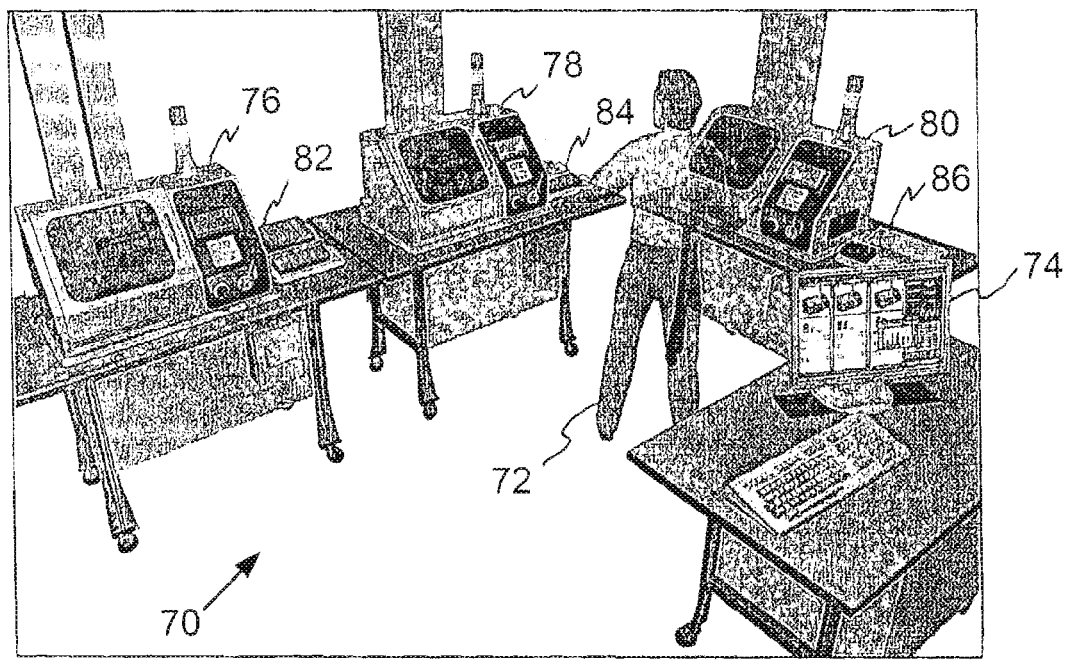
FIG. 3 is a graphical representation of the block diagram of FIG. 2.

Referring now to FIGS. 2 and 3, there are shown illustrations of how the RTMS of the present invention is utilized in a system simulation modeling. FIG. 2 is a block diagram with a machine cell 70 with three machines (M1, M2 and M3), one operator 72 and a computer 74. Similarly, FIG. 3 is a graphical illustration of the block diagram of FIG. 2. FIGS. 2 and 3 illustrate how the RTMS of the present invention can be used to perform a simulation study. For example, a production system (or machine cell 70) consists of three machines, designated in FIG. 2 as M1, M2 and M3, and as 76, 78 and 80, respectively in FIG. 3. There is only one operator in charge of these machines. To simulate a manufacturing environment, items are required to be processed on machines M1, M2, and then M3. There are items located in buffer B1 and in front of machine M1 to start the operations. There is a buffer B2 (buffer 84 of FIG. 3) between the machine M1 and M2 and a buffer B3 (buffer 86 of FIG. 3) between the machine M2 and M3. The items completed on the machine M1 are stored in buffer B2 for the next operation on the machine M2. Likewise, the buffer B3 stores the items for the next operation on the machine M3. The operations required for processing an item on a machine include loading, processing and unloading. In this example, the loading and unloading are performed manually by the operator; however, the processing operation is automatic and only requires the operator to initiate the processing operation.

The example shown in FIGS. 2 and 3 allows the user to explore the effects of different policies which can be used by the operator in order to maximize the throughput of a manufacturing system. The term policy refers to a set of decisions (rules) which may, for example, specify which operation on which machine must be performed next by the operator (sequence of events). For example, consider the case where the machine M2 finishes processing of an item while the operator is in the middle of a loading operation on the machine M1. Using the present invention, the operator can determine whether it is a good decision (policy) to interrupt the loading operation on the machine M1 and start the unloading operation on the machine M2.

Thus, the present invention allows for the testing and study of hypothesis policies. In other words, the present invention allows the user to develop a tentative assumption (the hypothesis policy) in order to draw out and test the logical or empirical consequences of the hypothesis policy to develop improvements to the system being simulated. The hypothesis policy or assumption can be as little as instructing the operator to use the machine without any further instructions. For example, in the case where the policy is unknown or the machine or process is new, the present invention can be use to develop a policy and, if desired, to test and re-test the developed policy.

The present invention allows for the investigation of different policies by simulating the system and analyzing the throughput. In order to simulate this system using RTMS, three RTMSs are require to represent three machines, blocks to be used as items and one volunteer to be the operator, as shown in FIGS. 2 and 3. In addition, a computer 74 monitors, measures, and calculates the loading, unloading and processing times of each machine and also to record the state of the system and necessary information such as number of throughput, the idle time of machines, number of items (blocks) waiting in the buffer of each machine and etc.

The simulation model which uses RTMS is developed through five main steps: the system structure step, the layout step, RTMS set up step, the policy definition step, and the simulation step.

In the system structure step, the system structure for a system to be simulated is defined for the computer 74. In other words, the elements of the system (such as the number of machines, the number of buffers and the number of operators) and the relationships among the elements (such as how items are routed) are predefined. More specifically, the user defines, for example, (1) the number of machine used in the system; (2) the number (and/or size) of buffers and their locations; (3) the routing of the items which specifies the relationship between machines and buffers and the sequence of operations required for each item; (4) the probability distribution of loading, unloading, setup and processing times on each machine; and (5) the data which must be recorded during the simulation. A software program which operates the RTMS controls these system structures. The program is connected to RTMSs in order to control the simulation as well as record all changes caused by actions of the operator in the system.

In the layout step, the system is laid out according to the system structure and the manufacturing environment.

In the setup step, the RTMSs are set according to the system structure and manufacturing environment via machine parameters. For example, if the model simulation does not consider machine failures and defective items, switches, such as a defective control switch 92 and a failure control switch 94 for RTMS 90 must be in the "off" position (FIG. 4) or the user can specify the parameters (or system structure) via a graphical user interface ("GUI") operated by a software program controlling the RTMS. Furthermore, if the operation on each machine only consists of loading, unloading and processing, control switches, such as control switches 98, 110 and 106, respectively, (FIG. 4) must be in "on" position and control switch 102 (the setup control) in "off" position. If the processing times are the only automatic operations, then the loading control switch 96 and the unloading control switch 108 must be in the "manual" position and the processing control switch 104 must be in the "automatic" position. Alternatively, these manual control keys or switches may be replicated by a GUI allowing the user to select the system structure and/or machine parameters to be simulated.

In the policy step, a policy for the operator to follow is defined. For example, the operator can follow a priority policy, use his or her intuition to develop a policy, or modify a policy "on-the-fly." Referring to FIG. 2, according to a priority policy, the operator must interrupt the loading or unloading operations on the machine M1 when the machine M2 or the M3 requires the operator's attention (the machine M2 or the machine M3 finishes processing an item). Furthermore, the operator must interrupt the loading or the unloading operation on the machine M2 when the machine M3 requires the presence of the operator (the machine M3 finishes processing an item). Another example can be First-Come-First-Serve ("FCFS") policy. According to a FCFS policy, the operator does not interrupt any operations and the operator's next action is to perform the operation on the machine with the longest waiting time for the operator's attention.

Because of the flexible use of policies within the simulation system of the present invention, the policy determination step can also be expanded to determine operational rules and/or policy which, for example, promotes just-in-time manufacturing and/or supply chain management. Thus, the testing, study, and re-testing of different policies can help companies to eliminate sources of manufacturing waste by producing the right part in the right place at the right time.

The simulation step initiates the simulation. During the simulation, the computer 74 records all the changes in the system. Data regarding those changes are transferred from the RTMSs (M1, M2 and M3 or 76, 78 and 80, respectively) to the computer 74. For example, when the operator 72 releases an unloading button 134 (FIG. 4) or retracts a lever 174 (FIG. 8) on the machine M2 (FIG. 2), an unloading light 132 (FIG. 4) or an unloading light 202 (FIG. 10) is turned off by the computer, thereby signaling that the operation of one item is completed on the machine M2. Thus, the computer 74 adds one item to a virtual buffer corresponding to the operator removing the block from the machine M2 and putting the block in the buffer B3. In another example, when the machine M1 finishes processing an item, the computer 74 starts flashing the unloading light 132. At this time, the computer 74 starts to record the waiting time of this machine for its unloading process. When the operator becomes available to unload the machine M1 and pushes an unloading button 134 (FIG. 4), a signal is sent to the computer 464 which indicates that the machine M1 is no longer waiting for the operator.

Each time an unloading operation in the machine M3 is completed (as signaled by release of the unloading button 134 on the machine M3 by the operator), the computer 74 increments a counter that indicates the number of items completed by the system (the throughput of the system). When the simulation stops, the total number of items completed by the system represents the throughput of the system during the simulation time.

As can be seen, the three-machine one-operator example (FIGS. 2 and 3) shows the flexibility of the simulation modeling of the RTMS of the present \invention. For example, after the simulation is done and an approximation for the throughput of the system under a policy, for example, priority policy, is obtained, another simulation to evaluate the performance of the FCFS policy can be immediately performed without, any changes in the setup of the system. The only necessary change is to instruct the operator to follow the FCFS policy. In other words, the system setting is independent of the operator behavior, and therefore, different policies can be examined using the same system setting. This is impossible in computer simulation models in which any changes in the worker's behavior (policy) require a revision in the simulation model, such as the system structure and/or the parameters.

Another advantage of the RTMS-simulation over computer simulation is that RTMS-simulation allows more human creativity in the simulation process. For example, suppose that the policy that operator must follow during the simulation is unknown (no policy). In this case, an RTMS-simulation is initiated in which the worker follows his intuition and experience during the simulation. As the simulation goes on, the worker and the user who are watching gain more insight about the dynamics of the system, and thus, can derive and formulate different or new policies and/or improve the policy currently being used by the operator. Thus, the present invention can help develop a policy where none exists. As can be seen, the RTMS-simulation provides a better visualization of the system and also allows the decision-makers and the program developers to become a part of the simulation model.

RTMS Overview

Figure 4:
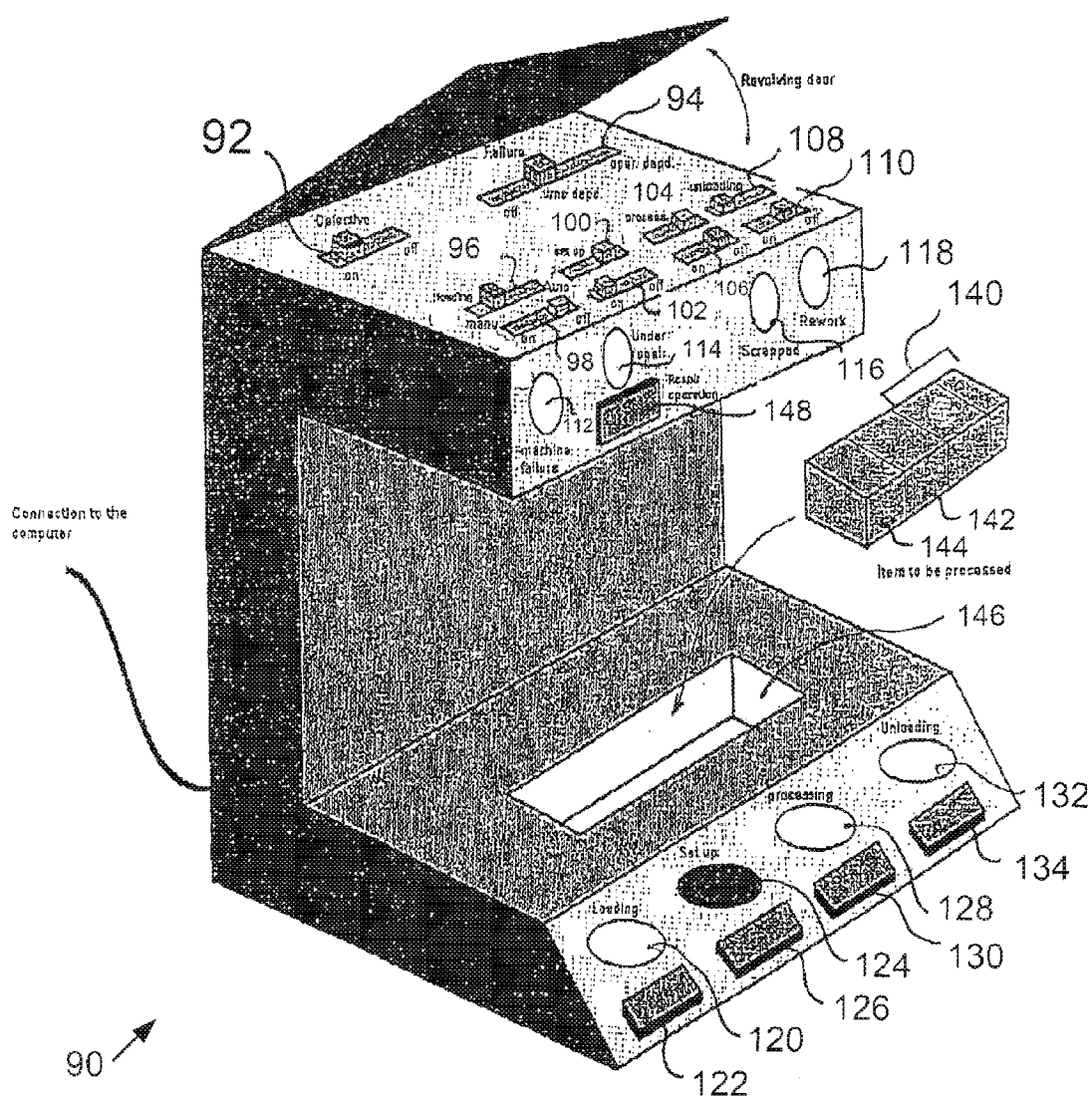
FIG. 4 is a perspective view of a simulating device incorporating the features of the present invention.

Preferably, the RTMS of the present invention includes the following components: a loading control component to simulate the loading operations of the machine; a setup control component to simulate set up operations of the machine; a processing control component to simulate the processing operations of a machine; an unloading control component to simulate the unloading operations of the machine; a defective control component to simulate whether the machine produces defective items or not; and a failure control component to simulate the availability of the machine being simulated. These control components are shown in FIG. 4 to be manually operated components. Alternatively, all or some of the control components can be operated or selected from a computer screen or a touch screen. Further, these control components can be located "internally" or "externally" on the RTMS. Thus, the appearance of the RTMS can take many forms and embodiments, two of which are discussed below.

Referring to FIG. 4, there is shown an embodiment of a RTMS 90 incorporating the features of the present invention in which the system structure of the manufacturing system is manually selected through a series of switches that set the operating conditions for the simulation modeling.

The RTMS 90 includes: a defective control switch 92; a failure control switch 94; loading control switches 96 and 98; setup control switches 100 and 102; process control switches 104 and 106; and unloading control switches 108 and 110. The RTMS 90 also includes signaling lights 112, 114, 116, 118, 120, 124, 128, and 132, which may change colors, such as from green to red, to indicate the state of the machine. These signaling lights are turned on and off by the computer 62. Further, the RTMS 90 includes feedback buttons, such as repair button 148 loading button 122, set up button 126, processing button 130, and unloading button 134, providing feedback signals (e.g., idle time or the time it takes the operator to press the appropriate button) to the computer 62 (FIG. 1) for calculating the idle time and throughput of the simulation machine or system.

As can be seen, the RTMS 90 represents a machine processing a part which is represented by blocks 140, 142 and 144. The block 140 and blocks 142 and 144 can be attached together to represent operations such as assembly or the block 140 can be broken into smaller sub-blocks to represent operations such as cutting (disassembly). To initiate the simulation process, the block 140 is placed in a cavity 146 by the operator and the sequence of machine operations starts. In this embodiment, the RTMS 90 does not perform an actual operation on the block 140. The block 140 remains in the cavity 146 during simulation of loading, setup, processing and unloading operations.

The defective control switch 92 selectively enables the simulation of defective items produced by the machine. The defective control switch 92 controls whether the machine (the RTMS 90) simulates production of defective items or not. When the defective control switch 92 is in "off" position, the RTMS 90 does not produce defective items and all produced items can be used in the next operation. However, if the defective control switch 92 is in "on" position, each time the RTMS 90 finishes processing of a job, the RTMS 90 transmits a signal to the computer 62 (FIG. 1) indicative of whether the produced item is good, scrapped or requires rework. This is controlled by the computer 62 (FIG. 1) which already has information about the percentage of good, scrapped and rework-required items produced by the machine. Thus, if the produced item is scrapped, the light 116 flashes red, indicating that the item produced is scrapped. If the produced item requires rework, the light 118 flashes red which means the produced item requires rework. If neither the light 116 nor the light 118 is flashing, then the produced item is a good item.

The failure control switch 94 selectively enables the simulation of a machine failure. The failure control switch 94 controls the availability of the machine being simulated by the RTMS 90. If the failure control switch 94 is in "on" position, the machine never fails, and therefore, repair operations are never required. If the failure control switch 94 is in "time depend" position, then the computer 62 generates a time to represent the time to the next failure according to the time dependent failure routine. For example, if the computer 62 generates time to failure t=10 minutes, the machine will fail after 10 minutes even if it is not being used. When machine fails, the light 112 flashes red and the light 112 will not stop flashing until a (mock) repairman pushes the repair button 148. When the repair button 148 is pressed, the light 112 stops flashing and instead the under repair light 114 shows green which indicates that the machine is under repair. The computer 62, according to a predefined distribution, generates the repair time. If the repair time is one minute, for example, then after one minute, the under repair light 114 is turned off by the computer 62 and the machine is ready to resume its operation.

Loading control switches 96 and 98 control the selection of loading operation. Loading control switches 96 and 98 control the loading operations of the machine being simulated by the RTMS 90. If the loading control switch 98 is in "off" position, then the loading operation is excluded from the machine operation. In other words, the loading time is set to be zero. However, if the loading control switch 98 is in "on" position, then the loading operation becomes a part of the production cycle on the machine. If the loading control switch 96 is in "manual" position, this indicates that the loading operation is a manual job that requires the presence of an operator during the loading. In manual loading operation, when the loading light 120 is flashing red (which means the machine is ready for loading), the operator must push the loading button 122 which makes the loading light 120 green. The operator should not release the loading button 122 until the computer 62 turns off the loading light 120, indicating that the loading operation is completed. After loading operations are completed, the setup light 124 starts flashing red to indicate that the machine is ready for the setup operation.

If the loading control switch 96 is in the "auto" position, then the loading operation becomes automatic and only requires the operator to initiate the loading operation by momentarily pressing the loading button 122. The presence of the operator is not necessary during automatic loading operation and the operator can leave the machine (the RTMS 90) after the loading button 122 has been pressed. When the loading button 122 is pressed, the computer 62 generates a loading time and the loading light 120 stays green until the end of the loading time, whereupon the loading light 120 is turned off and the setup light 124 starts flashing red which indicates that the machine is ready for the next operation, the setup operation.

Setup control switches 100 and 102 control the selection of set up operations. Process control switches 104 and 106 control the selection of process operations. Unloading control switches 108 and 110 control the selection of unloading operations. Setup control switches 100 and 102, processing control switches 104 and 106, and unloading control switches 108 and 110 function similarly to the loading control switches 96 and 98, as described above. More generally, each setup, processing, and unloading operation has two switches: a first switch (98, 102, 106 and 110) for enabling the operation to be simulated by the RTMS 90 and a second switch (96, 100, 104 and 108) for selecting whether the operation to be simulated by the RTMS 90 is automatic or manual. Manual operation requires the operator to hold the respective button (126, 130 and 134) after the respective light flashes (124, 128 and 132) for the duration of the operation. Automatic operation requires the operator to press and release the buttons (126, 130 and 134) only once, leaving the RTMS 90 to complete the operation on its own.

Turning back now to the machine failure signal of the RTMS 90 of FIG. 4, the flashing red light 112 represents a machine failure. When the machine fails it cannot perform any operations and the light 112 flashes until the repair button 148 is pressed to start the machine repair.

When the repair button 142 is pressed, the under repair light 114 shows green, indicating that the machine is under repair. The repair time is generated by the computer 62 and the under repair light 114 stays green until the end of the repair time.

Referring now the scrapped signal, when the scrapped light 116 flashes red, it means that the produced item (the block 140 currently on the RTMS 90) is a scrapped item and must be discarded.

Turning next to the rework signal of the RTMS 90, when the rework light 118 flashes red, it means that the produced item (the block 140 currently on the RTMS 90) is an item which requires a rework on the same machine or in another machine. Thus, when the rework light 118 is flashing, the item (the block 140) must be sent to the next required process (e.g., another RTMS) for rework.

Referring now to the repair operation buttons of the RTMS 90 of FIG. 4, when the time to failure generated by the computer 62 elapses, the light 112 flashes red which indicates the machine has failed. The light 112 will continue to flash until a repairman becomes available. When the repairman arrives, the repair must pushes the repair button 114 which signals the computer 62 to generate a repair time according to a predefined probability distribution. The RTMS 90 then stays in "under repair" condition until the repair time elapses, whereupon the under repair light 114, which is green, is now turned off, indicating that the machine is repaired and ready to continue its work.

The RTMS 90 includes the cavity 146 (which may also be a part fixture of a part holder) for receiving the part represented by the block 140. As mentioned before, no actual physical operations are performed on the block 140. The block 140 simulates situations where parts are involved with different operations on a machine. In other words, block 140 represents Work-In-Process (WIP) in a manufacturing system.

Turning next to the loading signal, when loading light 120 flashes red, the RTMS 90 indicates that the machine has finished the unloading operation of a previous item and the machine is ready for the loading operation of the next item. When the loading light 120 shows green (after the loading button 122 is pressed), the RTMS 90 is indicating that the loading operation is currently being performed on the machine. The computer 62 turns off the green light 120 as soon as the loading time generated by the computer 62 elapses. After the loading light 120 is turned off, the setup light 124 starts to flash red, indicating that the loading operation is finished and the machine is ready for the setup operation.

Referring still to FIG. 4, when the loading light 120 is flashing, which indicates that the machine is ready for the loading operation, the operator must push the loading button 122 which makes the loading light 120 show green. If the loading switch 96 is in "manual" position, the operator should not release the loading button 122 until the loading light 120 is turned off by the computer 62 which indicates that the loading operation is completed. If the loading switch 96 is in "automatic" position, then the operator can leave the machine after pushing the loading button 122. This refers to the cases where the loading operations require the presence of an operator to initiate the loading. The remainder of the operation is performed automatically by the machine.

Referring next to the setup signal, when the setup light 124 flashes red, the RTMS 90 is simulating that the machine is ready for the set up operation. When the setup light 124 shows green (after the setup button 126 is pressed), the RTMS 90 indicates that the set up operation is currently being performed on the machine. The computer 62 turns off the green light 124 as soon as the set up time generated by the computer 62 elapses. After the setup light 124 is turned off, a processing light 128 starts to flash red, indicating that set up operation is finished and the machine is ready for the processing operation.

When the setup light 124 is flashing, which indicates that the machine is ready for the set up operation, the operator must push the setup button 126 which makes the setup light 124 shows green. If the set up control switch 100 is in "manual" position, the operator should not release the setup button 126 until the setup light 124 is turned off by the computer 62 which indicates that the set up operation is completed. If the set up control switch 100 is in "automatic" position, where the set up operations require the presence of the operator to initiate the set up, then the operator can leave the machine after pushing the setup button 126 and the machine automatically performs the rest of the operation.

Referring still to FIG. 4, the processing signal is activated when the processing light 128 flashes red, indicating that the machine has finished the set up operation of the item and it is ready for the processing operation. When the processing light 128 shows green (after the processing button 130 is pressed), the RTMS 90 is indicating that the processing operation is currently being performed on the machine. The computer 62 turns off the green light 120 as soon as the processing time generated by the computer 62 elapses. After the processing light 120 is turned off, the unloading light 132 starts to flash red, indicating that the processing operation is finished and the machine is ready for the unloading operation.

When the processing light 128 is flashing, which indicates that the machine is ready for the processing operation, the operator must push the processing button 130 which makes the processing light 128 become green. If the processing control switch 104 is in "manual" position, the operator should not release the processing button 130 until the processing light 128 is turned off by the computer 62 which indicates that the processing operation is completed. If the processing control switch 104 is in "automatic" position, where the processing operations require the presence of an operator to initiate the processing, then the operator can leave the machine after pressing the processing button 130 and the machine automatically performs the rest of the operation.

Turning next to the unloading signal of the RTMS 90, when the unloading light 132 flashes red, the RTMS 90 is indicating that the machine has finished the processing operation of the item and it is ready for the unloading operation. When the unloading light 132 shows green (after the unloading button 134 is pressed), the RTMS 90 unloading that the unloading operation is currently being performed on the machine. The computer 62 turns off the green unloading light 132 as soon as the unloading time generated by the computer 62 elapses. After the unloading light 132 is turned off, the loading light 120 starts to flash a red light which means that the unloading operation of this item is finished and the machine is ready for the loading operation of the next item.

When the unloading light 132 is flashing, which indicates that the machine is ready for the unloading operation, the operator must press the unloading button 134 which makes the unloading light 132 become green. If the unloading control switch 108 is in "manual" position, the operator should not release the unloading button 134 until the unloading light 132 is turned off by the computer which indicates that the unloading operation is completed. If the unloading control switch 108 is in "automatic" position, where the unloading operations only require the presence of an operator to initiate the unloading, then the operator can leave the machine after pressing the unloading button 134 and the machine automatically performs the rest of the operation.

Figure 5:
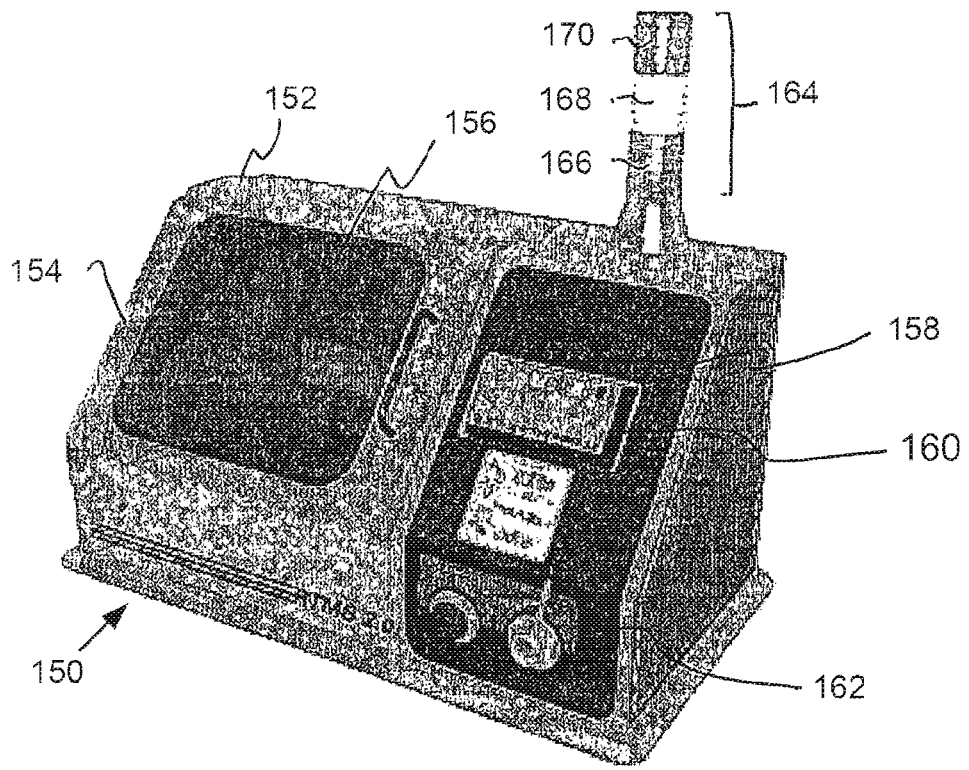
FIG. 5 is a perspective view of a second simulating device in accordance with the present invention.

A second configuration of an RTMS (RTMS 150) according to the principles of the present invention is shown in FIG. 5. In this embodiment, the selection of the system structure or the machine process is not controlled by the RTMS 150. Instead, the selection of the system structure is provided for by a graphical user interface ("GUI") of the computer 62 (FIG. 1) which allows the user to select the inputs for the system being simulated. For example, using the GUI, the user inputs or selects options representing machine failure, defective items, automatic loading, etc. In addition, the some of the feedback buttons, as described in FIG. 4, are integrally incorporated into the operation of the simulating device of FIG. 5. For example, the loading button 122 and the unloading button 134 of FIG. 4 is replaced by a lever 174 which is actuated to represent loading and unloading operations (as shown in FIG. 8).

Figure 6:
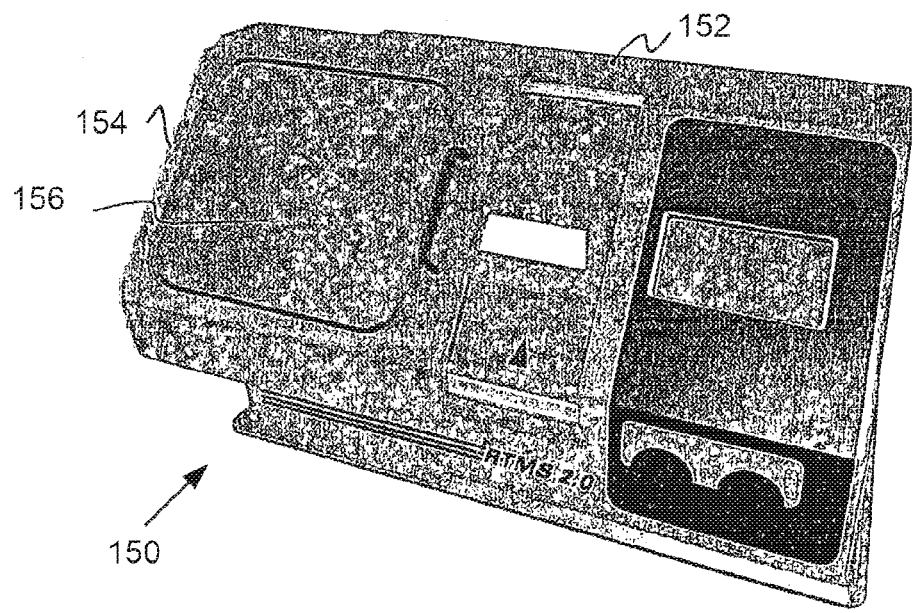
FIG. 6 illustrates the sliding door feature of the simulating device of FIG. 5.

In the RTMS configuration of FIG. 5, the machine case 152 is intended to simulate a modern machine center albeit much smaller. Inside the machine case 152 are the parts necessary to replicate the machining of the part (such as a block), a machine center 172 (FIG. 7) and a partholder fixture 170 shown in FIG. 8. The machine case 152 has a sliding door 154 (shown in FIG. 6 in the open position) to give the feel of using a real machine. With the sliding door 154 closed and the interior light on (not shown), the user is able to see the part swapping operation through a glass window 156 of the sliding door 154. The machine case 152 also includes a control panel 158 including a part condition and machine state monitoring portion 160 and a processing control portion 162. A stack light 164, consisting of a green light 166, a yellow light 168, and a red light 170, is incorporated into the RTMS 150 to indicate the machine status. For example, when the green light 166 is illuminated, the machine status is good; when the yellow light 168 is illuminated, the RTMS 150 is signaling that the machine is not working; when the red light 170 is illuminated, it means that the machine requires attention (e.g., repair).

General instructions for the simulation can be posted on the outside of the machine case 152, in such a way as to appear as a safety warning. The machine case 152 can have an adjustable mounting bracket (not shown) that allows the unit to be re-mounted to existing machine and mounted to machine simulators.

Figure 7:
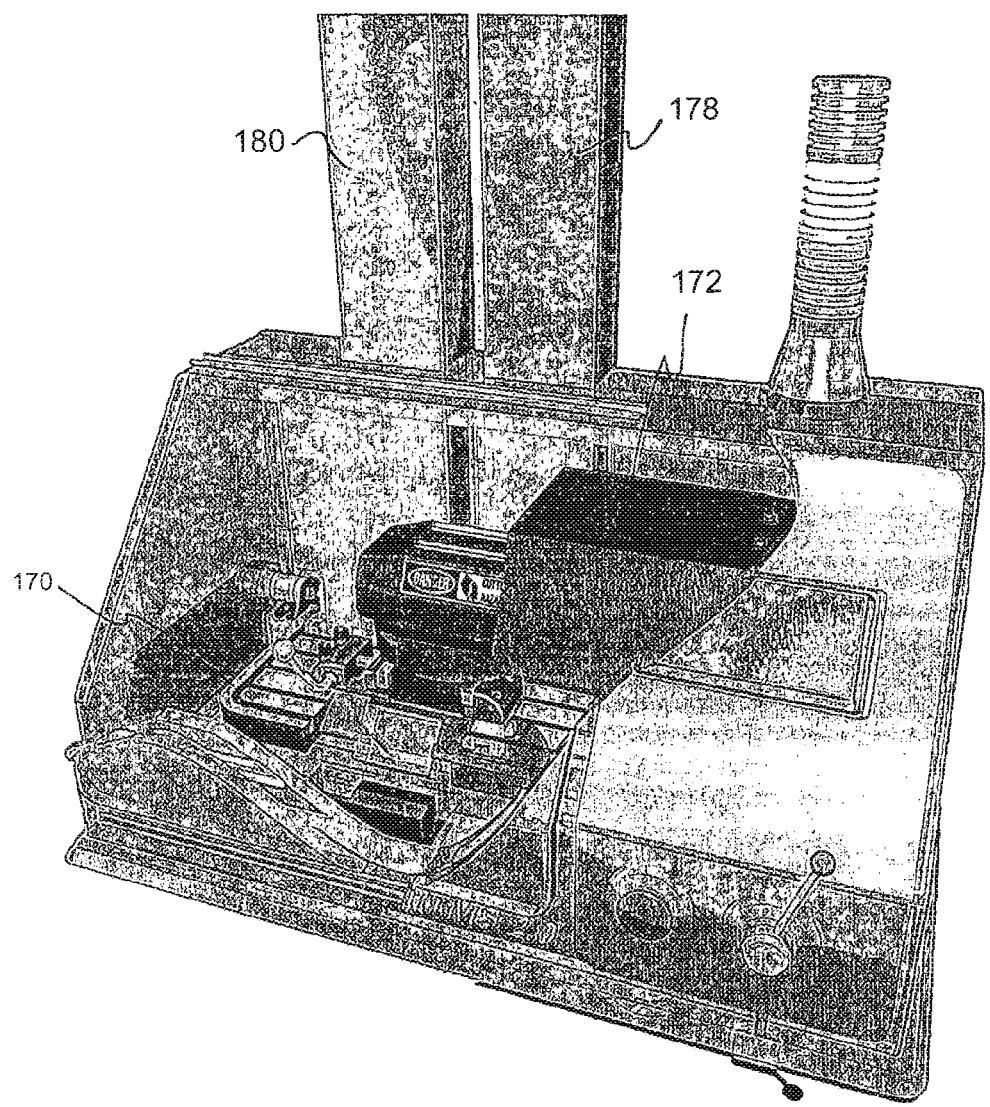
FIG. 7 is a cut-away view of the simulating device of FIG. 5.
Figure 8:
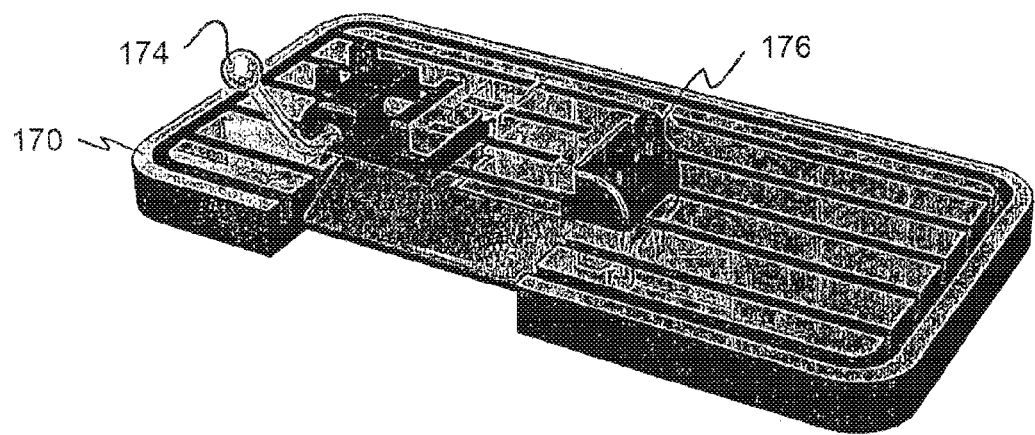
FIG. 8 shows the part fixture and lever, which is normally located in the simulating device of FIG. 5.

Referring to FIG. 8, which shows the partholder fixture 170 in greater detail, the partholder fixture 170 allows the user to manually load and unload parts (blocks). Before the RTMS 150 starts to work on a part represented by a block, the block is placed into the jaws of a vise 176 in the machining center 172 (FIG. 7) by the operator and the sequence of machine operations are started. The RTMS 150 does not perform an actual operation on the block. The block remains in the vise 176 until the processing operation is completed. Then the block is replaced with the next part during the processing manually by an operator.

Figure 9:
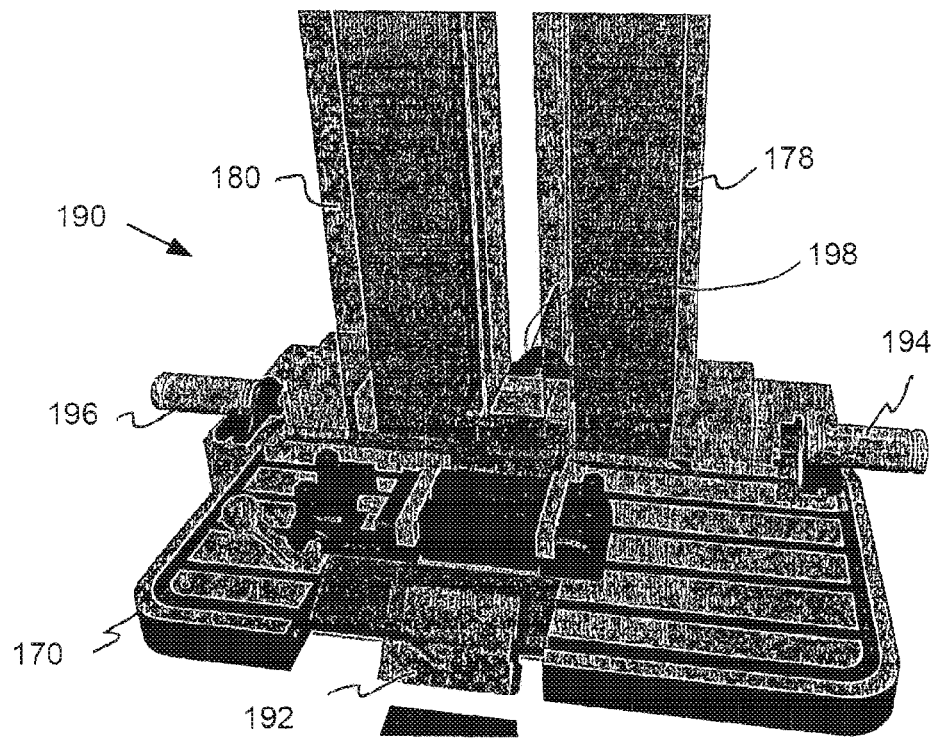
FIG. 9 shows the part fixture of FIG. 8 with two magazine towers attached for dispensing parts used in the simulation system of the present invention.

Alternatively, blocks can be replaced automatically using the automatic loading attachment shown in FIGS. 7 and 9. Referring to FIG. 7, which is a cutaway view of the RTMS 150 of FIG. 5, including an attachment for automatically loading using two magazine towers 178 and 180. The magazine towers 178 and 180 are examples of components of a material handling module that can be incorporated with the RTMS of the present invention. The material handling module allows the appearance of progress in the production cell. The material handling module replaces the part during the processing state with a part that would be appropriate for the next step in the process. The module can collect the first part and replace the part with either acceptable parts or part that need to be scrapped or reprocessed. In addition, a servo motor may be implemented to control a turn table turning one hundred and eighty degrees to release the part through the bottom of the turntable on the return cycle either a good part is selected or a faulty part is selected as the turntable returns to the original location.

Referring now to FIG. 9, there is shown an embodiment of a material handling module with a part swapper 190. The part swapper 190 collects the first part 190 and replaces the first part 192 with either acceptable parts or parts that need to be scrapped or reprocessed. The part swapper 190 includes magazine towers 178 and 180 (one tower holds perfect parts; the other tower holds flawed parts). A first linear actuator 194 is implemented to push a part from magazine tower 178 and a second linear actuator 196 is implemented to push a part from magazine tower 180. A third linear actuator 198 pushes the part into position, shoving the first part 192 (placed by the operator) into a bin (not shown). One of the part magazines can be loaded with parts that appear faulty. The flaw is not obvious to the operator but will trigger a fault in the next machine. This complication adds to the reality and fidelity of the simulation and the utility of the RTMS of the present invention.

Figure 10:
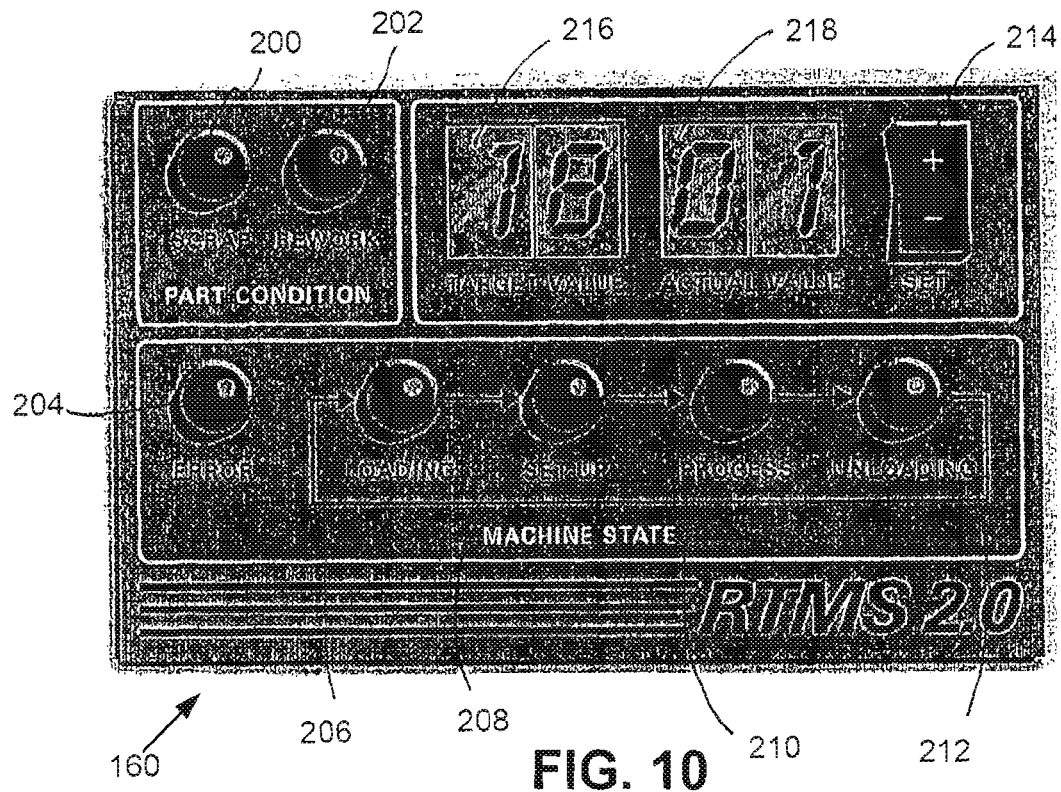
FIG. 10 shows a first portion of the control panel of the simulating device of FIG. 5.
Figure 11:
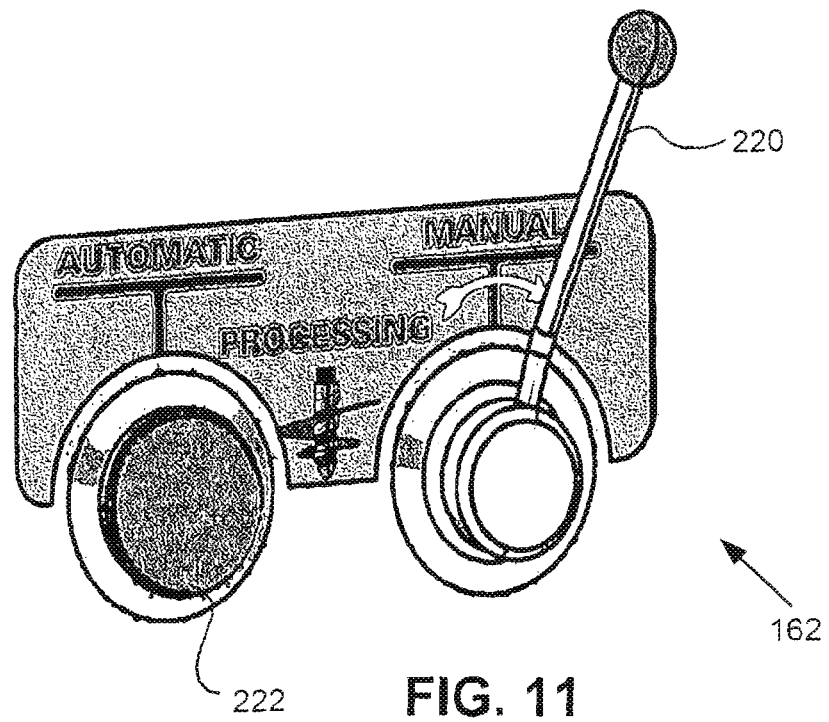
FIG. 11 shows a second portion of the control panel of the simulating device of FIG. 5.

Referring to FIGS. 10 and 11, which are a detailed views of the condition and state monitoring portion 160 and the processing control portion 162 of the control panel 158 (FIG. 5) of the RTMS 150, the control panel 158 is designed to replicate the CNC setting box on a modern machining device. Like a CNC, the control panel 158 communicates much of the information about the system to the user. The control panel 158 contains information regarding the part condition and the machine state such as the setup process, the load process, and the unloading process.

Referring to FIG. 10, the part condition and machine state monitoring portion 160 of the control panel 158 includes a scrap light 200, a rework light 202, an error light 204, a loading light 206, a setup light 208, a processing light 210, an unloading light 212, rocker switch 214, a target value display 216, and an actual value display 218. Lights 200 and 202 are indicative of the quality of items produced by the RTMS 150. Lights 204, 206, 208, 210 and 212 are indicative of the machine status. The rocker switch 214 enables the operator to adjust the speed of the RTMS 150 to match the target value displayed on the target value display 216.

Referring now to the operations of the RTMS 150, when the scrap light 200 flashes red, the RTMS 150 is indicating that the produced item (the block currently on the RTMS 150) is a scrapped item and must be discarded. On the other hand, when the rework light 202 flashes red, the RTMS 150 is indicating that the produced item (the block currently in the RTMS 150) is an item which requires rework on the same machine or on another machine. Thus, when the rework light 202 is flashing, the item (block) must be sent to the next required process (for example, another RTMS) for rework.

With regard to the machine state, specifically in the case of an error, when the error light 204 flashes red, it indicates a machine failure. When the machine fails it cannot perform any operations and the RTMS 150 failure light flashes until the machine repair starts (a momentary button within the case 152 (not shown)) that requires a "special" tool to operate). The repair time is generated by the computer 62 (FIG. 1) and the error light 204 remains red until the end of the repair time.

Another machine state, the loading signal, communicates to the user that the machine has finished the unloading operation of an item and is ready for the loading operation of the next item when the loading light 206 flashes red. The loading light 206 shows red after the lever 174 on the partholder 170 is pressed (FIG. 8), the RTMS 150 then indicates that the loading operation is currently being performed on the machine. The computer 62 turns off the loading light 206 as soon as the loading time generated by the computer 62 elapses. After loading time has elapsed, the setup light 208 begins to flash red which means that the loading operation is finished and the machine is ready for the setup operation.

In setup operation, the setup light 208 shows red (while, for example, a set button, which may be located inside the RTMS 150, is being pressed) to indicate that the set up operation is currently being performed on the machine. The computer 62 turns off the setup light 208 when the set up is completed. At this time, the process light 210 starts to flash red which means the setup operation is finished and the machine is ready for the processing operation.

Referring also to FIG. 11, which shows the processing operation portion 162 of the control panel 158, during process operation, the process light 210 shows red (after the process button and or lever 220 is rotated) to indicate that the processing operation is currently being performed on the machine. The computer 62 turns off the process light 210 when the processing time generated by the computer 62 elapses. At this time, the unloading light 212 starts to flash red which means the processing operations are finished and the machine is ready for the unloading operation.

The control panel 158 of the RTMS 150 signals an unloading machine state when the loading light 206 shows red (after the lever 174 on the fixture 170 is pushed), indicating that the unloading operation is currently being performed on the machine. The computer 62 will turn off the unloading light 212 as soon as the unloading time generated by the computer 62 elapses. At this time, the cycle ends and the machine is read for loading.

Along with the state and condition lights shown in FIG. 10, the control panel 158 also includes a digital set up module that lets the user "set" the machine. When the setup light 208 is flashing, which indicates that the machine is ready for the set up operation, the computer 62 delivers target value at the target value display 216. The user then uses the rocker switch 214 to "adjust" the settings to match the number that the actual value (shown at the actual value display 218). When the actual value reaches the target value, the machine advances to the processing state. If the software is set to "automatic," then the value increases on its own after the "set" button 214 is pressed once. This refers to the cases where the set up operations only require the presence of an operator to initiate the set up.

Returning to FIG. 8, the purpose of the loading and unloading module of the RTMS 150 is to replicate the actions of placing a part in a tool for processing. The RTMS 150 includes a lever 174 (FIG. 8) to press a separate momentary switch (not shown) for loading and unloading. When the loading button is pressed, a signal is sent to the computer 62. The computer then returns a signal (after a prescribed time) to actuate a clamp that can appear to hold the part.

After the user has cycled through the production cycle, the loading operation is reversed. The user holds the lever 174 in the reverse position, and after the computer 62 returns a signal, the part is released allowing the user to remove the part. Preferably, the first part is caught in a part bin beneath the table (not shown) where the lab operator can reload the preceding machine.

During the processing state, the user is required to actuate a momentary switch in the process control module which includes a momentary switch and a light.

Two main types of process control modules that can be implemented with the present invention include a simple switch or a "smart" tool that includes a switch that identifies when the tool contacts the working piece. The simplest examples of a smart tool would be for a milling operation. Here a tool could be replaced with the sensor when the operator uses the machining similarly to normal operation and directed by the computer to proceed to the next operation after the task cycle is done.

In a configuration with a simple switch module, the user presses a button to start the processing state in the process. Having the processing button as a separate module allows the module to be placed in the same location where the processing is done in the operation being stimulated assuring that the operator is following the same movements as in the normal operation.

Referring again to FIGS. 10 and 11, when the process light 210 is flashing on the control panel 158, indicating that the machine is ready for processing operation, the operator must push the processing button which makes process light turn red. If the RTMS 150 is pre-programmed to be in manual mode, the operator should hold a process lever 220 (FIG. 11) over until the process light 210 (FIG. 10) is turned off by the computer 62, indicating that the processing operation is completed. If the RTMS 150 is programmed to be in "automatic"

mode, then the operator can leave the machine after pushing a mushroom head button 222 for automatic operation (FIG. 11).

Figure 12:
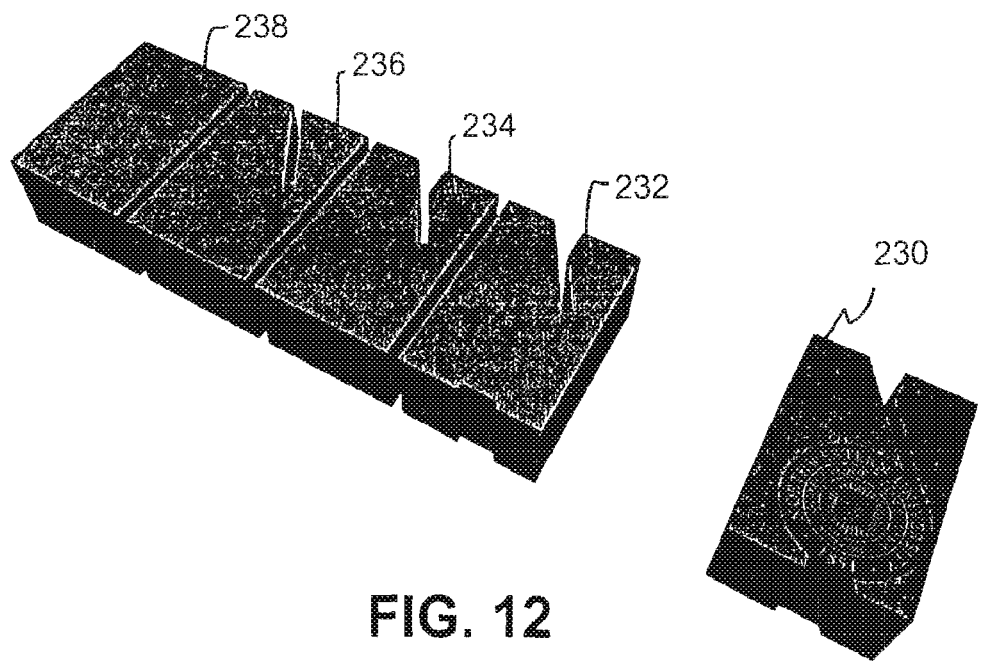
FIG. 12 illustrates the variety of blocks and sub-blocks used in the representing parts for a manufacturing system.
Figure 13:
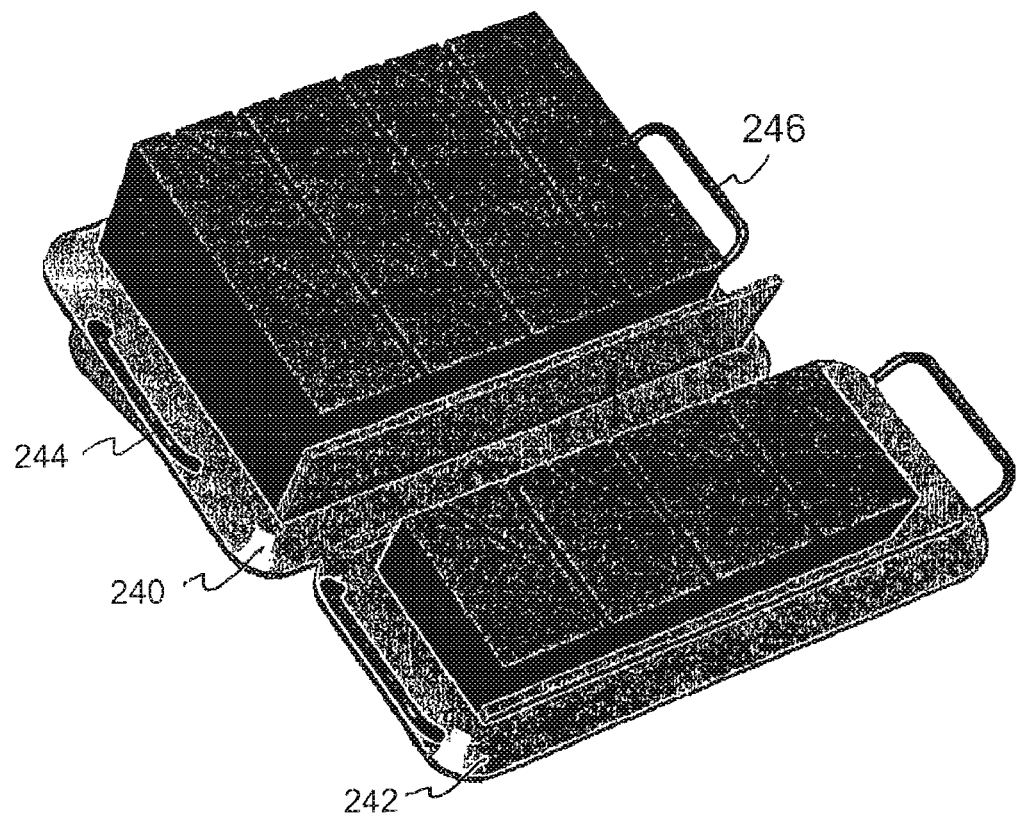
FIG. 13 illustrates pallets, which are used as buffers, with blocks for use in the simulating system of the present invention.

As shown in FIGS. 12 and 13, the part is a simple block 230 which represents a part being processed by the machine. Each block shows a successive machining process to indicate that the user is really doing a process. The part is designed to appear to have different processes applied to the part. In cases where only three or four machines are to be simulated, the intermediate parts are omitted and each machine will appear to do either two or three processes. FIG. 12 shows one possibility of a part, with five intermediate parts, 230, 232, 234, 236 and 238.

Referring to FIG. 13, there is shown two pallets 240 and 242 with parts ready for processing. The number of parts on pallets 240 and 242 can vary. The pallets 240 and 242 serve as buffers. Operators can place parts on the pallets 240 and 242 which is placed in between machines. The number of parts on the pallets 240 and 242 determines the batch size. Handles 244 and 246 on the pallets 240 and 242 allow the operators more flexibility in the way they chose to setup the RTMS production cell.

The believability of a simulation is another factor taken into consideration by the present invention. Sounds and vibrations of machine processes provided by the RTMS of the present invention increase the believability of a simulation. A feedback module 248 (FIG. 14) contains the apparatus needed for the auditory and passive feedback. The module contains "looping" buzzers and warnings recording of motor sounds, and a vibrator. The feedback module can be inconspicuously mounted under or behind an existing machine.

Auditory and passive feedback allow the user to react more naturally to phase changes in machinery in a production cell. For example, a low-level tone alerts the user that the machine (the RTMS) is ready to load. The operator proceeds to place the part in the tool and presses the load lever, which initiates a "whirring" sound. Then after a signal is sent from the computer, a "clunk" sound informs the user to proceed to set up. When the machine is set, the operator can press the processing switch or lever. A signal is sent to the feedback module, creating a louder signal or a more pronounced vibration while the computer signals the processing state. After processing is complete, the user reverses the loading operation.

Flowchart Description

The following section presents flowcharts (FIGS. 15-19) illustrating the operations of the RTMS 150 of the present invention. Each flowchart represents a separate operation feature in which all the flowcharts can be combined to form an operational flowchart for the RTMS 150 of the present invention. More specifically, the loading, setup, processing, and unloading operation flowcharts of FIGS. 15 to 18 describe the steps utilized by the software of the RTMS 150 and the actions required from the operator to simulate the respective operation of the machine. FIG. 19 presents a machine failure test flowchart illustrating the steps that the RTMS 150 follows in simulating a machine failure.

Figure 15:
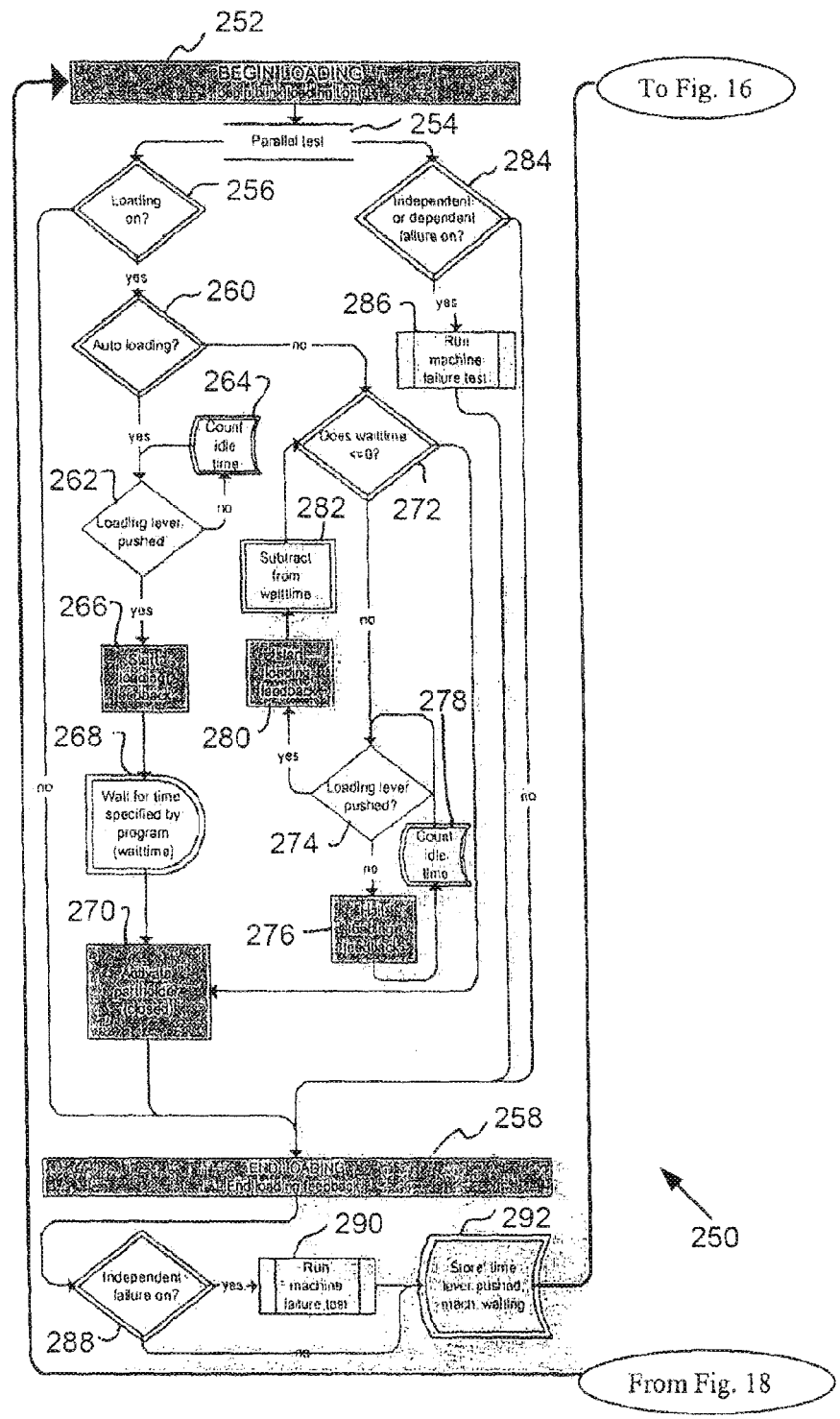
FIG. 15 is a flowchart illustrating the loading operation of the RTMS.

Referring first to FIG. 15, there is shown a loading operation flowchart illustrating the loading operation 250 of the RTMS of the present invention. The loading operation begins at a begin loading step 252 which actuates the loading light 206 (FIG. 10). During the loading operation, the RTMS runs parallel tests, one for loading operation and the other for machine failure test, at a parallel test step 254.

Referring first to the loading operation, the process moves to a loading "on" step 256. If the loading "on" step 256 does not detect a load (or loading operation is not selected), the process moves to an end loading step 258. If, on the other hand, the process detection step 256 detects a load, the process moves to an auto loading decision step 260. The auto loading decision step 260 determines whether auto loading has been pre-selected. If the auto loading decision step 260 determines that auto loading has been selected, then the process moves to a loading lever step 262. The loading lever step 262 is represented by a mechanical momentary lever located in the machine case (lever 174 of FIG. 8). The loading lever step 262 counts the idle time of pushing the lever 174 via a count idle time step 264 when the operator pushes the lever 174 (FIG. 8), the process responds with a start loading feedback step 266, activates the loading light 206 (FIG. 10) on the control panel 158, and activates the green light 166 of the stack light 164 (FIG. 5) to represent that the loading is in process and may initiate an auditory signal of recorded "cranking sound. Then the process is idled at a specified amount of time at a wait-for-time step 268. The wait-time at step 268 is based on a deterministic value or a randomly created value based on a probability distribution entered by the operator. After the specified wait-time at step 268, flow proceeds to an activate partholder closed step 270, which closes the partholder. Here, the RTMS may make a "chunking" sound from an auditory recording to simulate a manufacturing environment. The process then proceeds to the end loading step 258.

Returning to the auto loading step 260, if the RTMS is not configured to auto load, the process moves to the wait-time decision step 272. If the wait-time at the wait-time decision step 272 is less than or equal to zero, then the process jumps to the activate partholder step 270. If, on the other hand, wait-time is greater than zero, the process moves to a loading lever pushed decision step 274, which determines whether the lever 174 has been pushed by the operator. If the operator has not yet pushed the lever 174, the process moves to a halt loading feedback step 276, counts the idle time via a count idle time step 278, and loops back to the loading lever pushed decision step 274. When the operator has pushed the lever 174, the process moves to a start loading feedback step 280 and subtracts the wait time from the idle time counted at the idle time loop 278 at a subtract from wait-time step 282. Here, wait-time is calculated and subtracted from the idle time because the wait-time is a constant. In other words, no matter how fast the operator pushes the lever or is operating the RTMS 150, the RTMS 150 counts up to the wait-time established or entered by the operator before proceeding to the next step or the next operation. From step 272, the flow proceeds to the activate partholder step 270.

Referring still to FIG. 15, turning to the parallel test step 254, the machine failure test which runs concurrently with the loading operation, begins at a independent or dependent failure step 284. If the failure test is not on, the process moves to the end loading step 258. If, on the other hand, the decision step 284 determines that the machine failure test is on, the process moves to a run machine failure test step 286 and then moves to the end loading step 258. The machine failure test is described in further detail in FIG. 19.

At the end loading step 258, the RTMS 150 stops the loading feedback and proceeds to an independent failure decision step 288. If independent failure test is not selected, the process moves to a store time and lever pushed machine waiting step 292. If, on the other hand, independent failure test is pre-selected, the process runs the machine failure test, step 290, before proceeding to the store and lever pushed machine waiting step 292. After the loading operation, the process moves to the setup operation 300, the flowchart of which is shown in FIG. 116

Figure 16:
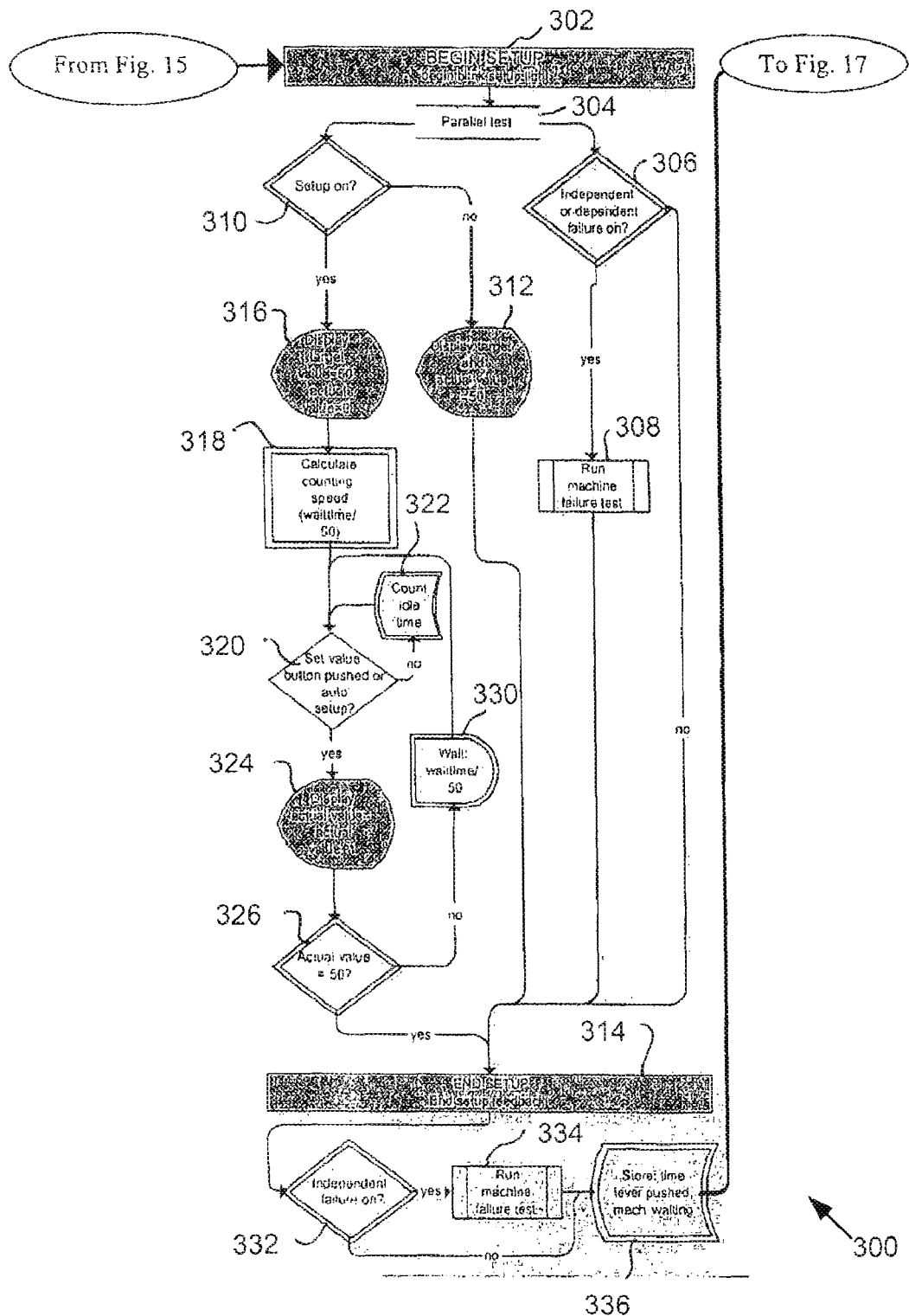
FIG. 16 is a flowchart illustrating the set up operation of the RTMS.

Referring now to FIG. 16, there is shown a setup flowchart illustrating the steps of set up operation 300 of the RTMS 150 of the present invention. The setup operation begins at a begin setup step 302 and begins flashing the setup light 208 (FIG. 10). The setup operation of FIG. 16 also implements a parallel test procedure at a parallel test step 304 in which the process tests for set up and machine failure. The machine failure test procedure (steps 306 and 308) is identical to the steps discussed in FIG. 15 (steps 284 and 286).

Turning now to the beginning of the setup test procedure at a setup "on" decision step 310, if decision step 310 determines that setup is not "on," then the process moves to a display target and actual value step 312 before proceeding to an end setup step 314. Step 312 is a "manual" step in which the set up operation is manual. In this case, the operator pushes and hold switch 214 (FIG. 10) until the actual value equals the target value. The target value is a predetermined value for the setup time, calculated by, for example, sampling the setup time of the machine being simulated.

Returning to step 310, if, on the other hand, the setup "on" decision step 310 determines that setup is "on," the flow proceeds to a display target and actual value step 316. The target value displayed is 50 and the actual value displayed is zero. In this case, 50 is used as an example of a wait-time for a set up operation of the machine being simulated. As previously discussed, the wait-time of an operation depends on the machine being simulated. Flow proceeds to a calculate counting speed step 318 and calculates the counting speed which is equal to wait-time 50. The process then moves to a set value decision step 320. The set value decision step 320 determines whether the set value procedure is manual or automatic and if the set value button is pushed. During manual setup, the set up operation also counts the idle time for the operator to push the set value button via a count idle time step 322. If the set value is automatic, then the operator needs only to push the rocker switch 214 (FIG. 10) once to start the count to a set value (for example, 50). If the set value is manual, then the operator must hold or repeatedly push the rocker switch 214. After the set value decision step 320, the process moves to a display actual value step 324 and increments the actual value by one and displays the incremented value. Decision step 326 determines whether the actual value is equal to the set value (for example, 50) and if so, the process moves to an end setup step 314. If, on the other hand, the actual value is not equal to the target value, the process loops back via a wait-time step 330 to the set value decision step 320. As can be seen, the wait-time loop is perpetual until the actual value equals the target value, at which time, the setup process is completed at the end setup step 314. From the end setup step 314, the process moves through the same failure test as discussed in the loading operation in FIG. 15, with steps 332, 334 and 336 being identical to steps 288, 290 and 292, respectively, of FIG. 15. After the setup operation 300, flow proceeds to the processing operation 340, the flowchart of which is shown on FIG. 17.

Figure 17:
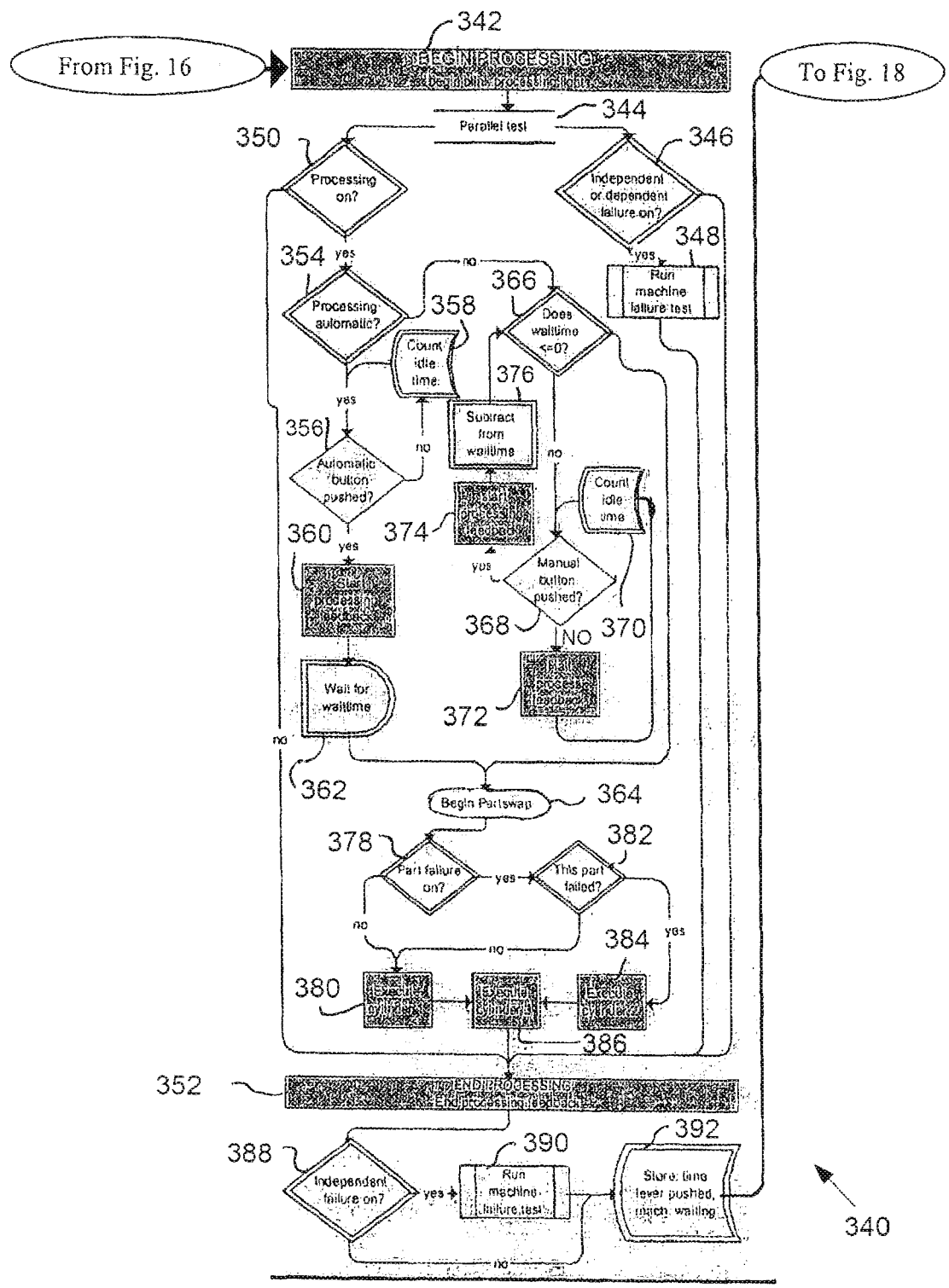
FIG. 17 is a flowchart illustrating the processing operation of the RTMS.

Referring now to FIG. 17, there is illustrated the flowchart showing the steps from the processing operation 340 of the RTMS 150. The processing operation 340 begins at a begin processing step 342 and begins by blinking the processing light. The processing operation 340 runs a parallel failure test via steps 344, 346 and 348 which has already been discussed in FIG. 15 with reference to blocks 254, 284 and 286. The processing operation first determines whether processing is "on" at a processing "on" step 350. If processing is not preselected, then the process moves to an end processing step 352. If, on the other hand, the processing "on" decision step 350 determines that processing is preselected, then the process moves to a processing automatic decision step 354 which determines whether automatic processing is preset. If automatic processing is preset, then the process moves to an automatic push button decision step 356, which detects whether the operator has pushed the mechanical momentary button (not shown) provided on the RTMS 150. Again, similar to the set up idle time counter 322 of FIG. 16, the idle time for the operator to push the automatic button is counted at a count idle time step 358. When the operator has pressed the button, the process moves to a start processing feedback step 360.

Figure 14:
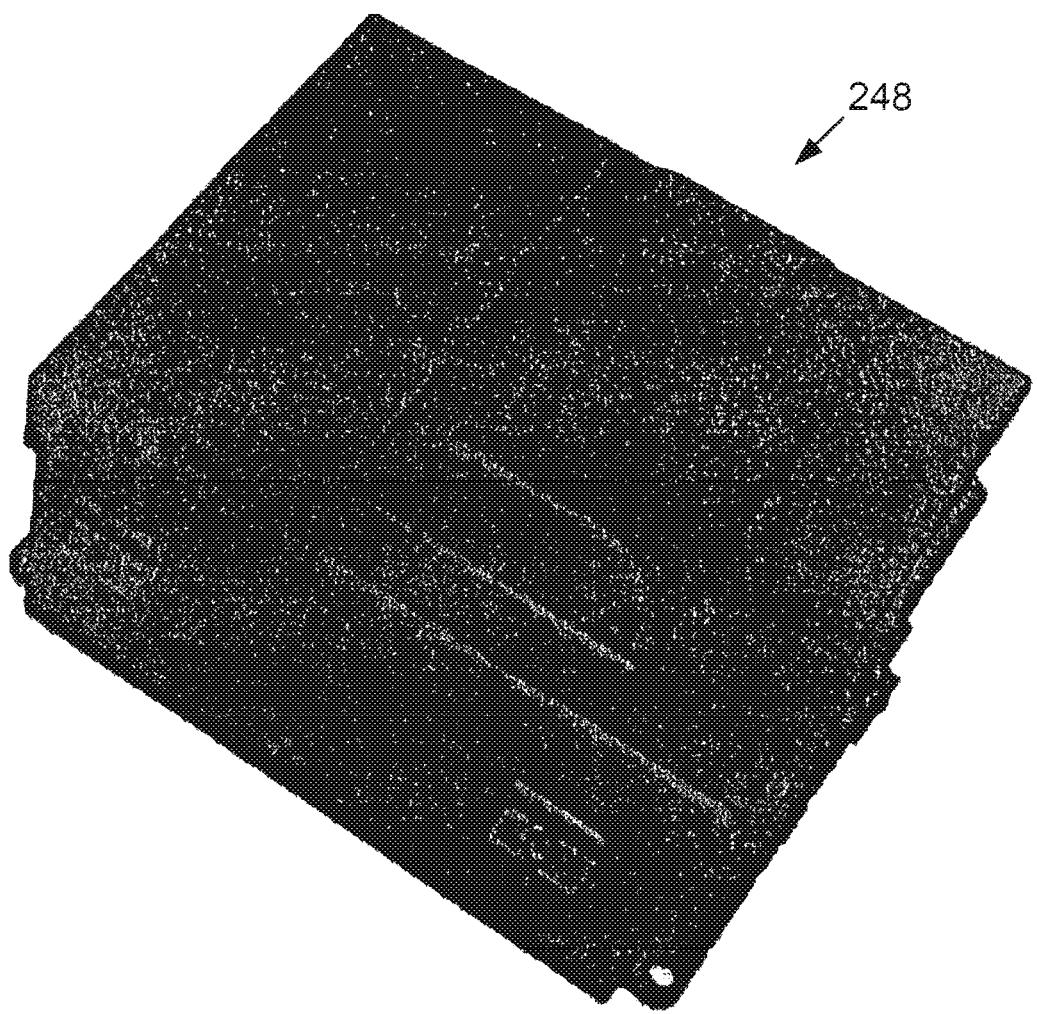
FIG. 14 illustrates the casing for a feedback module that can be mounted in or around the simulating device of FIG. 3.

During the processing of the block at the start processing step 360, the RTMS 150 turns the processing light 210 on the control panel 158 (FIG. 10) red and provides a green light 166 at the stack light 164 (FIG. 5). The RTMS 150 can provide an auditory signal from a "factory recorded" sound and vibrates itself using, for example, a rotary electric vibrator included in the feedback module 248 (FIG. 14). Next, the process moves to a wait for wait-time step 362 before proceeding to a begin partswap step 364 which will be described below.

Returning to the processing automatic step 354, if the processing operation is manual, the process moves to a wait-time decision step 366 where the process determines the wait-time based on the actions of the operator. When the wait-time is less than or equal to zero, the process moves to the begin partswap step 364. If the wait-time decision step 366 determines that the wait-time is greater than zero, then the process moves to a manual button decision step 368 which determines if the processing lever is pushed by the operator. If not, the process feedback is halted, step 372, and the idle time calculated until the button is pushed is counted via a count idle time step 370. If the processing operation is halted, the RTMS 150 may provide a halt sound and the stack light 164 illuminate the yellow light 168. When decision step 368 determines that the operator has pushed the processing lever 220, the process moves to a start processing feedback step 374 which starts the processing feedback and a subtract from wait-time step 376. The idle time from block 370 is subtracted from the wait time. Step 366 determines if the wait-time is less than or equal to zero. If not, the flow loops back through steps 368, 370, 374 and 376. If so, flow proceeds to step 364.

Returning to the begin partswap step 364, the begin partswap step 364 determines if there is a part failure based on a probability distribution programmed into the RTMS 150. First, the partswap process determines if the part failure option is selected at a part failure "on" step 378. If the part failure "on" decision step 378 determines that part failure is not selected, then the process moves to an execute cylinder 1 step 380 which actuates, for example, the first actuator 194 to push a part from the magazine tower 196 (FIG. 9). If, on the other hand, the part failure on step 378 determines that the part failure is on (selected), then the process moves to a part failure decision step 382 which determines if a part has failed (based on the pre-programmed probability distribution data or a deterministic value). Based on the probability distribution data, if part failure is not detected at the part failure decision step 382, the process moves to the execute cylinder 1 step 380. If, on the other hand, a part failure is detected at the part failure decision step 382, the process then moves to a execute cylinder 2 step 384 where the RTMS 150 replaces the defective part with a new part. For example, if there is a part failure, the RTMS 150 would actuates the second actuator 196 to replace the defective part with a new part from the magazine tower 180 (FIG. 9). As can be seen, whether the part failed or not, the processing moves to a execute cylinder 3 step 386 (which refers to the third actuator 198 used to replace parts on the fixture 170 as shown in FIG. 9) to get a new part for the next process. The current processing ends at the end processing step 352. Again, steps 388, 390 and 392 are similar to the independent failure test as described in the loading operation of FIG. 15.

Figure 18:
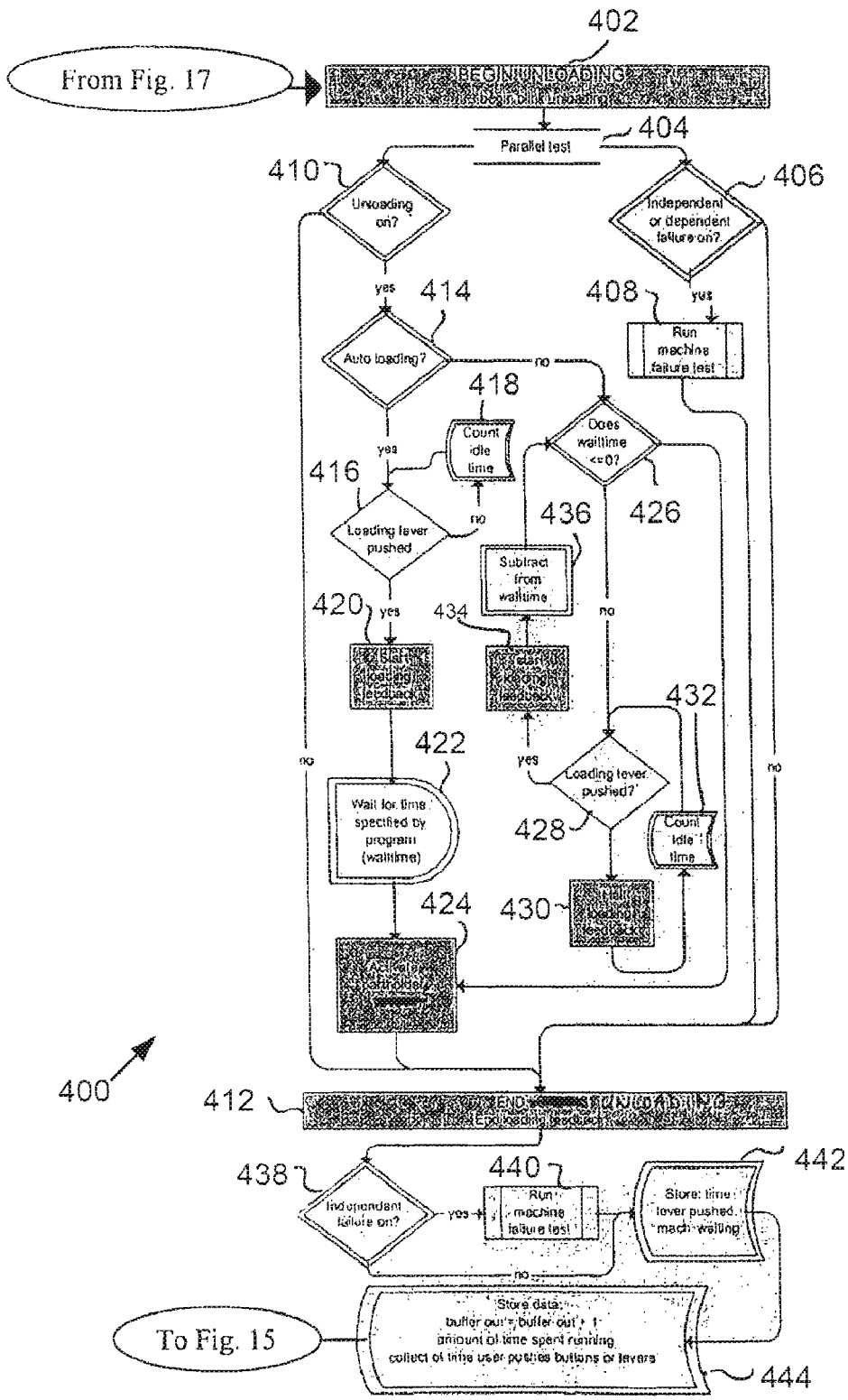
FIG. 18 is a flowchart illustrating the unloading operation of the RTMS.
Figure 19:
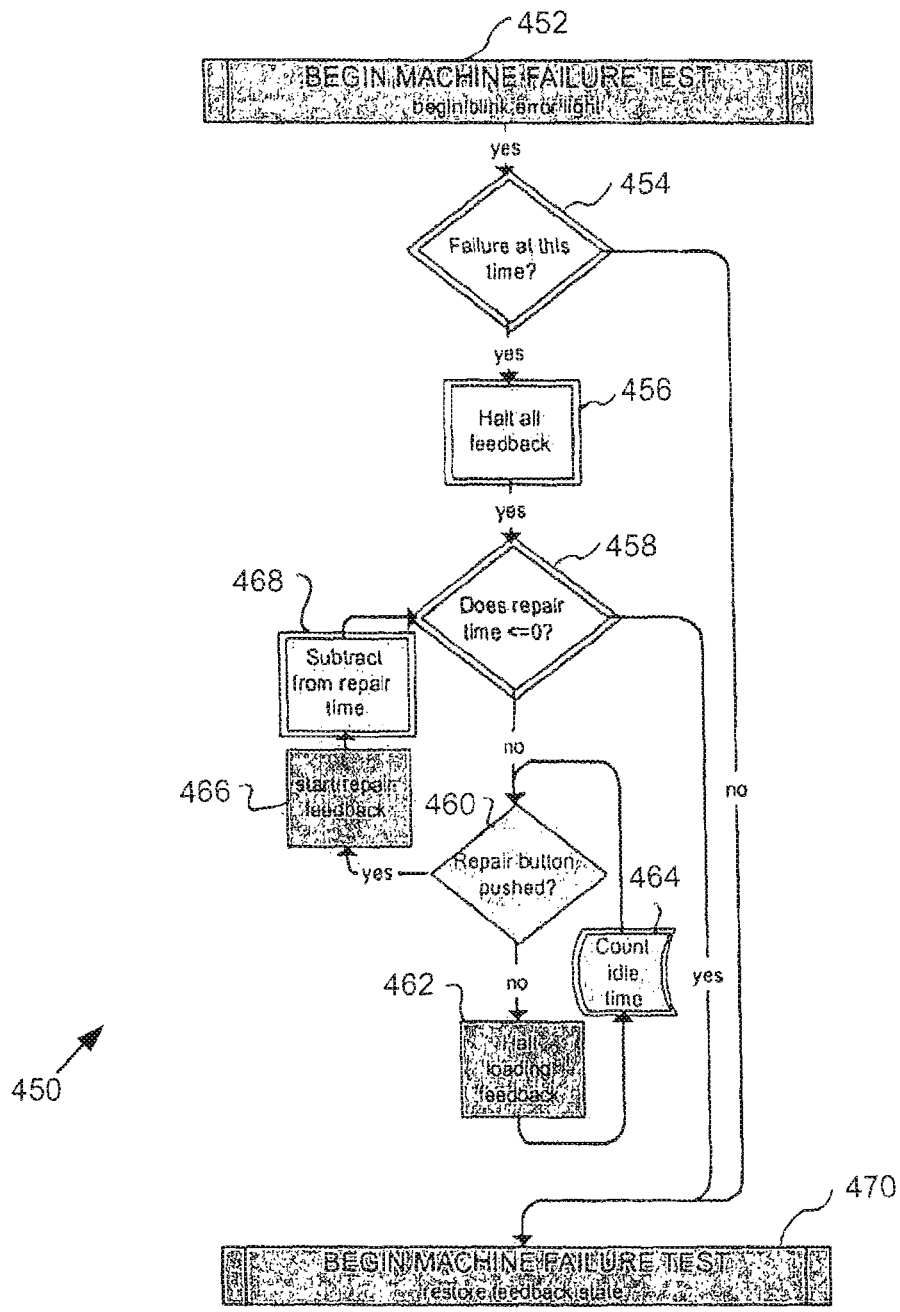
FIG. 19 is a flowchart illustrating the machine failure test process used by the RTMS.

Referring next to FIG. 18, the flowchart for the unloading operation 400 is illustrated. The unloading operation begins at begin unloading step 402. The unloading operation runs a parallel failure test via steps 404, 406 and 408 which has already been discussed in FIG. 15. The unloading process first determines if unloading operation is preselected at an unloading on step 410. If unloading operation is not preselected, the process moves to an end unloading step 412. If, on the other hand, unloading operation is preselected, the process moves to an auto unloading decision step 414 which determines whether auto unloading has been preselected. If the auto unloading decision step 414 determines that auto unloading has been selected, then the process moves to a loading lever pushed step 416. The loading lever pushed step 416 is represented by a mechanical momentary lever located in the machine case (lever 174 of FIG. 8). The idle time for the operator to push the lever 174 is determined via a count idle time step 418. When the operator pushes the lever 174, the process respond with a start unloading feedback step 420 which activates the unloading light 212 (FIG. 10) on the control panel 158 and the green light 166 of the stack light 164 (FIG. 5) to represent that the unloading is in process. During the unloading process, the RTMS 150 may initiate an auditory signal of recorded "cranking sound. Then the process is idled at a specified amount of time at a wait for time step 422 before moving on to close the partholder fixture 170 at an activate partholder step 424. The process then proceeds to the end unloading step 412.

Returning to the auto unloading step 414, if the RTMS 150 is not configured to auto unload, the process moves to a wait-time decision step 426. If the wait-time is less than or equal to zero, then the process moves to the activate partholder step 424. If, on the other hand, wait-time is greater than zero, the process moves to a loading lever pushed decision step 428, which determines whether the lever 174 has been pushed by the operator. If the operator has not pushed the lever 174, the process moves to a halt unloading feedback step 430, counts the idle time via a count idle time step 432 and loops back to the loading lever pushed decision step 428. When the operator pushes the lever 174, the process flows from step 428 to a start loading feedback step 434 which subtracts from the wait-time the idle time counted at the idle time loop at a subtract from wait-time step 436. Flow proceeds to the wait-time decision step 426 and when wait-time is less than or equal to zero, then the process moves to the activate partholder step 424.

After the unloading operation is completed at the end unloading step 412, the RTMS 150 proceeds to run steps 438, 440 and 442, which are identical to the steps 288, 290 and 292 of FIG. 15, with the exception that that the store and lever pushed step 442 loops back to the unloading operation shown in FIG. 15 via a store data step 444 which stores the amount of time spent simulating the machine process, including the amount of time the user spent pushing buttons and levers. This information is used by the computer 62 to calculate, for example, the idle time of the machine and the throughput of the manufacturing system.

Referring now to FIG. 19, which illustrates the flowchart for the machine failure test 450 shown in FIGS. 15 to 18 in the parallel testing step during the loading, set up, processing, and unloading operations of the RTMS 150. The machine failure test begins at a begin machine failure test step 452 and starts blinking the error light 204 (FIG. 10) on the control panel of the RTMS 150. From the begin machine failure test step 452, the process moves to a failure decision step 454 which determines if there is a machine failure. If the failure decision step 454 determines that there is no machine failure, then the process moves to an end machine failure test step 470 and restores the feedback state of the RTMS 150. If, on the other hand, the failure decision step 454 determines that there is a machine failure, then the process moves to a halt all feedback step 456 and then proceeds to a repair timer decision step 458. The repair timer decision step 458 determines if the repair time for the machine is less than or equal to zero. If the repair time is less than or equal to zero, the process moves to the end machine failure test step 470. If, on the other hand, the repair timer decision step 458 determines that the repair time is greater than zero, a repairman is then needed and the process moves to a repair button decision step 460.

The repair button decision step 460 detects whether the repair button (not shown, but may be located inside RTMS 150) on the RTMS 150 is pressed by the user. If the repair button is not pressed, the process moves to a halt loading feedback step 462 and counts the idle time via a count idle time step 464. If the repair button is pressed, the process moves to a start repair feedback step 466 which subtracts the wait time via a wait-time step 468 to assist the repair timer decision step 458 in determining whether the repair time is less than zero. If the repair time is less than zero, meaning the machine is working again, the process moves to the restore the feedback state at the end machine failure test step 470.

Technical Review of the RTMS

The following section describes the RTMS 90 used in the RTMS simulation environment, its basic construction, functionality, embedded software, and electro-logical composition.

There are two types of devices associated with the RTMS environment; they are the RTMSs (shown in FIG. 1 as RTMS 52, 54, 56 and 58) which is the actual mock machines and the box (shown in FIG. 1 as box 60) which is the serial hub. The two devices have several things in common. The first of these is the Intel 8751 microcontroller 528 (the "microcontroller") (FIGS. 24 and 25). This processor is the heart of both of these devices, and the extremely convenient on-chip Universal Asynchronous Receiver/Transmitter ("UART") makes serial communication both easy and effective.

The microcontroller 528 and all other support logic within both types of devices is TTL, which means it is powered at 5V. To get this voltage level, which is largely ignored by Mainstream DC conversion units, each unit contains a non-variable 5V, 1A voltage regulator with a small heat sink and a 9V, 800 mA AC to DC converter.

Figure 20:
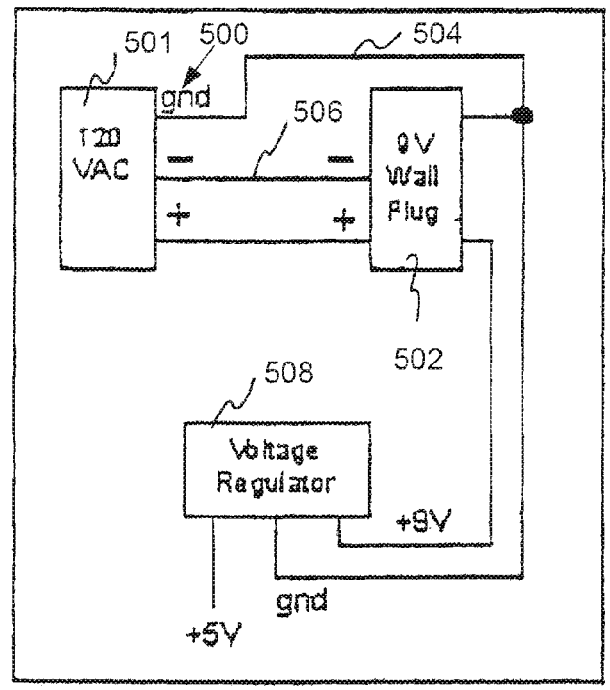
FIG. 20 is a simplified schematic of the power system of the present invention.

Referring to FIG. 20, to insure proper communication between all devices, including the computer, common ground 500 is provided by using a spliced power cord 501 connected to a 9V adapter 502. The relative power and ground leads from the prongs of the power cable are tied to the prongs going into the AC adapter 502 via a conductor line 506 and providing it with AC power. The third (ground pin) lead of the power cable is tied to the ground side of the output of the AC adapter 502 via a conductor line 504, which is in turn tied to the ground of a voltage regulator 508. This design allows all devices (in the same relative space, at least) to operate on the same ground, as well as allows the DC adapter to be encased in with the rest of the device circuitry and leaving only a sleek AC cord coming out.

Figure 21:
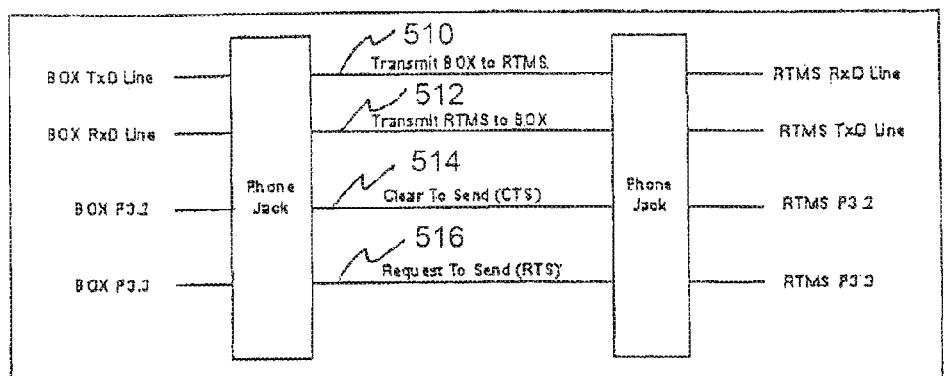
FIG. 21 is a basic schematic of the communication bus between the RTMS and box shown in FIG. 1.

Referring to FIG. 21, there is shown the RMTS-box serial communications bus. The communications bus between the RTMSs (52, 54, 56, and 58) and the box 60 consists of four signals: a serial data read (RXD) line 510, a serial data write (TXD) line 512, a clear-to-send (CTS) line 514 and a request-to-send (RTS) line 516. The latter two lines, 514 and 516, ("handshaking" signals) are both active low.

Figures 22, 23:
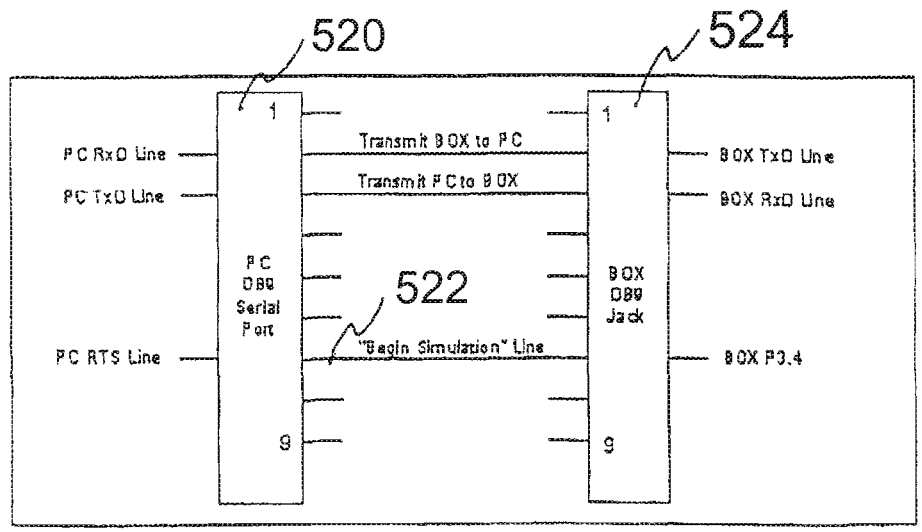
FIG. 22 is a basic schematic of the communication bus between the box and the computer shown in FIG. 1.
FIG. 23 is a pinout illustration of the computer serial port.

Referring now to FIG. 22, there is shown a computer-box communications bus. The communications bus between the box 60 and the computer 62 is conducted through a standard DB9 cable 524 using COM1 and the serial port 520 of the computer 62. This bus uses the same receive and transmit signals as the RTMS bus but has no handshaking signals. The RTS line 522 from the computer 62 is used not truly as a communication signal, but more as a "begin simulation" signal from the computer 62 to the box 60 and is bussed between them. FIG. 23 shows the pin out for the DB9 serial port 524 on the computer 62.

All communication is serial, which means single byte messages between devices are time multiplexed on a single line, allowing for a low number of lines on each bus.

System Expansion

Memory of the computer 62 can be expanded. For each second that the simulation runs, an integer (number of queued objects) and a Boolean (operating or not operating) is generated for each RTMS (52, 54, 56 and 58) and stored internally in a vector for statistical purposes.

The pins of the microcontroller 528 (FIG. 25A and FIG. 24 which shows the pin breakdown of the microcontroller 528) of the box 60, which are used as address bits for each attached device, may also be expanded. One embodiment of the present invention currently utilizes 4 pins, which means it can support 15 RTMSs plus the computer 62, which totaled to be 16 devices. These pins, however, can easily be latched if need be, and can be expanded almost indefinitely. Thus, the RTMS system network as shown in FIG. 1 can be expanded to include numerous other RTMSs and to simulate not just a machine or a cell but also a complete manufacturing line or manufacturing facility.

Hardware Description

The core of the RTMS 90 is an Intel 8751H microcontroller 528. It is being run in the present invention with a 6 MHz crystal (FIG. 25B), but this can be increased to 12 MHz. The features of the microcontroller 528 used in the present invention are: four eight-bit quasi-bi-directional input/output ports; an on-chip UART for serial communications; two bit auto-reload timer/counters. (In this embodiment, they are both configured to run as eight bit timers, one to time serial reads/writes, and the other as a "clock" described below.); 4 kb of programmable, UV-erasable EEPROM for the program space (eliminating the need for a separate program chip); and 128 bytes of RAM.

The only other chip used within the RTMS 90 is the 573 8-bit latch (the "latch chip" 536), the functionality of which is described below.

Functionalities and Connections

Referring to FIG. 24, the ports of the microcontroller 528 within the RTMS 90 are almost fully utilized. Since there are four "stages" or "states" in the operation of the RTMS 90, (i.e., loading, setup, processing, unloading) the inputs and outputs are as follows: four buttons to simulate operation of the machine in each state; four switches to turn each state on or off; four switches to make each state manual or automatic; four lights to display the currently active stage; two lights for displaying defective items (One for a "scrapped" item, the other for a "rework" item); a light to indicate machine failure; a light to indicate that it is currently under repair; a repair button; a switch to enable or disable defective item production; and two pins and a three-position switch to indicate whether failure is off, process dependant, or operational dependant.

Conveniently, this is exactly 24 pins, meaning that exactly three ports of the microcontroller 528 will be utilized by these inputs and outputs. These will be ports 0, 1, and 2. Port 3 is reserved for communication.

Figure 25A:
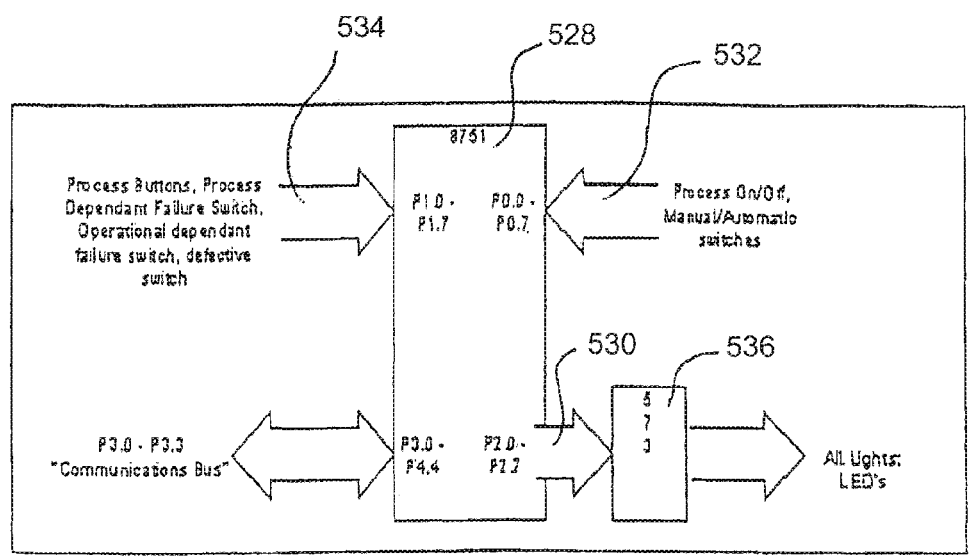
FIG. 25A is a qualitative schematic of the RTMS of the present invention.

FIG. 25A shows a qualitative schematic of the RTMS 90. Preferably, the I/O architecture of the RTMS 90 groups similarly functioning buttons, lights, and switches on to the same port. The eight lights are all driven on port 2, designated as 530 on the FIG. 25A. The eight switches that describe whether or not a process is on/off and manual/automatic are all grouped on port 0, designated as 532. The remaining inputs are on port 1, designated as 534.

Referring back to FIG. 24, which is a reference table showing the functionality of each pin, the light, on/off switch, and button for each process are on the same numbered pin in each port. For example, the processing button is P1.4, the processing on/off switch is P0.4, and the processing light is P2.4. This symmetry becomes important during the writing of the software.

The purpose of the latch chip 536 (FIG. 25A) in this embodiment is not to latch anything. In this embodiment, the latch is disabled and the output is enabled, creating a simple and effective line driver for the eight lights on port 2, which does not source the amount of current needed to run the lights.

Other Conventions

Figure 25B:
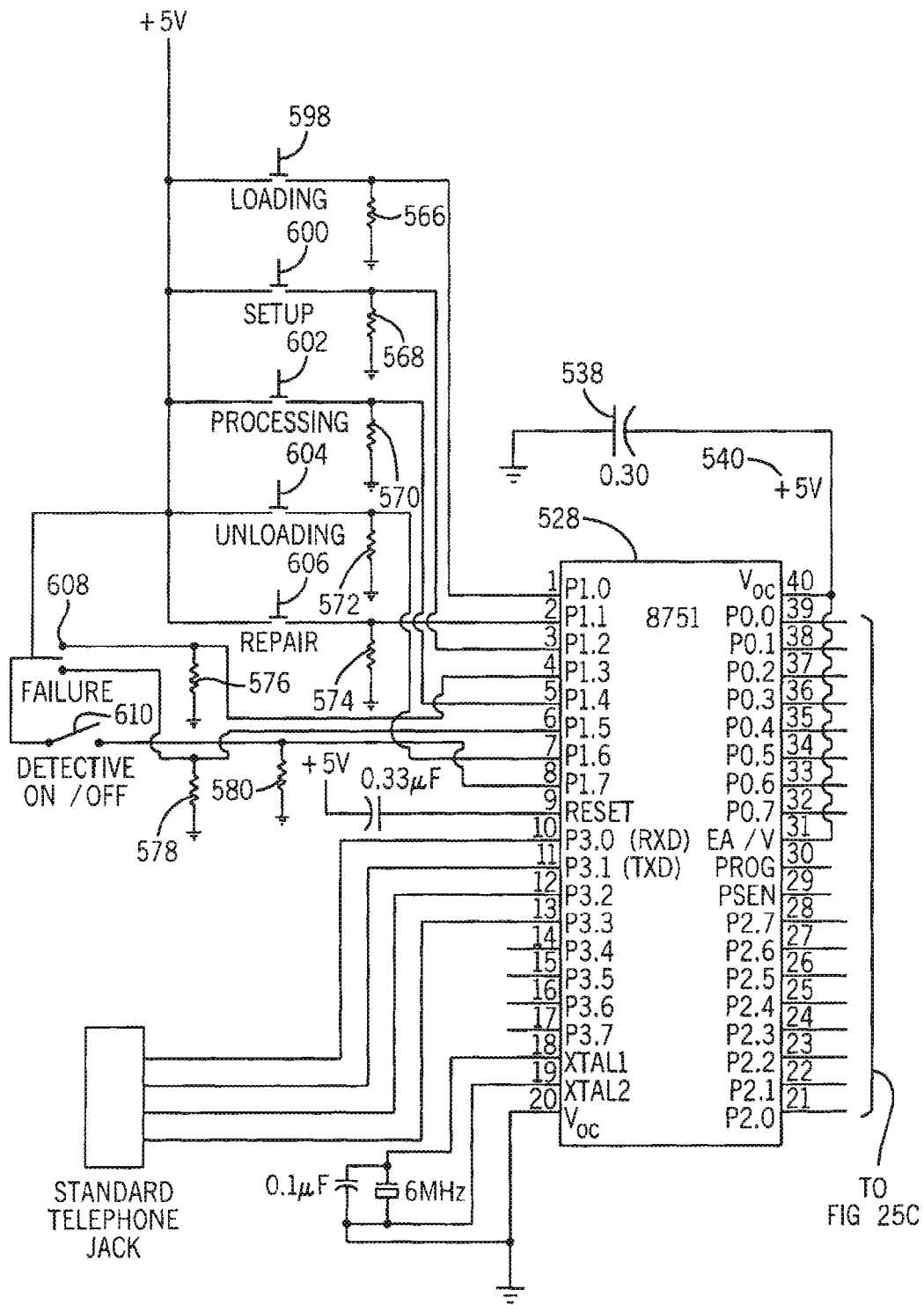
FIGS. 25B and 25C are a detailed schematic of the RTMS of FIG. 25A.
Figure 25C:
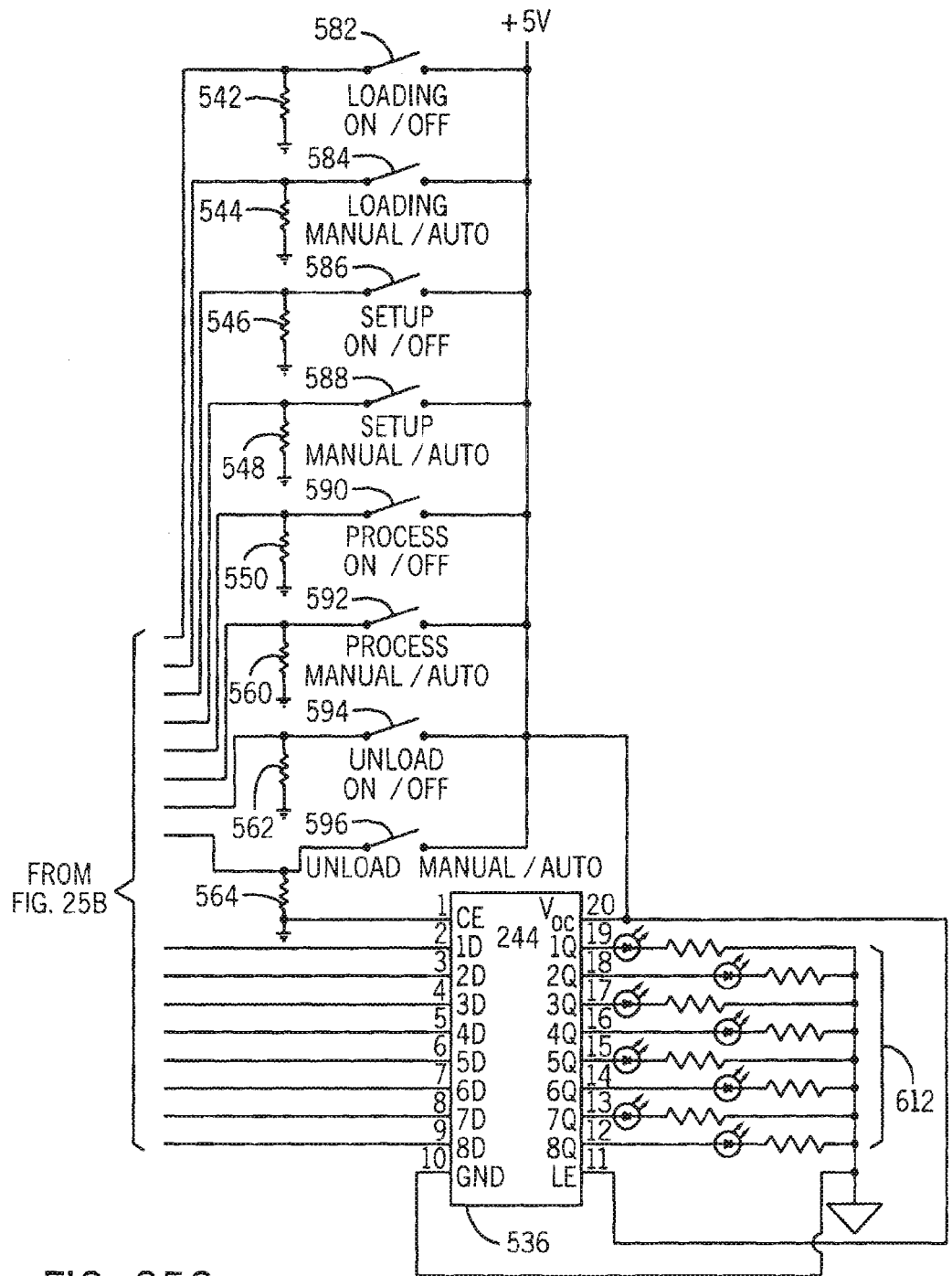
Figure 25D:
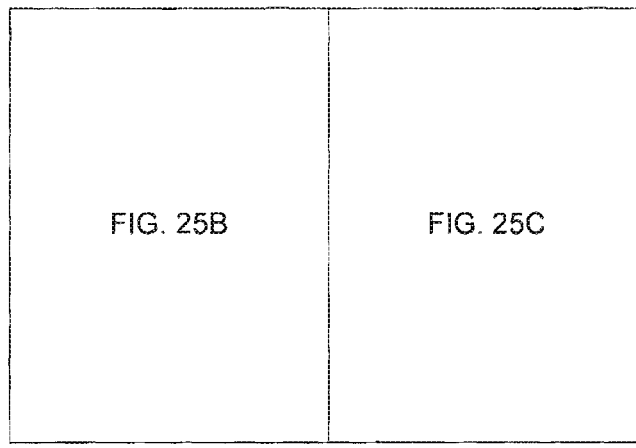
FIG. 25D is a schematic layout of the RTMS of FIGS. 25B and 25C.

Referring to FIG. 25B, which is detailed schematic of the qualitative schematic of FIG. 25A, the power supply 540 in the system is decoupled with a capacitor 538 (0.33 mF), which also serves as the capacitor enabling a power-on reset (an unused but possibly useful feature) on the microcontroller 528. Standard 9 pin 1 kΩ SIP resistor networks, including resistors 542, 544, 546, 548, 550, 560, 562, 564, 566, 568, 570, 572, 574, 576, 578, and 580, are used to pull down the inputs at port 0 and port 1 of the microcontroller 528. All non-communication related inputs are active high, with active being "on" for "on/off" switches and "automatic" for "manual/automatic" switches. Buttons 582, 584, 586, 588, 590, 592, 594, 596, 598, 600, 602, 604, 606, 608 and 610 are normally open (N.O.) switches. These buttons represents the buttons shown in FIG. 4.

The communications-related inputs are on P3.0 (RXD), P3.1 (TXD), P3.2 (CTS), and P3.3 (RTS) of the microcontroller 528. These signals, including the serial lines, are active low (i.e., a 0 driven by the RTMS 90 on RTS is a request to communicate, a 0 driven by the box on CTS is a go-ahead signal.)

For the lights driven by the latch chip 536, 3V active LED's is preferable to avoid complications related to other voltage levels. These LED's require a pull-down resistor to sink some of the input voltage, as 5V will cause the LED to bum up. For this, a 16 pin 220Ω DIP resistor network 612 is used.

Software Description

Most of the work in the RTMS 90 is performed by the software. The following is description of the algorithms and methods used in the software of the RTMS 90.

Figure 26:
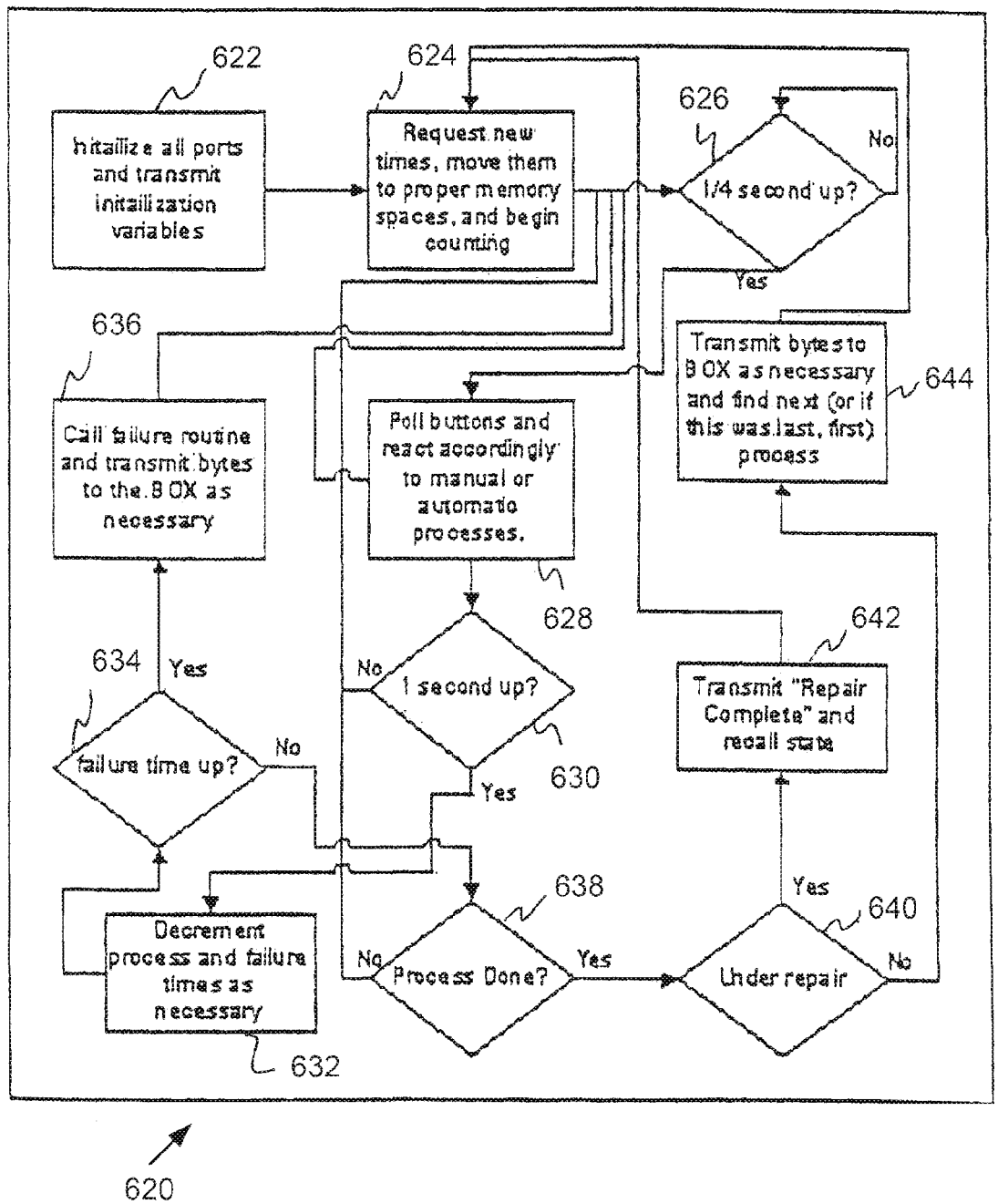
FIG. 26 is a flowchart of the software used to operate the RTMS.

Referring to FIG. 26, which is a brief flowchart of the software operation 620 of the RTMS 90 of the present invention, the software process starts at step 622 where the RTMS 90 initializes all ports and transmits the initialization variables to the computer 62. Flow proceeds to step 624 which requests new times (e.g., load, setup, processing and unloading times for the machine being simulated) and moves the times to the proper memory spaces and begins counting. Next, flow proceeds to decision step 626 which determines whether step 624 has counted up to ¼ of a second yet. If not, step 626 internally loops onto itself until the ¼ second target is reached. If the decision step 626 determines that ¼ second is up, flow proceeds to step 628 which polls buttons and reacts according to manual or automatic processes which has been preselected by the user. Flow then proceeds to a decision step 630 which determines if the buttons reacted within one second. If not, flow loops back to decision step 626. If so, flow proceeds step 632 which decrements the process and failure timers as necessary and moves to a decision step 634 which determines if the failure time has been exceeded. It may take 10 to 30 cycles before a machine fails. This failure time can be deterministic (based on a number of cycles) or the failure time can be based on a probability distribution. If the step 634 determines that the failure time have been exceeded, flow proceeds to step 636 which calls up a failure routine and transmits the bytes to the box 60. If the failure time at step 634 has not been exceeded, flow proceeds to decision step 638 which determines if the process is completed. If the step 638 determines that the process is not completed, flow loops back to decision step 626. If the process is completed, flow proceeds to decision step 640 which determines whether the RTMS 90 is under repair. If the step 640 determines that the RTMS 90 is under repair, flow proceeds to step 642 to transmit a "repair complete" message and recalls the machine state before looping back to step 24. If not, flow proceeds to step 644 which transmits bytes to the box 60 and finds the next operation process before looping back to step 624.

Basic Conventions—The "State" Variable

Much of the software's basic functionality lies in the hardware's mapping of switches and buttons having to do with the same process to "similar" pins of the microcontroller 528. The main idea is that each 8-bit port on the microcontroller 528 can be mapped directly to an 8-bit variable in memory. The "state" variable is defined as an 8-bit variable that contains a "1" in the bit representing the currently active state and a "0" in all others. By convention, the following bits of the state variable are assigned to the following RTMS processes shown in FIG. 27: byte is assigned to unloading, byte 4 is assigned to processing; byte 2 is assigned to setup; byte 1 is assigned to repair; and byte 0 is assigned to loading.

The assignment process provides the RTMS 90 with a trio of useful methods within the software. First, it allows easy determination of what exactly the next stage of operation is. For example, simply AND the state byte with the byte describing which states are on or off (this is port 1; it does not actually perform the AND with port 1, however. It reads port 1 into a variable at initialization and performs the AND with this variable. Since port 1 is only polled one time at start up, changing the switches attached to port 1 will have no effect afterwards. A non-zero result reveals that the state variable is pointed to be active. A zero result reveals that this state is not enabled and so the "1" within the state byte is rotated to point to the next state and repeat the process.

The second method is, in a similar way, to AND the state byte with the process buttons and check if the user is activating the button for the current state. Again a non-zero result reveals that the machine is "operating." The third similar method is to create the blinking process light that tells the user what state, demands attention next. By XORing the state variable with the lights port (port 2) at certain interval, a blinking effect is produced.

One of the three major functions of the RTMS is to determine what state is next in the operational process and to poll and activate the respective lights and buttons accordingly. The second major function is to be a clock of sorts and make a given state of operation the "current state" for a certain length of time as communicated by the computer and go to the next state after that time length. In short, if the user specifies that the "setup" process should take 40 seconds, the RTMS 90 assures that the setup process will take 40 seconds to complete.

The RTMS as a Counter

The 8-bit counter on board the RTMS 90 is extremely useful in this regard. The counter increments every few processor cycles and counts from 0x00 to 0xFF. When the counter overflows, the counter sets an overflow byte and starts counting again from zero. Given the length of the processor cycle when operating a 6 MHz, the arithmetic to determine the number of cycles in one second is as follows:

6 MHz—The crystal frequency $$\frac{1}{12}$$

—The fraction of the crystal frequency representing a machine cycle

256—Number of times the counter "ticks" before it overflows $$\frac{6000000 \cdot 1/12}{256} = 1953$$

So the counter needs to overflow 1953 times before one second goes by. The algorithm is as follows: First, two bytes representing the number of minutes and the number of seconds a process will last are moved into the "current process duration" space reserved in memory (along with a "time to next failure" if failure is enabled). Then, one counting register in the microcontroller 528 is set to 163, a second one to 3 and a third one to 4 ((163)(3)(4)=1953). Every time the counter overflows, the first register is decremented. Every time the first register gets to zero, the second is decremented and the first is reset, and when the second gets to zero the third is decremented and the second is reset. When the third register is at zero, the seconds part of the current process duration (and possibly the seconds part of the failure time) is decremented. Once there are zero seconds, the minutes is decremented and when time has finally run out, the current state byte is shifted to determine the next state as described above.

The two counting are combined into one so that the RTMS 90 can keep track of quarters of a second, and when the second of the aforementioned registers, the one set to 3, reaches zero, the RTMS 90 can determine that $¼^{th}$ of a second has passed.

This is useful for two reasons. First, the process buttons are only polled at these intervals. This has the consequence that a user will have to wait a maximum of ¼ of a second to garner a reaction from the machine when a process button is pressed. The other consequence is that it provides a primitive mechanism for button "debouncing." By only polling the switches every quarter of a second, the chance that the machine will pick up anything but a stable value is very small, as the button usually takes no more than a few milliseconds to stabilize.

The second reason is that it provides a frequency for the blinking of the next process light in the sequence. By using the logical XOR process with the state variable and the lights port described above, the RTMS next process light toggles every ¼ of a second-rapid enough to get the attention of the operator, but slow enough that there is no danger of seizure for epileptics.

FIG. 28 shows a table of the variables used in the software and their functions.

Communication—The Times Vector

Referring to FIG. 29, which shows the initialization byte breakdown, upon startup, the RTMS 90 immediately communicates two bytes (650 and 652) to the computer 62 (through the box 60). Byte 650 describes which states are on and which states are automatic (the byte transmitted is simply port 1). Byte 652 contains information regarding defect item production and failure. More specifically, byte 650 includes: a bit 7 designated for manual or automatic loading; a bit 6 for turning loading operation on or off; a bit 5 for manual or automatic set up; a bit 4 for turning setup operation on or off; a bit 3 for manual or automatic processing; a bit 2 for turning processing operation on or off; a bit 1 for manual or automatic unloading; and a bit 0 for turning unloading operation on or off. Byte 652 includes a bit 2 for process dependent failure, a bit 1 for operational dependent failure and a bit 0 for turning production of defective items on or off. Bytes 650 and 652 along with the "address" of the RTMS 90 are transmitted to the computer 62 at startup.

FIG. 29 shows a bitwise breakdown of each of these bytes in the order that they are transmitted. Following this, the first thing that the RTMS 90 does is request two "times vectors" from the computer. The times vector is a 15 byte block that contains three types of information: the duration of each process, including time to next failure and repair time, whether or not the next item produced will be scrapped or will need rework, and a variable that tells the RTMS 90 whether or not a manual process interrupted by the user (i.e., the user pushes the button, then releases the button) is resumed, indicating the current process when the user presses the button again or initiates the current process again from the beginning of the process duration.

This variable, called the "reset" variable, also contains a bit that dictates the reset behavior after a repair operation. If the RTMS 90 fails midway through a given process, the RTMS 90 checks this bit upon completion of the repair operation to see if the process is to be resumed or reset. The rest of the bits in the variable are used in much the same way that the next state is determined; if a manual process is interrupted before it is finished, the state variable is ANDed with the reset variable. A non-zero result here would require the reset of the current process duration to its starting value, whereas a zero leaves it to be picked up where it is left off.

FIG. 30 is a table of the times vector and the functions of each byte, as well as a bitwise breakdown of the reset variable.

Communication—Message Transmission

Referring to FIG. 31, the RTMS communications system is event-driven. There are several events which the computer 62 must know about in order to synch the GUI with the actual operation of the RTMS 90. These include the need for a new times vector; the completion of a stage; the production of an item and the status of that item produced; the interruption of a manual process; the arrival once again at the first stage of the operation of the RTMS 90; and the failure and repair of the RTMS 90.

There are actually a total of ten messages that the RTMS 90 can transmit to the computer 62. The messages take the form of one-byte serial transmissions and are shown in FIG. 31. The messaging system hedges on a relativistic approach to communication of the current state, meaning that the RTMS 90 does not relay its actual state to the computer 62, but rather upon completion of a stage communicates a "to next stage" message. The computer is aware of what the next stage is due to the initialization bytes and reacts correctly.

The RTMS 90 transmits the "to next stage" message byte both when starting and finishing a stage. This is because for every state that is turned on (i.e., loading, processing, etc.) there is another state just before it that might be labeled "waiting to load" or "waiting to process." These intermediate stages also provide a place to go back to when a manual process is interrupted. Furthermore, the RTMS 90 does not rely on the computer 62 to "wrap" back to the first stage upon completion of the entire process cycles, but rather the RTMS 90 reserves a "waiting for object" message to tell the computer 62 that RTMS 90 is in its first state once again. This is designed in mainly to re-synch the computer 62 and RTMS 90 in case of the relativity of the system going astray due to a lost "next stage" message. It essentially functions as a recovery.

Special Cases—Defective and Failure

Upon completing the process cycle, the RTMS 90 checks the two Boolean variables in the times vector. If neither of them is set, the "object processed" message is transmitted. If one of them is set, then the appropriate message regarding the object status is transmitted.

Regarding the failure feature of the RTMS 90, the failure time is loaded into a designated variable along with the current process duration and is decremented each second. When it reaches zero (in the event of a tie between failure and process complete, the machine fails) the RTMS 90 calls a failure routine. This routine pushes the current process time, state variable, and state pointer (see FIG. 28 for the functionality of the state pointer) into storage locations, sets the state variable to 0x02 (repair), and loads the repair time into the current process duration space.

When the repair operation is complete, a call to a recovery routine is issued. This routine pops the state pointer and state variable from storage. It then checks the reset variable to see if the interrupted process is to be reset or resumed. If it is to be reset, the bytes currently pointed to by the state pointer are loaded into the current process duration space. If not, the pushed current process duration is popped back into place.

Description of the Box

Referring back to FIG. 1, the box 60 is the second main functional unit of the RTMS system. It acts as a serial hub for the connected RTMSs 52, 54, 56 and 58 and passes messages on to the computer 62. The following is a description of the electrical circuitry and logic onboard the box 60.

Hardware Description

Figure 33A:
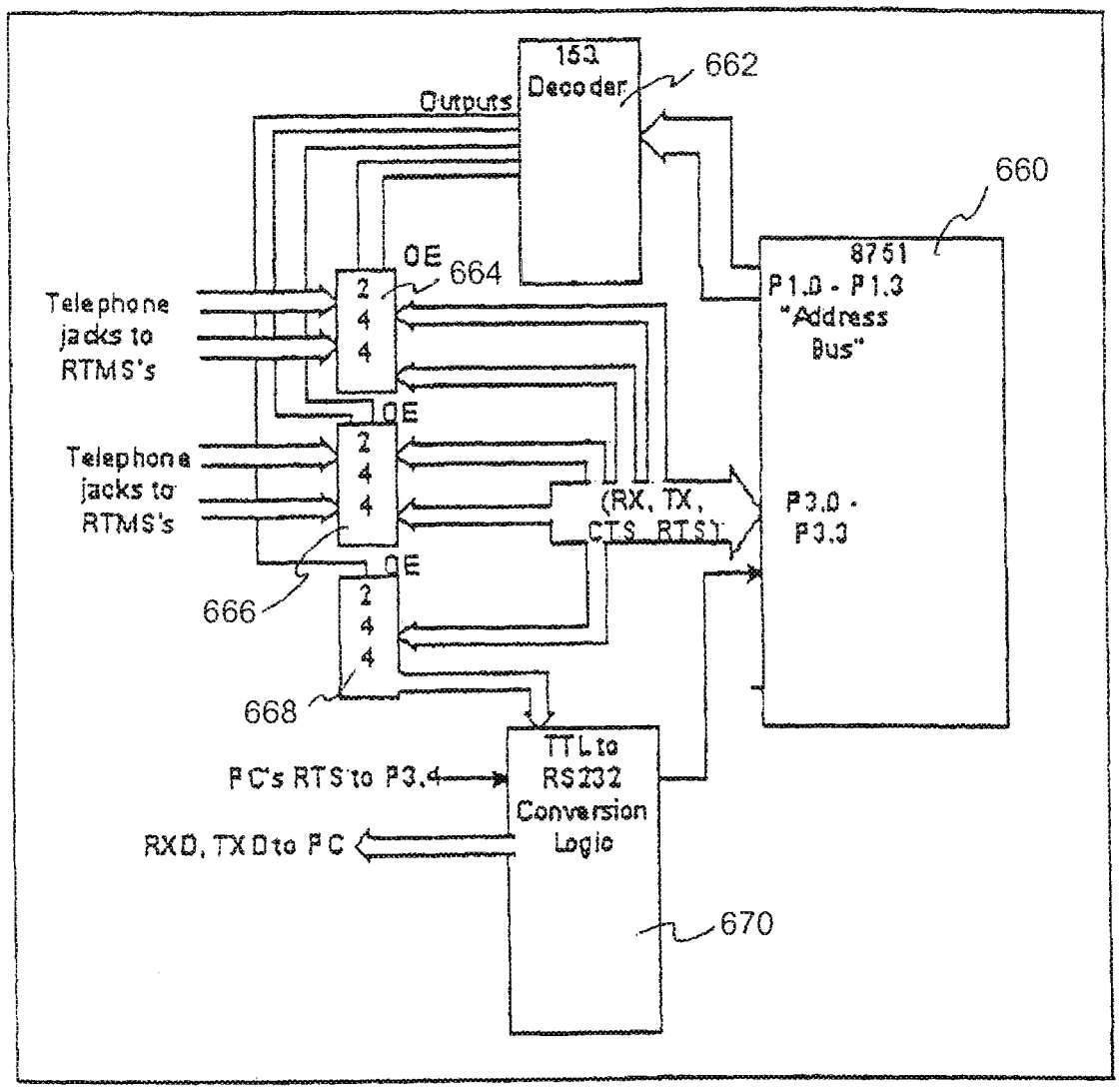
FIG. 33A is a qualitative schematic of the box shown in FIG. 1.

Referring to FIG. 33A, which is a qualitative schematic of the box 60, as with the RTMS 90, the box 60 is driven mainly by an Intel 8751 microcontroller 660, as described earlier. The other main elements are a 153 4 to 16 address decoder 662, three 244 octal buffer/line driver 664, 666 and 668, and the "serial communications unit" 670 consisting of the MAX235 5V powered RS232 conversion unit 672 (FIG. 33B), a 7404 hex inverter 674 (FIG. 33B), and several discreet components. The functionality of each of these components will be described in detail below.

Addressing System

Figure 33B:
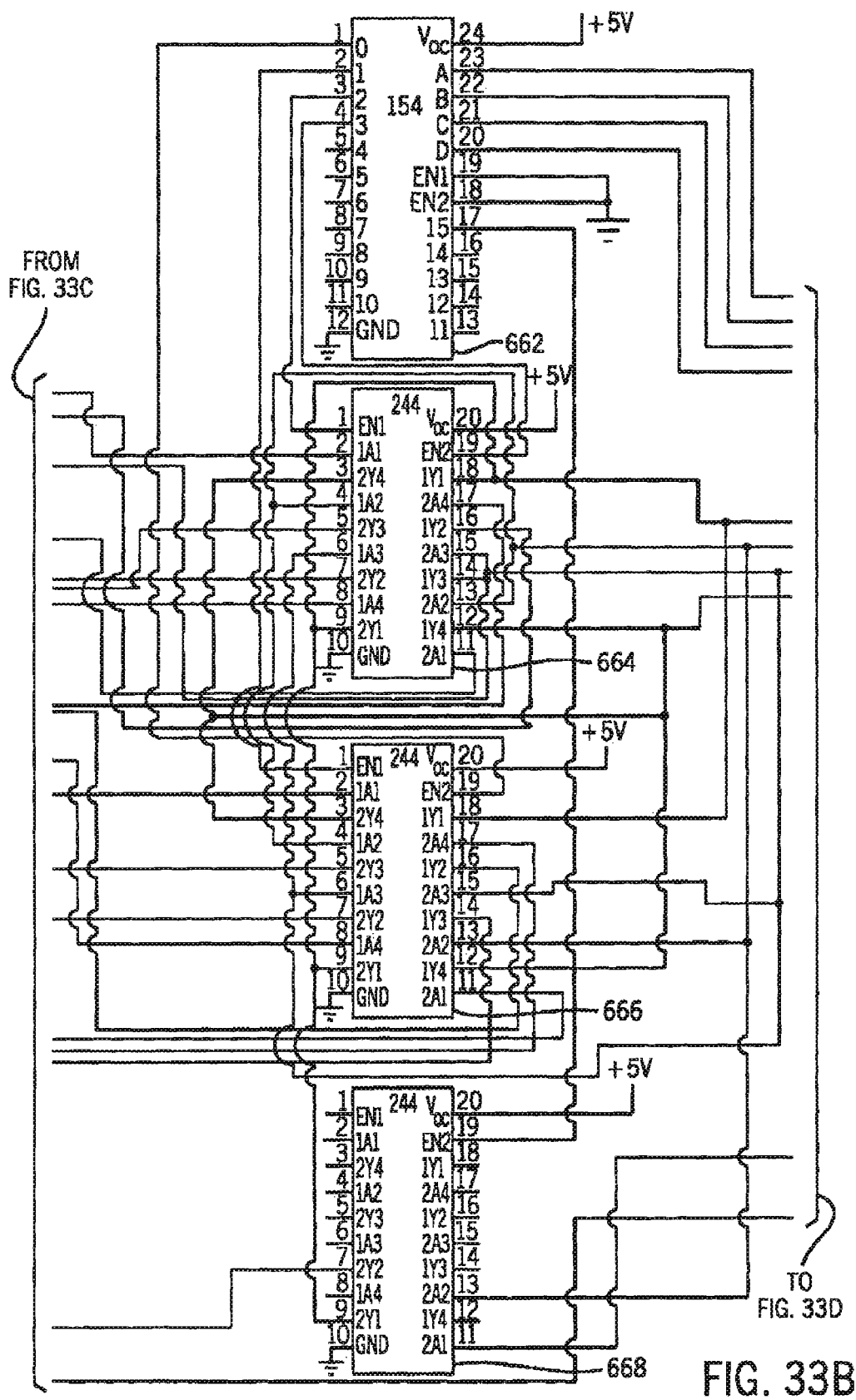
FIGS. 33B, 33C and 33D are a more detailed schematic of the box of FIG. 33A.
Figure 33C:
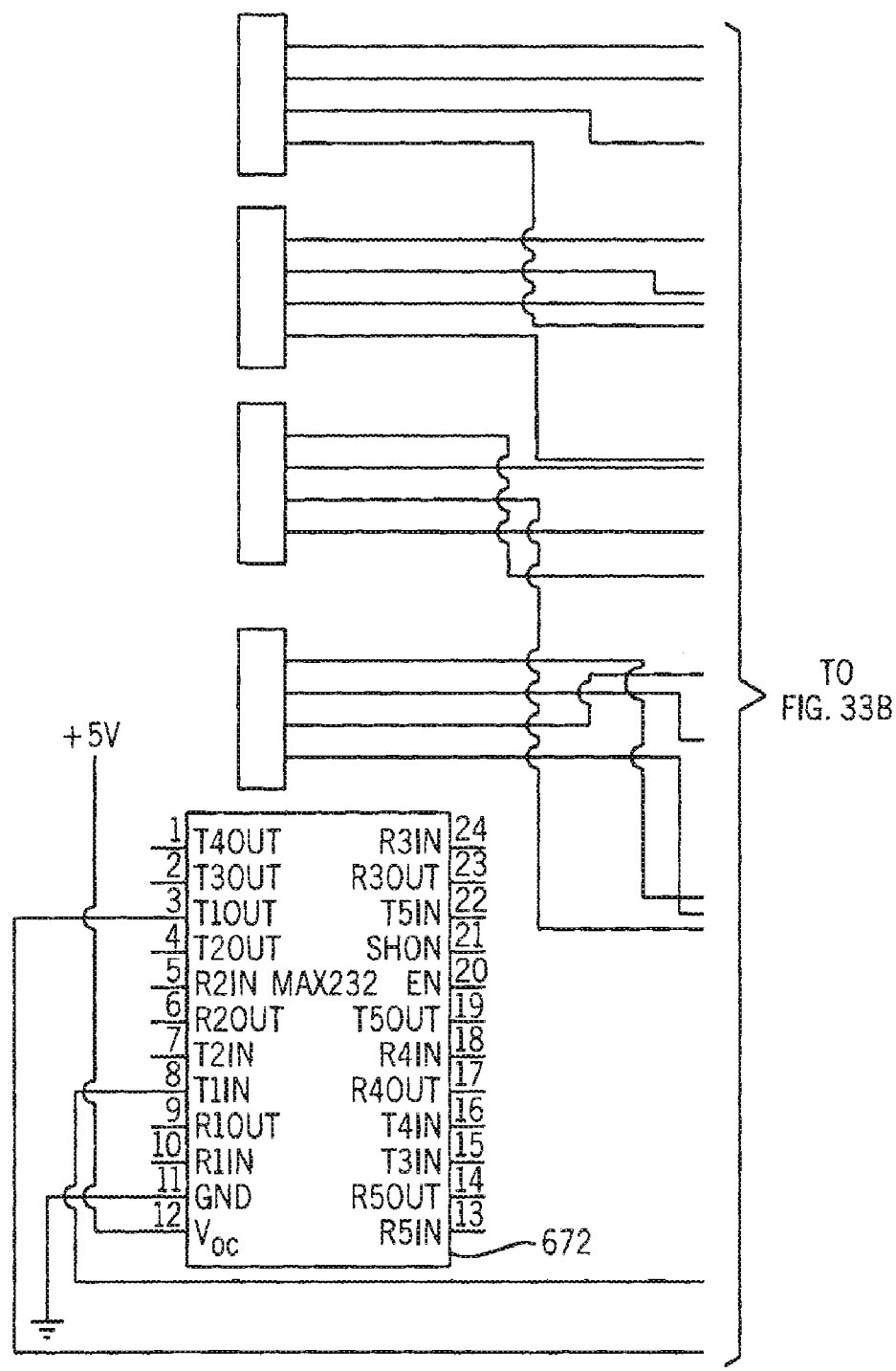
Figure 33D:
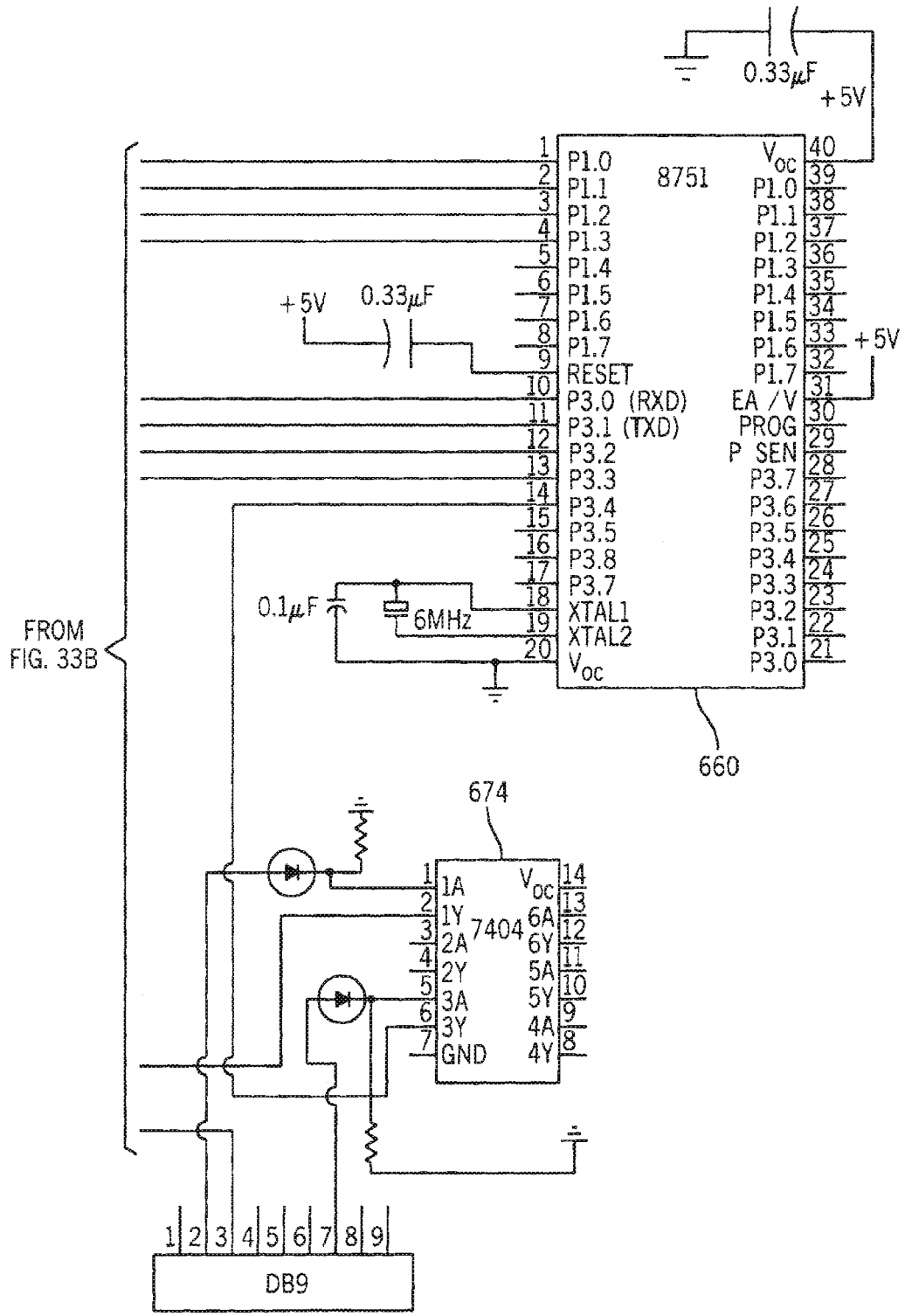
Figure 33E:
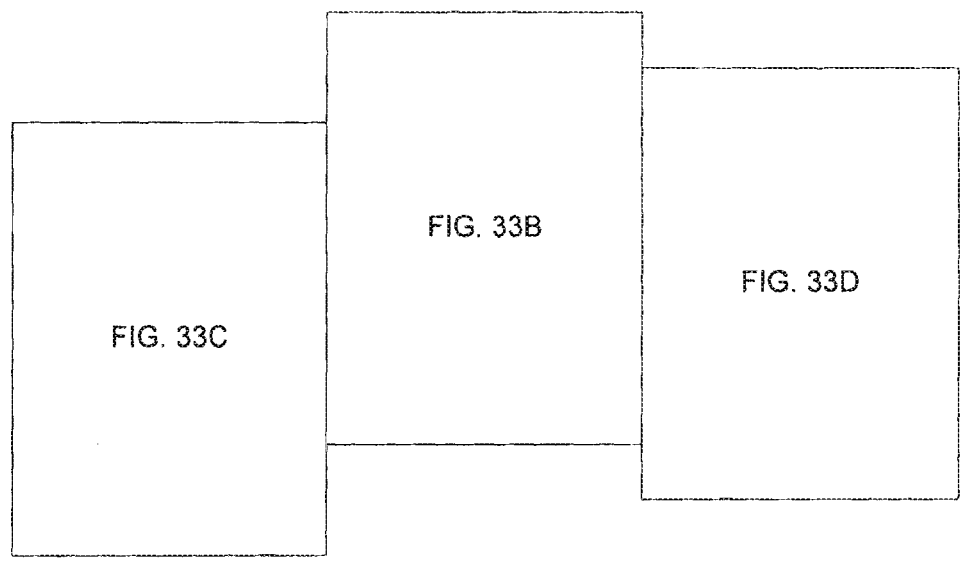
FIG. 33E is a schematic layout of the box of FIGS. 33B, 33C and 33D.

Referring to FIG. 33B, many of the pins on microcontroller 660 of the box 60 is unused. As can be seen from both the qualitative and full schematics of the box 60, the bottom pins of port 0 are fed to the four inputs of a standard 4 to 16 decoder. The decoded outputs of the decoder 662 are in turn fed down two-by-two to a series of line drivers 664, 666 and 668.

For the sake of expandability, a 4 to 16 decoder 662 is implemented. Since the software currently supports 15 machines, it is an easy step to do the same for the hardware. One skilled in the art recognizes that to expand the system, additional line drivers and phone jacks can be added, and one can swap out the existing microcontroller 660 with a more robust chip.

The scheme is simple: the internal software of the box 60 puts the "address" of one of its connected machines on port 0. This causes the appropriate line in the active low decoder 662 to go low. Since this line is connected to the one of the output enable (OE) pins of one of the line drivers (664, 666 and 668), this pin goes low and that "side" of the line driver goes active, opening a channel between the microcontroller 528 and 660 of both the box 60 and the connected RTMSs.

This works because the line drivers 664, 666 and 668 are a "dual enable" chips. It is indeed an octal driver, but the first OE pin controls four of the ins and outs, and the other four are controlled by the second. Since the RTMS 90 is bussing a total of four signals between the box 60 and the RTMS 90, the bottom four pins of P3 of the box 60 can be tie to each nibble of each line driver 664, 666 and 668. As previously discussed, in the communications scheme, two signals, RXD to TXD and RTS, are driven by the RTMS 90. The box 60 drives the other two, TXD to RXD and CTS. This means that the two signals must be tied from the box 60 to the "input" side of the line drivers (664, 666 and 668) and the other two to the "output" side of the line drivers 664, 666 and 668. The other two inputs and the other two outputs are tied to the wires on a standard RJ11 phone jack and bussed over to the RTMS 90. In this embodiment, only two RTMSs per line driver are needed to minimize the chip count.

The channel reserved for the computer 62 is channel 15 on the decoder. The TTL voltages levels for "0" and "1" are 0V and 5V, respectively. The respective voltage levels for the RS232 (computer) protocol are +12V and −12V. Hence, a converter circuit is need. For example Maxim-IC makes a circuit, the MAX235, that performs the conversion.

The Serial Communications Unit

The MAX235 is a 5V-powered TTL to RS232 converter, a preferred circuit for the present invention. It uses a series of onboard capacitors as a charge pump to output the required +12V. Preferably, this circuit can be placed "in between" final line driver of the box 60 and the serial port of the computer 62. This way, the line driver will never experience a non-TTL voltage and the computer 62 will never see a non-RS232 voltage.

First, the RS232 line from the computer 62 is put through a diode 676 (FIG. 33B). After the diode 676, there is an inverter 674 with a pull-down resistor 675 at the input pin. The −12V case, which is zero after encountering the diode, becomes 5V after being put through the inverter 674. If the line is at +12V, the resistor sinks quite a bit of the voltage on the current poor serial line. If the correct resistance value (around 680Ω) has been chosen, the voltage will be pulled down to +5V, and through the inverter 674, it will become zero.

Software Description

Figure 32:
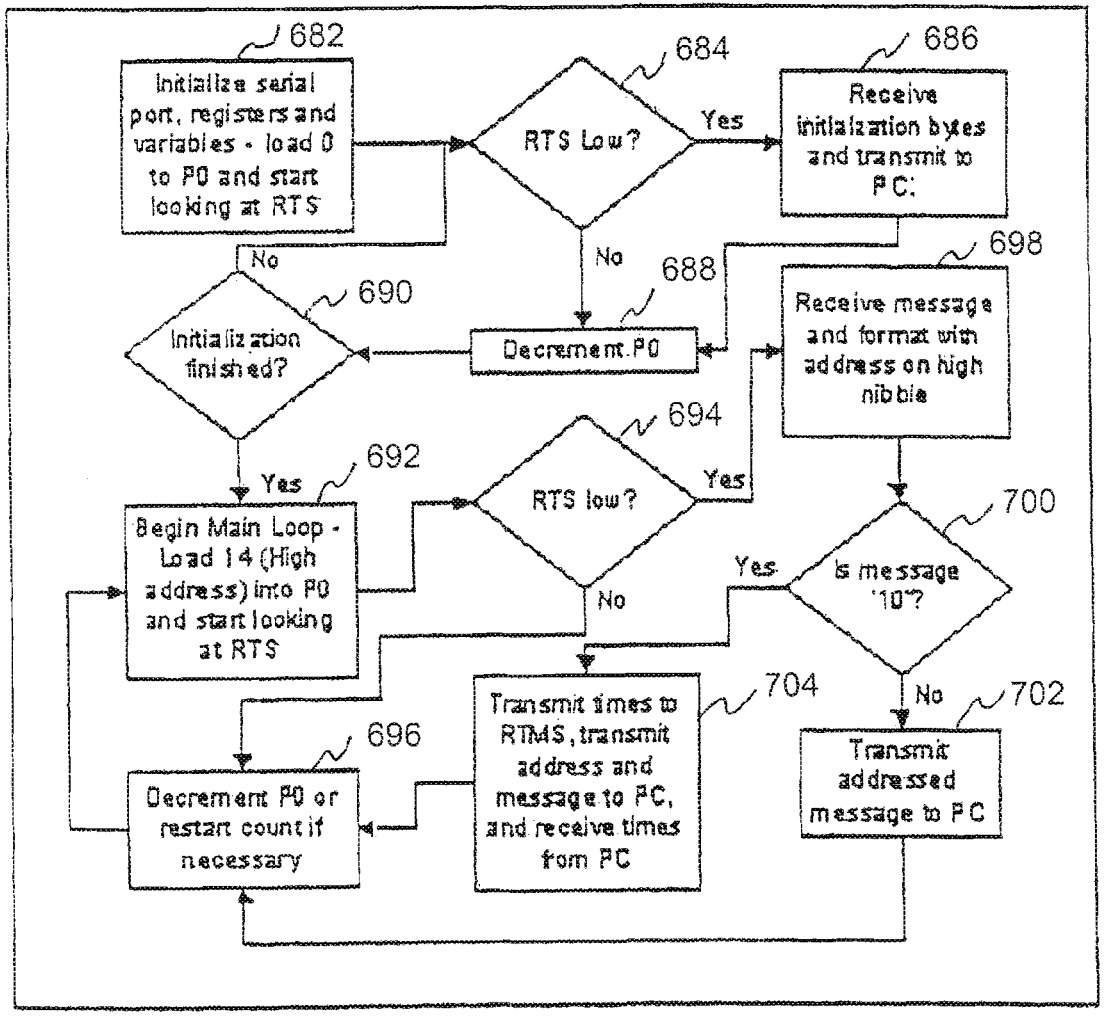
FIG. 32 is flowchart of the software used to operate the box shown in FIG. 1.

FIG. 32 is a basic flowchart of the software operation 680 of the box 60. The main work of the box 60 is preformed by the software. The software operation of the box 60 begins at step 682 which initializes the serial port, the registers and variables. Flow proceeds to a decision step 684 which determines if the RTS line 516 (FIG. 22) is low. If so, flow proceeds to step 686 which receives initialization bytes and transmits the bytes to the computer 62 before proceeding to step 688 which decrements the port 0 of the microcontroller 660. If not, flow also proceeds step 688. Next, flow proceeds to decision step 690 which determines if the initialization is completed. If not, flow loops back to step 684 and repeats step 686 and/or step 688. If so, flow proceeds to step 692 which begins to load high address into port 0 of the microcontroller 660 and starts to look at the RTS line 516. Flow then proceeds to decision step 694 which again determines if the RTS line 516 is low. If not, flow proceeds to step 696 to decrements port 0 or restart the count. If so, flow proceeds to step 698 which receives message and format with address on high nibble. From step 698, flow proceeds to decision step 700 which determines if the message is "10" which is the message code for new time vector (FIG. 31). If not, flow proceeds to step 702 which transmits addressed message to the computer 62. If so, flow proceeds to step 704 which transmits times to the RTMS, transmits address and message to the computer 62, and receives times from the computer 62.

Initialization

The lowly signal running directly from the computer 62, through the inverter 674, directly to P3.4 on the microcontroller 660 of the box 60, shown in FIGS. 33A and 33B. Upon powering up, the first thing that the box 60 does is wait patiently in a loop for this signal to go low. This is to make sure the computer 62 is ready for communication from the box 60, and that all RTMSs connected are powered on and ready to communicate with the box 60. Once the computer 62 is indeed ready, it drives CTS 514 (FIG. 21) low and waits for the box 60 to speak.

The box 60, at this point, breaks from the loop and puts address '0x00' on the pins of port 0, which in turn drives the address decoder 662 and the proper line driver (664, 666 and 668). If "RTMS 0" is connected, it will be driving the RTS signal low. The box 60 will see this, drive CTS 514 and receive the two initialization bytes sent from the RTMS 90. It saves these bytes in register, along with the current value of port 0, then puts address '0x0F' on port 0 so that it can talk to the computer 62. The box 60 transmits the saved value of port 0 (the address), along with the two initialization bytes transmitted from the RTMS 90. After transmission, the box 60 increments the saved value of port 0, puts it back on the pins, (now the value is 0x01) and starts the process again.

Eventually, the box 60 gets to address 0x0F, which is the computer 62. It has been counting, so it knows that this is the final address. It then transmits the byte 0x10 as a termination byte. When the computer 62 receives the termination byte, it holds the CTS signal high again. The box 60, after transmitting the termination byte, waits patiently in a loop once again for CTS 514 to go low. At this point, the user at the computer 62 is inputting information about the stage length and other details for each of the connected RTMSs. When the user is ready, a button is clicked and the CTS signal is driven low, and the box 60 goes into the main simulation loop.

Memory Management

As previously discussed, the RTMS 90 has to make the call for a new times vector twice at the beginning of the simulation. This is due to the way the box 60 handles its memory. Internally, the box 60 has a series of 15 byte storage areas, each one for a specific RTMS. When the RTMS 90 requests a new times vector, the box 60 transmits the 15 bytes within that storage area. Afterwards, it forwards this message to the computer 62, which broadcasts a new times vector into that storage area with the box 60. Basically, the RTMS 90 is getting its times vector second-hand from the computer 62.

Since all the storage areas in the box 60 are initially set to zero, the first request from the RTMS 90 will get a vector of only zeros. After broadcasting this vector, the box 60 looks to the computer 62 for an actual set of times. The second request from the RTMS 90 provides a true times vector—the one just given to the box 60 and the box 60 transmits this vector and gets a new one of its own.

Preferably, to speed up wait time the intermediate vector is stored. Instead of waiting for two transmissions at 1200 baud (from computer 62 to box 60 and box 60 to RTMS), the RTMS 90 only has to wait for one. The other transmission is conducted "behind the scenes" and becomes immaterial to the wait time experienced by the RTMS 90.

The Main Loop

Referring to FIG. 32, the main loop that the box 60 goes through is described in FIG. 32, step 692. The main loop of the box 60 starts with address 0x0E and checks the RTS signal. If the RTS signal is being driven low, the RTMS 90 at that location has something to say. If The RTS signal is not, the RTMS 90 at that location is silent. Port 0 is decremented to the next address and the sequence continues until the address reaches 0x00, at which point 0x0E is reloaded into port 0, and the sequence is starts again.

If there is a message, the box 60 drives CTS and waits for the transmission. Once it receives the transmission, it checks to see if it is a request for new times. If it is not, the box 60 multiplies the address on port 0 by 16 and uses logical AND with this number and the message. The box 60 then forwards the formatted message to the computer 62 and moves on. A message is thus created for the computer 62 where the high nibble is the address of the machine and the low nibble as the message itself. The computer 62 can then do some logic and parse out the address and original message.

If the message is a request for a new set of times, the box 60 transmits the fifteen-byte times vector to the RTMS 90, which should be sitting in a loop, waiting for the transmission. The box 60 then forwards this message to the computer 62, by the process described above and waits in a loop of its own, anticipating that the computer 62 will be transmitting a new times vector.

The vast majority of the actual work of the simulation happens within the computer software. The computer 62 is also responsible for keeping track of the statistics in simulation. FIG. 34 is a table of all files used in building the program and their basic functionality.

Figure 35:
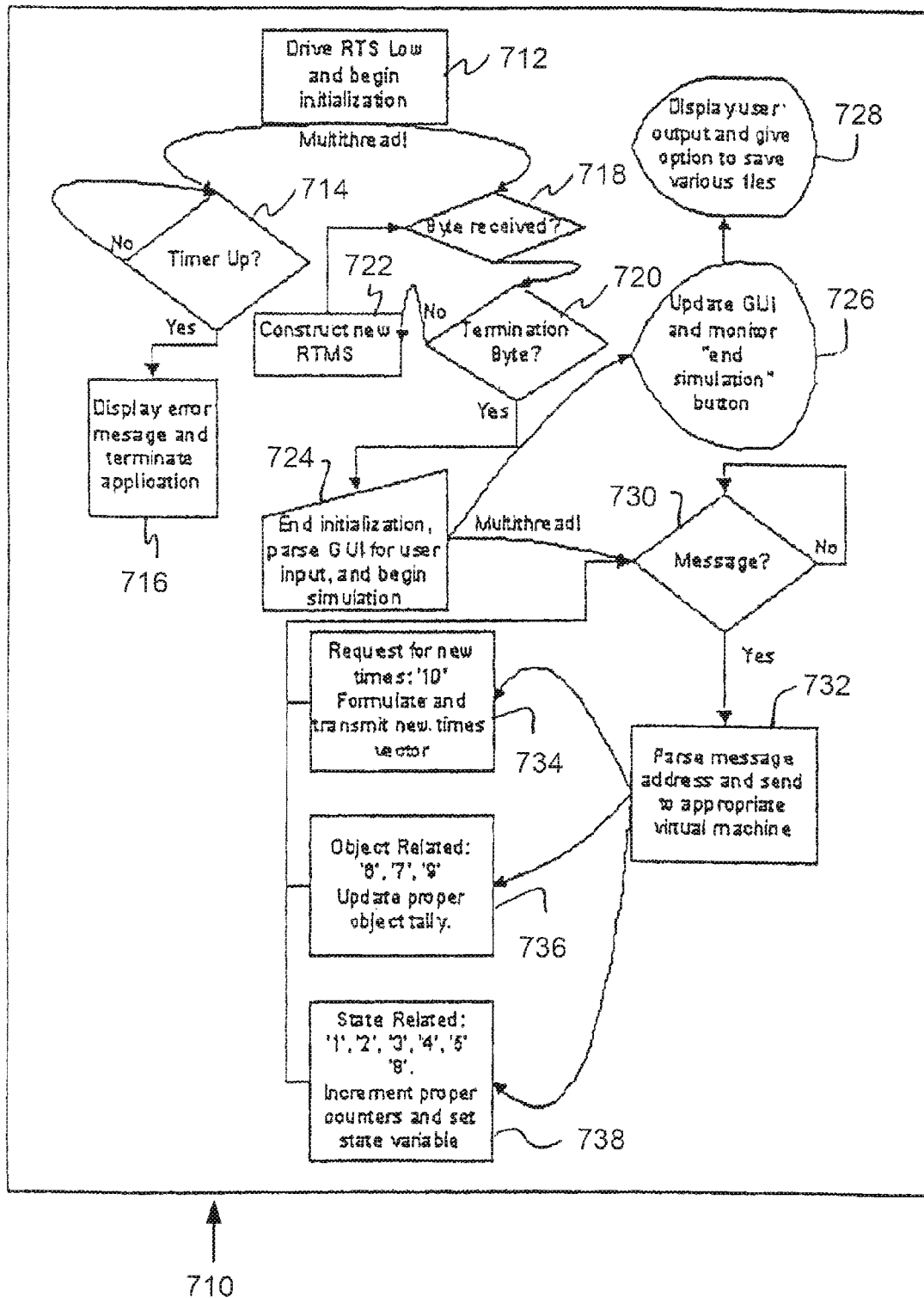
FIG. 35 is a basic flowchart of the operation in the computer software.

FIG. 35 is a flowchart describing the basic flow of operation 710 in the computer software. The process begins at step 712 which drives the RTS line 522 low and begins the initialization process. Flow concurrently proceeds to a decision step 714 which determines if the preset timer is up and a decision step 718. Referring first to step 714, if no, the computer 62 waits for the RTS line 522 to go low. If so, flow proceeds to step 716 and displays the error message and terminate the application. Referring now to step 718, flow proceeds to decision step 718 which determines whether a byte address was received from the box 60 and transmit a termination byte to the box 60 at step 720. At this point, the computer waits for the user to input information for the RTMS. If information is entered, flow loops back to step 718.

Returning to step 720, flow proceeds to step 724 which end the initialization process, parse the GUI for user input and begins simulation. Next, flow concurrently proceeds to steps 730 and 726. Referring first to step 726, the computer 62 updates the GUI and monitor. From step 726, flow proceeds to step 728 which displays the user output and gives options to save the output in various file formats.

Returning to step 724, flow proceeds to decision 730 to determine if a message is received by the computer 62. If not, flow waits until a message is received. Once a message is received, flow proceeds to step 732 which parses the message address and sends it to the appropriate virtual machine. Next, flow proceeds to step 734 to request new times and to formulate and transmit new times vector. From step 732, flow also proceeds to step 736 to update proper object and step 738 to increment proper counters and sets state variable. Steps 734, 736 and 739 then loops back to step 730 and the process repeat.

Classes Developed

The following is an overview of the classes developed for the RTMS 90.

Class "serialCom"

The "serialCom" class is put together using functions derived in part from a "ComAccess" class, found on the Internet and freely distributed. This version of the class, called "serialCom" is very heavily modified from the ComAccess class, although this class is extremely useful in construction of the base architecture and understanding of the convoluted way in which the Windows kernel utilizes available serial ports.

The utility of the class lies in that the calls to communicate for the rest of the program are made far easier to understand. The reading of the bytes, serial port settings, error flags, event flags, and names of handles are all stored within this class rather than outside and exposed. A call to read a byte from the serial port often allows several commands and error conditions. With the class, the entire process is reduced to a single pointer, entitled "talker" in most of the program. To read or write a byte, simply give talker the source or destination byte:

char message=talker->readByte (&message);

talker->writeByte (&message);

The ComAccess class initially would riot transmit or receive more than two or three bytes in succession from the box 60. Through experimentation, it is found that this is due to the fact the ComAccess class is "overlapped," meaning that it is threaded separately from the rest of the program. Since Borland C++ Builder is used to construct most of the project, threading within the C++ code became almost a non-issue and the overlapped nature of the ComAccess class is removed. This involved replacing FILE_FLAG_OVERLAPPED with NULL in the constructor for the device handle.

Several functions were added which were not previously present in the ComAccess class. These were: char readByte (char &); void writeByte (char &); void writeArray (char[ ]); void setIn ( ) and void clearIn ( )

The use of the first three is fairly obvious; they are used to read and write bytes from and to the serial port. The last two are used to set and clear the RTS line out of the serial port—that is, to give the box 60 the two go-ahead signals on P3.4. These were written mainly for the sake of convenience and clarity within the rest of the program.

The final modification made to this class is to take out the options available for configuring the serial port. Since the settings on the serial port of the box 60 are perpetually 1200, 8, n, 1, then there is truly no need for the settings of the serial port of the computer 62 to be any different. The only reason to change would be that the software now assumes that COM1 is always available. If it is not, the program will fail.

Class "rtms"

The "rtms" class is the heart and soul of the engine. It is structured such that a virtual RTMS is created within the computer as the simulation runs. Its functions have to do primarily with counting events, measuring time, and keeping track of the status of the RTMS 90.

The two bytes that each RTMS transmits at power on tell the computer 62 (within the "manager" class, described below) to construct a virtual rtms with the following statistics.

Within the constructor for rtms, the computer parses bitwise the two bytes sent to it, which are exactly the switch states of the RTMS 90. Through this process, it can be determine if stages are on or off and manual or automatic. The results of this parsing go into an oft-referenced array called procFlags [8], an eight-member Boolean array mirroring the switches on the connected RTMS. The computer 62 also parse for operationally dependant failure, process dependant failure, and defective item production, and fill in the Boolean variables failureFlag, procDeptFlag, and defectiveFlag accordingly. The fast state and last state of operation can also be determined, which are useful in determining when an item has been produced.

Next, how the "to next state" message affects the status of the rtms, and how the computer (provided no bytes are lost) can keep constant track of the state of the machine is further discussed. Basically, the computer 62 knows which states are enabled, and it is a simple bit of code to determine which one is next, last or first.

The class also keeps track of just about everything thing the machine does. The class has a tally for objects processed, objects needing rework, objects scrapped, and number of times machine has failed. The class has two small arrays entitled "totalLength" and totalTimes which keep track of how long and how many times each process in the operation of the RTMS 90 has occurred. The class also keeps track of how many objects are left in the queue of the RTMS 90, which, of course, can be added to or taken from by other RTMSs.

Yet another thing that rtms takes in tow is all of the input gathered from the UI before the simulation commences. This includes two numbers associated with each randomly generated time and a distribution associated with each time, stored respectively in the arrays MinMaxTimes [12] and distributions [6]. The two numbers have different meanings depending on the distribution selected. If the distribution is uniform, the first number is a minimum, the second is a maximum, and the actual time broadcast to the RTMS in the times vector has a random chance of being generated anywhere on that interval.

Figure 36:
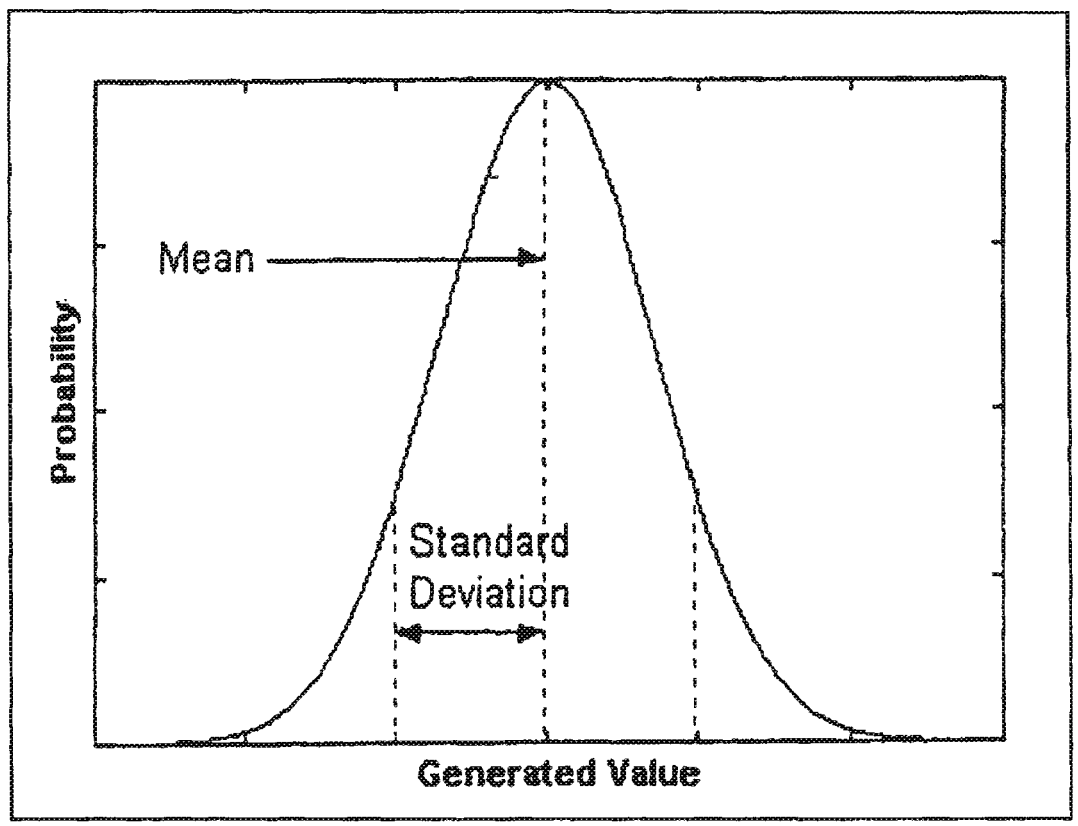
FIG. 36 is a graph showing how the time parameters are related to the Gaussian distribution.

The graph in FIG. 36 gives a picture of how the time parameters are related to the distribution itself. If the distribution is Gaussian (or normal), the first number is a mean, the second is a standard deviation, and the random number follows the normal distribution. The normal distribution is approximated within the computer 62 using the Box Muller algorithm for generating normal random deviates.

Figure 37:
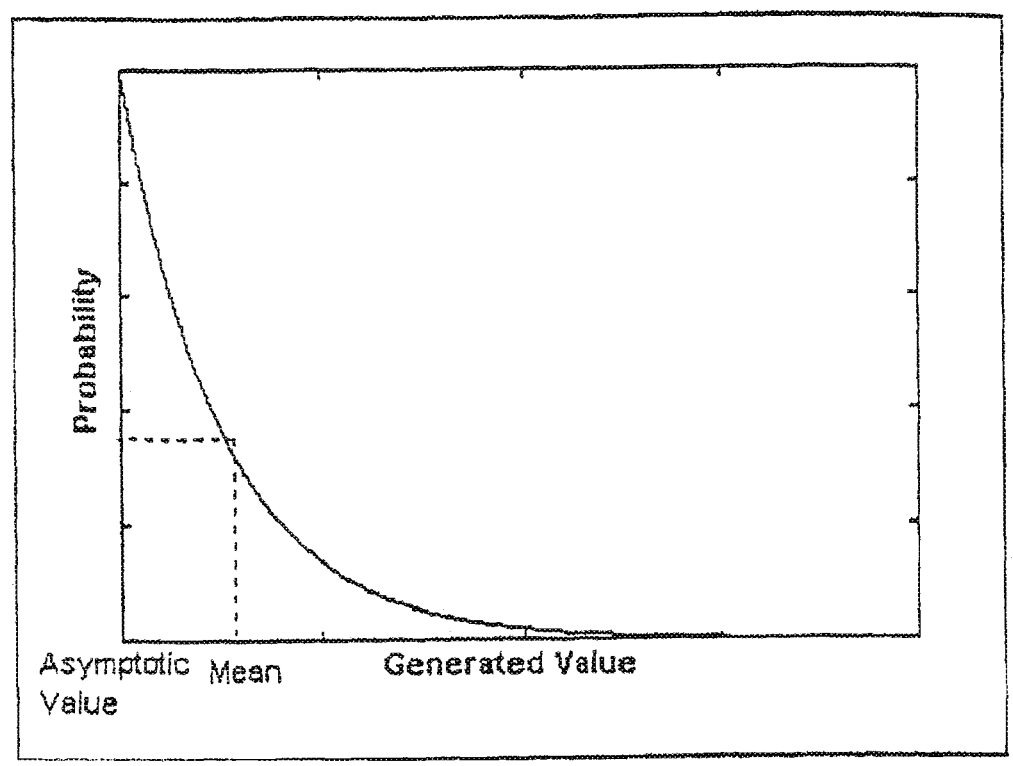
FIG. 37 is a graph showing an exponential distribution.

The graph in FIG. 37 shows the exponential distribution. If the distribution is chosen to be exponential, the first time is an average, and the second is a minimum time—that is, the asymptotic value of exponential distribution. Used here is the standard transformation for changing a uniform random deviate to an exponential random deviate. This is accomplished by generating a uniform random deviate in the range 0 to 1 and taking the negative natural logarithm. The result is multiplied by the first number and to this is added the second number.

Figure 38:
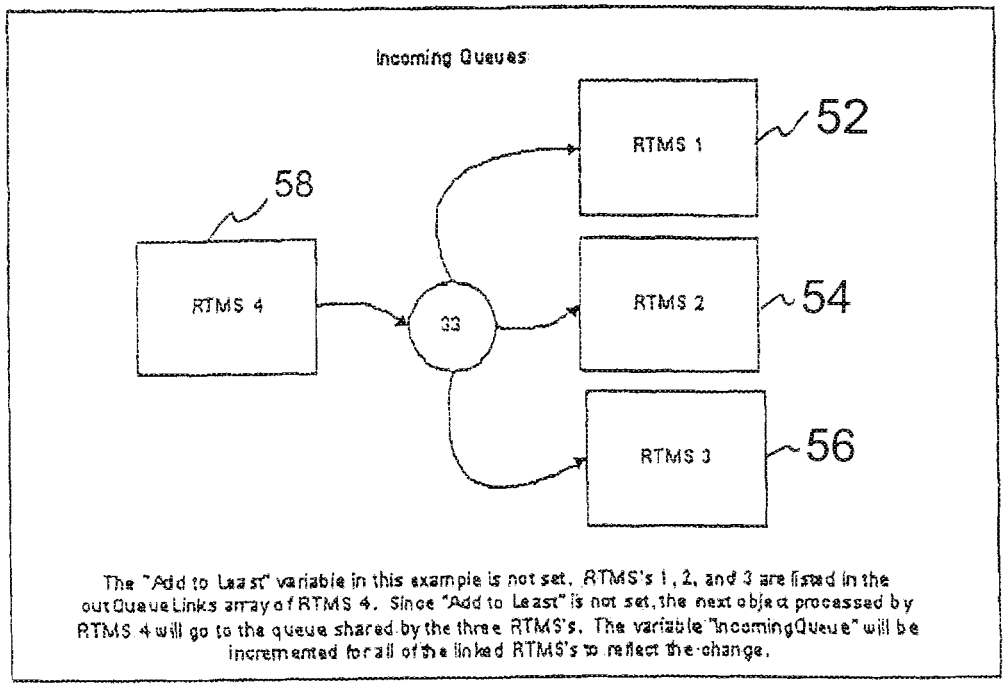
FIG. 38 is an illustration of how two or more RTMSs share queue when "Add to least" is not set.
Figure 39:
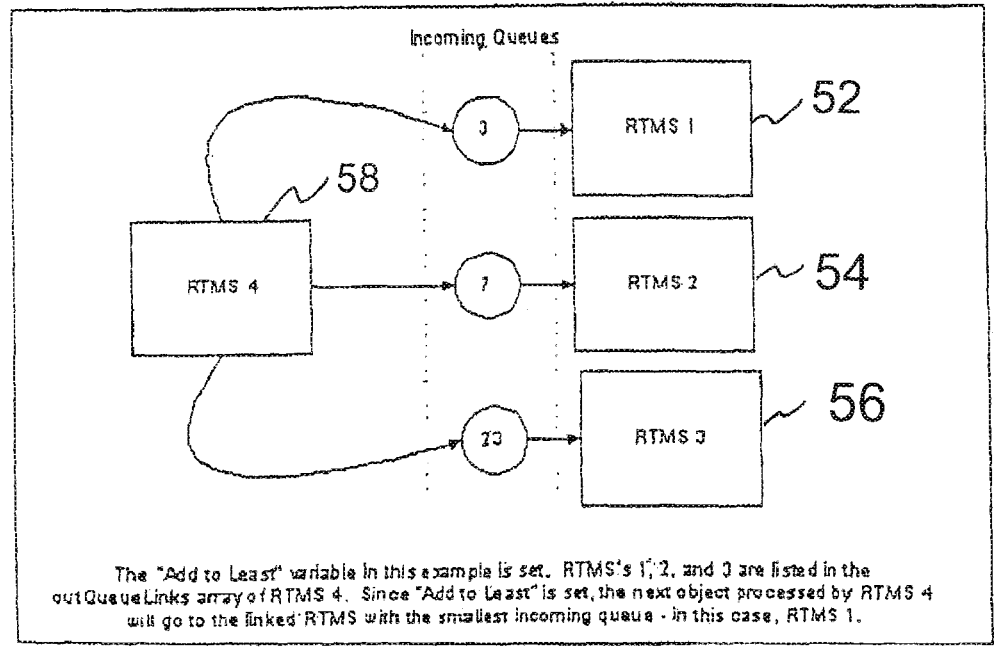
FIG. 39 is an illustration of how two or more RTMSs share queue when "Add to Least" is set.

There are also a set of three arrays that serve as "queue links." Basically, each is a list of machines enabling two or more RTMSs to share a queue. The RTMS outputs produced objects to a "linked" queue, both of these RTMSs addresses must be listed in the output queue links. If it is to share an input queue with an RTMS, this RTMS's input queue links must list that machine. If the items it produces which need rework must go to a group of RTMS's, they must be listed in the rework queue links. The two Boolean variables entitled "Add to Least" go hand in hand with these links. If the one applying to rework items, addToLeastRew is set, then the rework queue links are treated as a list, and the machine in that list with the smallest queue at the time the object needing rework is produced is selected to receive the item. The same goes for addToLeastOut and successfully outputted objects. The difference here is that when the add to least variables are clear, the links mean that the queue is shared, if they are set, each machine has its own queue and the smallest one is chosen. FIGS. 38 and 39 show the difference between these scenarios.

A pair of vectors, queueList and useList, are used for each machine and updated each second of simulation. The former is a running log of the incoming queue, so that the first element is the queue at the first second of simulation, the second element is the quantity queued at the second, and so on. The latter is a similar list, except it is Boolean, and is true when the machine is operating. Note that the use list is not true when the repair operation is running. The vectors are updated within the function pushQueue ( ) and this function should be called each second—and in fact is called by one of the threads in the program as it exists currently (see below).

These vectors are mainly for statistical purposes and the user has the option of printing these vectors for each machine to a text file and possibly importing them into a statistics program such as MATLAB™, SPSS™, or Microsoft™ Excel® for further analysis.

Finally, there are a number of variables that are floating point percentages that a certain event will happen. These three events are whether an item will be scrapped, whether it will need rework, and whether or not a stage will need to be restarted from the beginning if the machine fails in the middle of it.

With a basic understanding of the variables involved in the class, understanding the inner workings of the functions becomes easier. The functions related to message processing usually do one or both of two things: increment tallies and change state variables. If it is the "to next state" message or a failure related message, the RTMS 90 add to the tallies describing how long the RTMS 90 have been in this state and how many times the RTMS 90 have been in this state, perhaps increment the number of times the RTMS 90 have experienced failure, and set the currentState variable appropriately. If it is a message related to the object, such as "object scrapped," the RTMS 90 increments the related counter.

There are other administrative functions related to message processing, such as managing linked queues and finding the smallest queue in a list of machines, which are mostly trivial. Certain functions output AnsiStrings to the GUI so that it can constantly be updated. Still other functions are related to the printing of the log and queue log files and contain a great deal of formatting and calls to file steam objects.

The four important functions not yet considered are the ones related to the times vector and the ones related to file I/O. These will now be explained in more detail.

The functions calculateTime (int, int, short unsigned int) and renewTimes are the chief functions in formulating the times vector. For each process, including time to failure and repair time, the former of these two functions is passed two time parameters and the distribution, set earlier by the user in the GUI. Using a switch statement and the rand ( ) function, this function creates a random time in seconds based on the two parameters and the distribution. The latter of the two functions is then responsible for splitting this time into minutes and seconds, determining if the object produced is to be scrapped or reworked (through random number generation) and managing the reset byte, the last one in the vector. This final step also may require a random number to determine if the RTMS 90 will reset the stage if the machine fails or if it will resume where it is interrupted.

The two functions readIn ( ) and writeMac ( ) are the fractions related to file I/O.

Class "manager"

In order to simplify system-wide interactions—moving objects from queue to queue, writing a settings file, printing the statistics for all machines, etc., the RTMS system is in need of a class which would contain each machine within itself and manage all interactions. This is the manager class.

The most fundamental member of the manager class is the array of pointers to rtms's, machines [15]. At startup, the manager's initManager ( ) function is called and, based on the initialization bytes received, the constructor for rtms is called for the rtms occupying the spot in the array that is the transmitted address byte. For example, an RTMS 90 is connected to the box 60 at address 0x02, meaning that when this value is put on port 1 of the box 60, the line driver for the RTMS 90 is enabled. The box then transmits 0x02, followed by the two settings bytes, to the computer. The manager catches these bytes. It sees that the address byte is 0x02, and thus the constructor for machines [2] is called with the settings bytes and a pointer to manager as the passed parameters. A close look at the initManager ( ) function and the rtms constructor will reveal that this is not as confusing as it may at first seem.

The constructor for the manager class instantiates an object of type serialCom called "talker." This object, obviously, is used for all serial interactions within the program. The mainLoop ( ) function basically just waits for a byte to arrive via talker. When it does, the address of the machine and the original message are parsed out through some simple math. The message is then sent to the proper machine for processing in a statement that looks like:

Machines[address]->processMessage (message)

If the message happens to be a request for times, the formulation and sending of the vector is handled within class rtms. The mainLoop ( ) function is called chiefly by the second thread that is running during simulation (see FIGS. 38 and 39). It is called within an endless while loop, so that the computer 62 is always receiving bytes.

Other variables within the class keep track of the starting and ending time in seconds of the simulation, the length of the simulation (simple subtraction), and the number of items in the whole system at any given time, as well as the average system-wide items to this point.

Figure 40A:
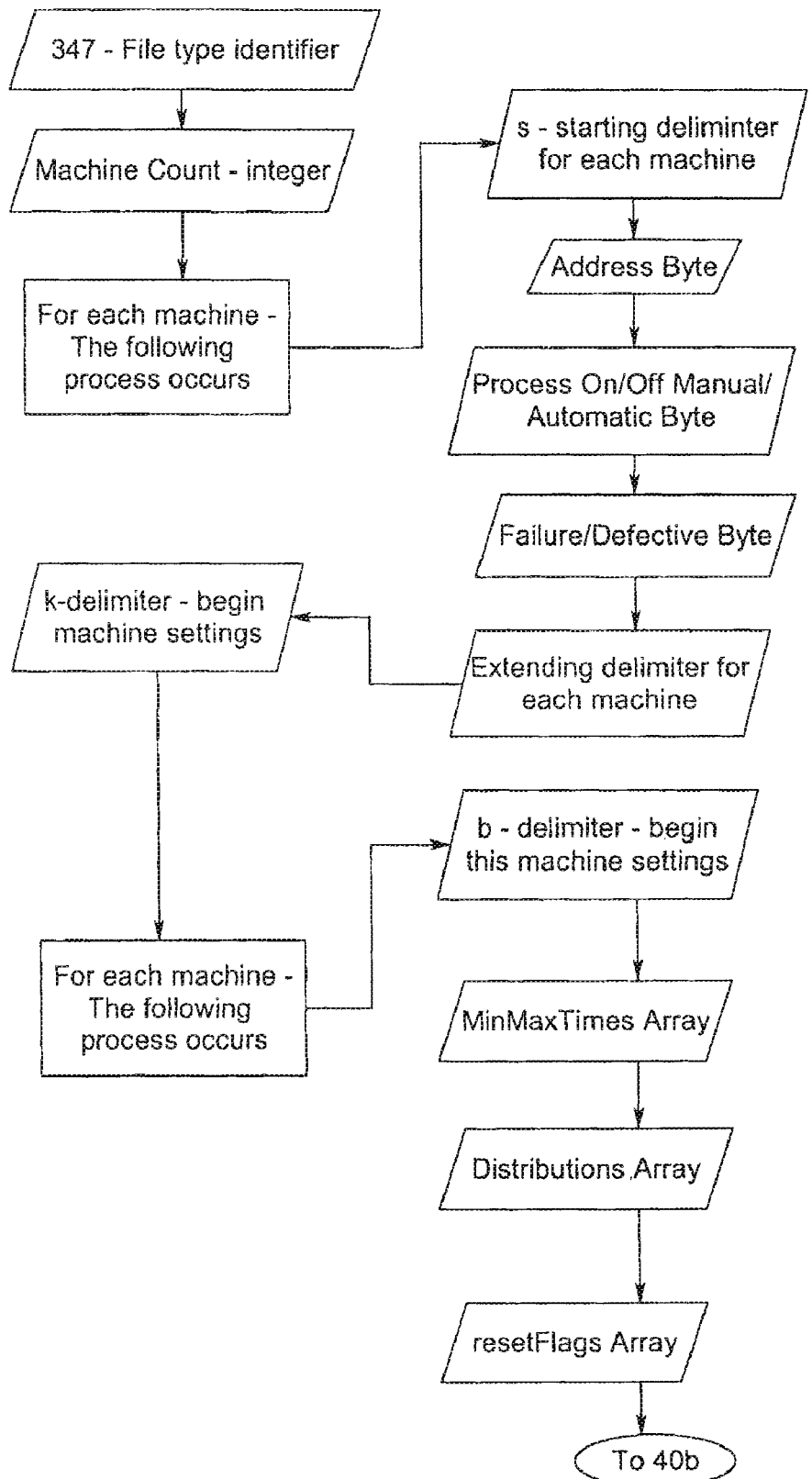
FIG. 40 is a flowchart illustrating the setting of file formats.
Figure 40B:
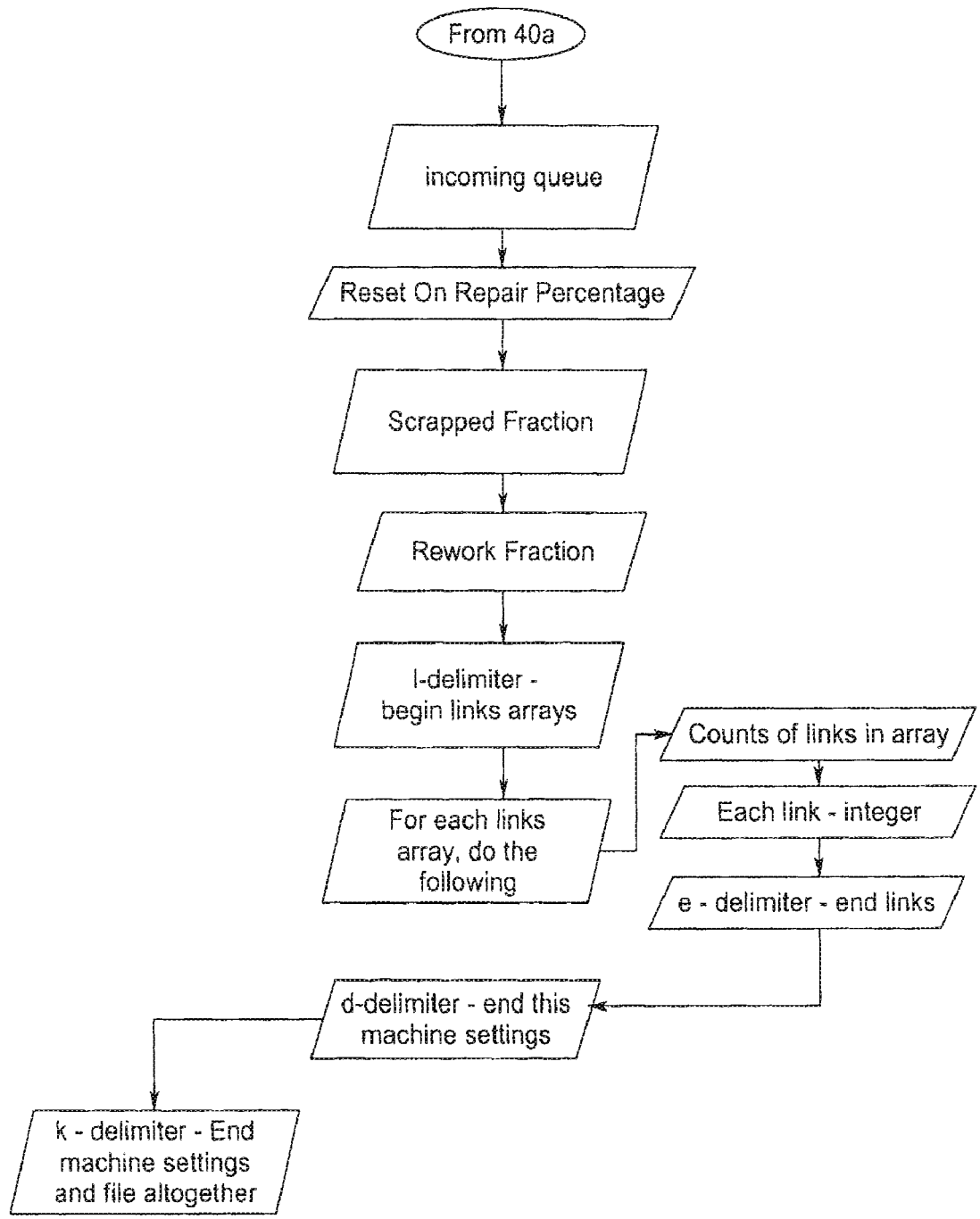

Functions used in the class include functions for printing the log and queue log files, setting the beginning and end of simulation statistics, and managing the queues between rtms's. FIG. 40 is a flowchart illustrating the setting file format.

Settings File I/O

The functions readIn ( ) and writeMac ( ) in the rtms class are the workhorses when it comes to the writing and reading of RTMS 90 settings files. Since the settings file is sequential access, the basic job of these two functions is to read in or write out information in the proper order and to put or check delimiting characters in the right place at the right time. The read function is constantly checking the delimiters it sees against what is expected, and will abort if the unexpected occurs. The job of the equivalent files in the manager class is similar.

The User Interface

The user interface in the RTMS software is its face to the world. Most of the work goes on behind the scenes, but the things that do not are those things that really matter to the end user. The user interface (UI or GUI, the graphical user interface) will be treated here in three parts—simulation preparation, simulation running, and simulation output.

Simulation Preparation

The first screen that comes-up in the GUI is a screen instructing that all machines be turned off. If the box 60 sees the RTS line on the computer 62 driven low, it will begin transmission. If the last device that used the serial port left RTS hanging low, the box 62 will start transmitting initialization bytes as soon as it is turned on. This initial screen makes sure this does not happen.

When the button on this first screen is clicked (not shown), an object of class manager (called "fatboy") is instantiated and the RTS line on the computer is driven low. The button at the bottom of this form is clicked when the box 60, followed by all connected RTMSs are all turned on. Clicking the button begins the initialization sequence.

The first thread is the initializing thread. It is the thread that is actually running the initManager ( ) routine within itself. If this routine completes, this thread suspends the other thread (see next paragraph), creates a number of tabs on the input form and on the output form, and moves the GUI to the next form.

The second thread is the timer. All this thread does is count five seconds via the time (0) function and, if it completes the count, it determines that the system is hung and issues an error message, allowing the program to exit gracefully. The initialization sequence is so troublesome, that in fact any redesign would beg massive restructuring of said sequence, or its complete elimination.

If initialization completes, the third GUI screen is displayed (not shown). The updateGUI ( ) function for this form ghosts any fields irrelevant to the selected machine. For example, if processing is off on the RTMS 90, all the fields within the box 60 labeled "processing" become ghosted.

"Selected machine" means to say that a certain tab is active on the form, and such is the RTMS to which it corresponds. It becomes a major issue in the GUI to discern which machine is active based on the active tab, and often involves parsing out the number from the tab's name and using that as the index into the machine array. When a new tab is clicked, the software first parses the GUI data into the currently selected RTMS, then changes the tabs and goes behind the scenes to update the GUI based on the newly selected RTMS's settings.

Updating the GUI with the currently selected RTMS's settings and parsing the GUI for numbers to put into the current RTMS's settings go hand in hand. Problems that arise when doing either of these things are: converting strings in text boxes to numbers and back again; converting distributions in combo boxes to numbers in the array; converting floating point numbers to strings and back again with proper formatting; and converting an array of queue links to an array of check boxes.

However, the useful AnsiString class handles all of these potential complications, save the last one. This class has the = operator overloaded to support conversion between all integers, floating point numbers, and strings, and formatting is equally easy, requiring only a few more parameters.

The final complication is resolved by creating three check box pointer arrays mirroring the queue link arrays in class rtms. At this point, for statements can be used to parse the check boxes in and out of runs objects. Submission of settings, clearing of settings, resetting of settings, saving of files, and beginning of the simulation all occur via buttons on the form or in the menu and consist simply of a few lines of code that call an appropriate function.

Simulation Running

Once "Begin Simulation" is selected, the RTMS have a single form. At most, this form can contain fifteen levels, each containing five fields of information about each RTMS. If any of the fifteen RTMSs are not connected, the form hides the inactive machine's bevels and labels. Since the incarnation of the RTMS system only supports four RTMSs, there will only be four bevels on the screen at any given time. An array containing all of the labels is formulated at startup so that for statements can be used in conjunction with the machine array in updating the GUI.

The behind the scenes process to update the display is again multithreaded The first thread is updating the GUI in an endless while loop (this is where the functions within class rtms that return an AnsiString are used). It is also responsible for calling the pushQueue ( ) function every second as described in FIG. 34. The second thread waits in an endless while loop calling the mainLoop ( ) function of the manager, basically waiting for bytes until the simulation ends.

Simulation Output

Simulation output in the current system comes in three forms: the output window, the graph window, and log files.

The output window is the first visible window after simulation and it is set up, internally and externally, in much the same way that the first two major UI areas are set up. Arrays are used to store the labels in a form conducive to for statements and at times mirroring the procFlags array. Times in seconds are parsed out of the currently selected RTMS and formatted using the formTime (long int) function. Averages are calculated using the totalLength and totalTimes vectors. It is basically all of the statistics kept by the rtms objects coming to fruition.

The engine behind the graph window is slightly more complex. The graph component itself is a VtChart®, the unregistered version of which comes prepackaged with the compiler. However, one skilled in the art may also incorporate other graphical components.

The RTMS have the chart existing more or less as a running bar graph of sorts with time on the x-axis and incoming queue on the y-axis. Based on the two times input by the user in the bottom fields and the machine selected in the combo box, the routine first splits the time up into 20 equal pieces, since there are only 21 bars in the graph (count the $0^{th}$ piece). The piece becomes a slice of time that is stored in memory. The routine fetches an integer from the queueList based on the starting time. This is the data in the first bar. It then adds a slice to the starting time and again consults the queueList and so on. In this way, the RTMS get 21 evenly spaced bars, all labeled via the formTime ( ) function.

Often, however, the length of time isn't exactly divisible by 20, so the time displayed on the graph is shortened on the finishing end and the bottom fields are updated to show the revision. For example, a user inputs 0:00 to 1:00 for the time to be displayed. This is fine. The routine gives a bar every three seconds from start to finish. Now suppose the user changes the ending time to 1:05. This is not fine. The routine lowers the ending time so that the length is divisible by 20, back to 1:00. The graph doesn't change. Finally, the user changes the starting time to read 0:05. The engine is not happy with this and again lowers the ending time (which now reads 1:00 because of the previous correction) to the next value divisible by 20, which is 0:45 (as this gives a length of 40 seconds).

Referring to FIG. 41, the final method for outputting information is shown. FIG. 41 shows some sample output files. The log, settings, and queue log files have already been fully discussed.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method of conducting operator-assisted machine simulation to explore the effects of different rules used in a modular manufacturing or assembly system, said method comprising the steps of:

(a) providing a computer, a serial hub, and a plurality of physical mock machines set apart from the computer, networked through the serial hub to the computer, for use in simulating operations performed by machines in the manufacturing or assembly system, each mock machine including a simulating device for representing a different machine in said system, said simulating device including controls to allow the participation of an operator in real-time simulation modeling of said system, wherein said controls represent a plurality of generic stages of operation of each said machine and include at least one of physical buttons, lights, switches, slides, and levers for simulating at least a loading stage, a processing stage, and an unloading stage of said machine operation and for allowing the operator to manually interface therewith in response to conditions necessitating operator intervention during said simulated loading stage, processing stage, and unloading stage;

(b) providing at least one tangible block representing a part being processed by said machines in said system, said one tangible block adapted to be manually placed in one of said mock machines by the operator and moved by the operator from said one of said mock machines to another one of said mock machines during the simulation;

(c) constructing a first set of simulation modeling rules for defining elements of said system, and relationships among said elements, by the operator;

(d) laying out said simulating device and said tangible block in accordance with said system to be simulated, by the operator;

(e) providing an interface to allow the operator to interface with the computer to define a second set of simulation modeling rules for each said simulating device;

(f) defining a third set of simulation modeling rules for the operator to follow when simulating said system, by the operator;

(g) enabling the operator to select one of said mock machines for initiating the simulation of the operation of the corresponding machine of the manufacturing or assembly system, said one mock machine signaling the operator when the simulated operation is completed, enabling the operator to select a further one of said mock machines to simulate a further operation of said manufacturing or assembly process during the simulation;

(h) executing operations on each said simulating device according to said first, second, and third sets of simulation modeling rules and allowing said operations to proceed to completion without modification of said first, second, and third sets of simulation modeling rules;

(i) monitoring, by the operator, the operations performed by each said simulating device; and (j) using the monitoring results to produce simulation results.

2. The method according to claim 1, further comprising the steps of defining a fourth set of simulation modeling rules, by the operator, replacing said third set of simulation modeling rules with said fourth set of simulation modeling rules, and repeating steps (h) through (i) using said fourth set of simulation modeling rules without changing either said first set of simulation modeling rules or said second set of simulation modeling rules.

3. The method according to claim 1, wherein said first set of simulation modeling rules include a system structure, wherein said system structure comprises parameters including the number of machines used in said system, the number and size of buffers and the location of said buffers in said system, the routing of items, and the probability distribution of loading, unloading, and processing times of each machine in said system, and wherein the routing of items parameters defines the relationship between each machine in said system and the buffers, and the sequence of operations required for said one tangible block.

4. The method according to claim 1, wherein said second set of simulation modeling rules include machine parameters.

5. The method according to claim 1, wherein said third set of simulation modeling rules include a hypothesis policy providing specific rules for the operator to follow during the simulation of said system.

6. The method according to claim 3, wherein said system structure is independent of behavior of the operator, allowing for a plurality of policies to be simulated without changing said system structure.

7. The method according to claim 4, wherein said machine parameters includes selection of machine operation to be simulated.

8. The method according to claim 1, wherein the monitoring step includes the steps of recording changes in said simulating devices and transmitting said changes to said computer.

9. The method according to claim 1, wherein the monitoring step includes the steps of enabling one of said simulation devices to determine elapsed time for the operator to perform operations associated with said one simulating device, and transmitting the elapsed time to said computer.

10. The method according to claim 1, further comprising the step of calculating the total number of said tangible blocks completed during the simulation to derive a throughput value for said system.

11. The method according to claim 1, wherein said constructing step includes the steps of defining the number of machines used in said system, defining the number and size of buffers and the location of said buffers in said system, defining the routing of items, and defining the probability distribution of loading, unloading, and processing times of each machine in said system.

12. The method according to claim 1, further comprising the step of simulating operations of each said machine in said system, in automatic mode or in manual mode.

13. A method of conducting operator-assisted machine simulation to explore the effects of different rules used in a modular manufacturing or assembly system, said method comprising the steps of:

(a) providing a computer, a serial hub, and a plurality of physical mock machines set apart from the computer, networked through the serial hub to the computer, for use in simulating operations performed by machines in the manufacturing or assembly system, each mock machine including a simulating device for representing a different machine in said system, said simulating device including controls to allow the participation of an operator in real-time simulation modeling of said system, wherein said controls represent a plurality of generic stages of operation of each said machine and include at least one of physical buttons, lights, switches, slides, and levers for simulating at least a loading stage, a processing stage, and an unloading stage of said machine operation and for allowing the operator to manually interface therewith in response to conditions necessitating operator intervention during said simulated loading stage, processing stage, and unloading stage;

(b) providing at least one tangible block representing a part being processed by said machines in said system, said one tangible block adapted to be manually placed in one of said mock machines by an operator and moved by the operator from said one of said mock machines to another one of said mock machines during the simulation;

(c) constructing a system structure, the system structure defining elements of said system, and relationships among said elements, by the operator;

(d) laying out said simulating device and said tangible block in accordance with said system to be simulated, by the operator;

(e) providing an interface to allow the operator to interface with the computer to define operational parameters for said simulating device;

(f) defining a hypothesis policy for the operator to follow when simulating said system, by the operator;

(g) enabling the operator to select one of said mock machines for initiating the simulation of the operation of the corresponding machine of the manufacturing or assembly system, said one mock machine signaling the operator when the simulated operation is completed, enabling the operator to select a further one of said mock machines to simulate a further operation of said manufacturing or assembly process during the simulation;

(h) executing operations on each said simulating device according to said hypothesis policy and allowing said operations to proceed to completion without changing said hypothesis policy; and (i) recording changes in each said simulating device and transmitting said changes to said computer.

14. The method according to claim 13, wherein said system structure defines elements of said system and relationships among said elements; and including defining a second hypothesis policy that is distinct from said first hypothesis policy; replacing said first hypothesis policy with said second hypothesis policy, and repeating steps (h) and (i) using said second hypothesis policy without changing said system structure.

15. The method according to claim 13, further comprising the step of enabling the operator to modify said hypothesis policy during the simulation.

16. The method according to claim 13, further comprising the steps of, by the operator, monitoring the operations performed by each said simulating device and using the monitoring results to produce simulation results.

17. The method according to claim 16, wherein the monitoring step includes enabling each said simulating device to determine elapsed time for the operator to perform operations associated with each said simulating device, and transmitting the elapsed time to said computer.

18. The method according to claim 13, wherein said constructing step includes the steps of defining the number of machines used in said system, defining the number and size of buffers and the location of said buffers in said system, defining the routing of items, and defining the probability distribution of loading, unloading, and processing times of each machine in said system.

19. The method according to claim 13, wherein said system structure defines elements of said system and relationships among said elements, and wherein said system structure being is independent of behavior of the operator, allowing for a plurality of policies to be simulated without changing said system structure.

20. The method according to claim 13, wherein said step of providing an interface comprises the step of allowing the operator to define for said tangible block a plurality of tangible sub-blocks, allowing said tangible block to be broken into a temporal progression of tangible sub-blocks that appear sequentially to simulate a cutting operation for a part being processed during a manufacturing operation.

21. The method according to claim 13, further comprising the step of simulating operations on each said machine of said system, in automatic mode or in manual mode.

22. The method according to claim 13, further comprising the step of simulating operations on each said machine of said system in accelerated time.

23. A simulation system for exploring the effects of different policies used on machines in a modular manufacturing or assembly system, said simulation system comprising:
  a tangible block representing a part being processed by said machines in said manufacturing or assembly system;
  a plurality of mock machines each including a simulation device for representing a different machine in said manufacturing or assembly system for conducting machine simulation and for allowing an operator to manually participate in the simulation of said manufacturing or assembly system, each said simulation device including physical operation controls to allow the manual participation of the operator in real-time simulation modeling of the system in response to conditions necessitating operator intervention during the simulation, said operation controls representing different generic stages of operation of said machines and including at least one of physical buttons, lights, switches, slides, and levers for simulating at least a loading stage, a processing stage, and an unloading stage of said machine operation, wherein each said simulation device includes a fixture for physically receiving said tangible block;
    wherein the participation of the operator includes selecting one of said mock machines for simulating an operation of the manufacturing or assembly system and responding to an indication that the operation being simulated is completed to select a further one of said mock machines to simulate a further operation of said manufacturing or assembly process during the simulation modeling of the system; and
    wherein the tangible block is manually moved by the operator from said one of said mock machines to another one of said mock machines during the simulation;
  a processing unit communicating with each said simulation device for generating operation time associated with said policies in response to interactions of the operator with said simulation devices;
  a parameter control communicating with each said simulation device for enabling an operator to selectively configure said simulation devices to simulate automatic or manual operation of at least one stage of said machine operation;
  a quality selection control communicating with each said simulation device for enabling the operator to selectively configure each said simulation device to simulate a machine failure or to simulate the production of defective items; and
  a feedback module for providing audible and mechanical stimuli indicative of machine operations of said mock machine.

24. The simulation system as defined in claim 23, wherein said parameter control allows the operator to designate at least one of said stages as automatic, requiring the operator to press and release a button or a lever once.

25. The simulation system as defined in claim 23, wherein said parameter control allows the operator to designate at least one of said stages as manual, requiring the operator to press and hold a button or a lever for the duration of said stage.

26. The simulation system as defined in claim 23, wherein said parameter control and said quality selection control are integrated into each said simulation device.

27. The simulation system as defined in claim 23, wherein said parameter control and said quality selection control are integrated into said processing unit.

28. The simulation system as defined in claim 23, wherein said tangible block comprises of a plurality of tangible sub-blocks, allowing said tangible block to be broken into a temporal progression of said sub-blocks appearing sequentially to simulate a cutting operation for a part being processed as a manufacturing operation is carried out.

29. The simulation system as defined in claim 23, wherein said processing unit records manufacturing information, said manufacturing information including the throughput of said mock machines, the idle time of said mock machines, and the number of said tangible blocks waiting in a buffer of said mock machines.

30. The simulation system as defined in claim 23, wherein said processing unit is programmed to allow the operator to define a system structure for said manufacturing or assembly system.

31. The simulation system as defined in claim 30, wherein said system structure includes parameters including the number of machines used in said manufacturing or assembly system, the number and size of buffers and the location of said buffers in said manufacturing or assembly system, the routing of items, and the probability distribution of loading, unloading, and processing times of each machine in said manufacturing or assembly system.

32. The simulation system as defined in claim 30, wherein said system structure is independent of behavior of the operator, allowing for a plurality of policies to be simulated without changing said system structure.

33. The simulation system as defined in claim 23, wherein each said simulation device simulates operations on a machine of said system, in automatic mode or in manual mode.

34. A simulation system for exploring the effects of different policies used in a modular manufacturing or assembly system by providing operator-assisted real-time simulation of a series of machines in said manufacturing or assembly system, said simulation system comprising:
  a plurality of tangible blocks representing parts being processed by said machines in said manufacturing or assembly system, wherein each said tangible block comprises a plurality of sub-blocks, wherein each said sub-block comprises the form of a corresponding one of said tangible blocks at a corresponding sequential stage of said simulation prior to the processing of said sub-block by said machines in said manufacturing or assembly system;

a plurality of physical mock machines set apart from the computer, each including a simulation device and each representing a different one of the machines of the series of machines in said manufacturing or assembly system for conducting machine simulation, said simulation devices including controls to allow the participation of an operator in real-time simulation modeling of said system, wherein said controls represent a plurality of generic stages of operation of each said machine and include at least one of physical buttons, lights, switches, slides, and levers—for simulating at least a loading stage, a processing stage, and an unloading stage of said machine operation and for allowing the operator to manually interface therewith in response to conditions necessitating operator intervention during said simulated loading stage, processing stage, and unloading stage, said simulation devices each including a fixture for physically receiving at least one of said sub-blocks, wherein the participation of the operator includes selecting one of said mock machines for simulating an operation of the manufacturing or assembly system and responding to an indication that the operation being simulated is completed to select a further one of said mock machines to simulate a further operation of said manufacturing or assembly process during the simulation;

a processing unit communicating with said simulation devices for generating operation times associated with said policies in response to interactions of the operator with said simulation devices, said processing unit including a user interface for enabling the operator to input a system structure representative of said system;

a hub communicating with said simulation devices and said processing unit for networking said simulation devices to said processing unit, said hub providing a plurality of connection ports for said simulation devices and said processing unit to attach to; and a feedback module for providing audible and mechanical stimuli indicative of machine operations of said mock machine.

35. The simulation system as defined in claim 34, wherein said user interface allows the operator to selectively configure said simulation devices to simulate at least one stage of said stages of operation and to selectively configure said simulation devices to simulate a machine failure or to simulate the production of defective items.

36. The simulation system as defined in claim 34, wherein said system structure entered by the operator includes parameters including the number of machines used in said manufacturing or assembly system, the number and size of buffers and the location of said buffers in said simulation system, the routing of items, and the probability distribution of loading, unloading, and processing times of each mock machine in said simulation system.

37. The simulation system as defined in claim 34, wherein said system structure defines elements of said system and relationships among said elements, and wherein said system structure entered by the operator is independent of behavior of the operator, allowing for a plurality of policies to be simulated without changing said system structure.

38. The simulation system as defined in claim 34, wherein said processing unit includes a memory for recording manufacturing information, said manufacturing information including the throughput of said mock machines of said simulation system, the idle time of said mock machines of said simulation system, and the number of said sub-blocks waiting in the buffers of said mock machines of said simulation system.

39. The simulation system as defined in claim 34, wherein said processing unit receiving data indicative of operations performed by the operator on said simulation devices and processing said data to produce simulation results.

40. The simulation system as defined in claim 34, wherein said processing unit controls said simulation devices to simulate machine operations in accordance with the system structure entered by the operator.

41. The simulation system as defined in claim 34, wherein said fixtures are accessible to the operator, allowing the operator to place said sub-blocks into said fixtures of said plurality of simulation devices to simulate loading operations.

42. A simulation system for providing operator-assisted real-time simulation of a series of machines in a modular manufacturing or assembly system, said simulation system comprising:

at least one tangible block representing parts being processed by said machines in said manufacturing system;

a plurality of mock machines, each including a simulating device representing a different machine in said manufacturing or assembly system, said simulation devices including controls to allow the participation of an operator in real-time simulation modeling of said system, wherein said controls represent a plurality of generic stages of operation of each said machine and include at least one of physical buttons, lights, switches, slides, and levers for simulating at least a loading stage, a processing stage, and an unloading stage of said machine operation and for allowing the operator to manually interface therewith in response to conditions necessitating operator intervention during said simulated loading stage, processing stage, and unloading stage, each said simulating device including a holder for physically receiving said tangible block, wherein the participation of the operator includes selecting one of said mock machines for simulating an operation of the manufacturing or assembly system, and responding to an indication that the operation being simulated is completed to select a further one of said mock machines to simulate a further operation of said manufacturing or assembly process, and moving the tangible block from said one mock machine to another one of said mock machines during the simulation;

a computer communicating with each said simulating device;

an interface means for enabling an operator to interface with said computer to define operational parameters for each said simulating device;

means for defining a system structure for defining elements of said manufacturing or assembly system, and relationships among said elements, said computer storing said system structure;

said computer executing timing operations on each said simulating device in accordance with an operator executing a hypothesis policy and said computer recording changes in each said simulating device; and a feedback module for providing audible and mechanical stimuli indicative of machine operations of said mock machine.

43. A real-time machine simulator representing a machine in a manufacturing system for conducting real-time machine simulation, said machine simulator comprising:
- a plurality of tangible blocks representing parts being processed by said machine in said manufacturing system, wherein each said tangible block comprises a plurality of sub-blocks; and
- a mock machine including:
  - a housing having an inner compartment and an access opening providing access to said compartment;
  - a fixture located within said compartment for physically receiving at least one of said plurality of tangible blocks, said fixture allowing for manual loading and unloading of said at least one tangible block by an operator to simulate loading and unloading of the parts being processed while the real-time machine simulation is being carried out, wherein the at least one tangible block remains in the fixture during the simulation of loading and unloading and wherein the mock machine does not perform an actual operation on the at least one tangible block during the simulation;
  - a control panel located on said housing, said control panel including a first plurality of indicators for indicating machine states, including machine error and generic stages of operation of said machine in said manufacturing system, and a second plurality of indicators for indicating a condition of a part being processed by said machine in said manufacturing system;
  - a plurality of physical controls including at least one of buttons, lights, switches, slides, and levers for simulating a plurality of machine operations, for simulating at least a loading stage, a processing stage, and an unloading stage of said machine operation and for allowing the operator to manually interface therewith in response to conditions necessitating operator intervention during said simulated loading stage, processing stage, and unloading stage;
  - a microcontroller for receiving inputs from said controls and for controlling said indicators on said control panel; and
  - a feedback module for providing audible and mechanical stimuli indicative of machine operations of said mock machine,
- wherein at least one of said tangible sub-blocks is attachable to and detachable from one or more other tangible sub-blocks such as to allow said tangible sub-blocks to be attached in a temporal progression to simulate an assembly operation for a part being processed or to be detached in a temporal progression to simulate a disassembly operation for a part being processed.

44. The machine simulator as defined in claim 43, comprising a material handling module for replacing one of said plurality of tangible blocks with a further tangible block.

45. The machine simulator as defined in claim 44, wherein said further tangible block has a different form than that of said replaced tangible block.

46. The machine simulator as defined in claim 43, wherein said material handling module includes a tangible block swapping mechanism, including at least one magazine tower for dispensing further tangible blocks and at least one actuator for facilitating the replacement of one of said plurality of tangible blocks during the processing operation of said mock machine.

47. The machine simulator as defined in claim 43, comprising a pallet for receiving one of said plurality of tangible blocks, said pallet serving as a buffer for said mock machine.

48. The machine simulator as defined in claim 43, further comprising a stack light indicative of the status of said mock machine, said stack light including a green light, a yellow light, and a red light.

49. The machine simulator as defined in claim 43, wherein said controls include at least one lever for simulating the loading, unloading, and processing operations of said mock machine.

* * * * *